US006260049B1

United States Patent
Fitzgerald et al.

(12)

(10) Patent No.: US 6,260,049 B1
(45) Date of Patent: Jul. 10, 2001

(54) AUTOMATED SHELF MANAGEMENT SYSTEM AND PROCESS FOR TRACKING AND PURGING FILE FOLDERS IN A FILE STORAGE FACILITY

(75) Inventors: Arthur C. Fitzgerald, West Peabody; John F. Coughlan, Buzzards Bay; Jack B. Goldman, Brookline, all of MA (US)

(73) Assignee: Electronic Paper Solutions, Inc., West Peabody, MA (US)

( * ) Notice: Subject to any disclaimer, the term of this patent is extended or adjusted under 35 U.S.C. 154(b) by 0 days.

(21) Appl. No.: 09/189,772

(22) Filed: Nov. 10, 1998

(51) Int. Cl.[7] .................................................. G06F 17/00

(52) U.S. Cl. ...................... 707/104; 209/547; 340/572.1; 283/81

(58) Field of Search ..................... 209/547; 340/572.1; 283/81; 707/104

(56) References Cited

U.S. PATENT DOCUMENTS

| | | | |
|---|---|---|---|
| 5,159,180 | * 10/1992 | Feiler | 235/375 |
| 5,287,414 | * 2/1994 | Foster | 382/1 |
| 5,424,858 | * 6/1995 | Gillotte | 359/143 |
| 5,936,527 | * 8/1999 | Issacman et al. | 340/572.1 |

OTHER PUBLICATIONS

Barbara D. Volkov, "Labor Cost Comparison: Application of Individual 'Sticky' Labels vs. Application of an 8 Inch 'Strip' Label for End Tab File Folders," White Paper, Oct., 1997, Five Pages.*

* cited by examiner

Primary Examiner—Paul V. Kulik
(74) Attorney, Agent, or Firm—Kenneth L. Milik

(57) ABSTRACT

An automated system and process for managing paper files, particularly medical records contained in file folders and the like, in a file storage system having a predetermined size or limited expansion capacity. A shelf manager system includes a computer program and database which tracks the thickness of individual file folders, the capacity of storage shelf sections, and the percentage of free space remaining in each shelf section. The thickness of each file folder is measured whenever the file folder enters or leaves the primary file storage facility. File folder thickness is computed by weighing the file on an electronic scale or other caliper-based measure device. When occupied shelf space exceeds a threshold percentage for a shelf section, file folders are purged according to the likelihood that certain files will not be requested in the future by applying purging algorithms to the individual files. In an alternative embodiment, document image scanning provides multiple copies of pertinent file information to fulfill multiple pending file requests. In another alternative embodiment, the file folders include radio frequency identification tags for passive detection of file folder identification. In a still further alternative embodiment, data from the shelf manager system controls a digital printing press to create direct print color-coded file folders for use with the shelf manager system.

24 Claims, 57 Drawing Sheets

AUTOMATED SHELF MANAGEMENT SYSTEM AND PROCESS FOR TRACKING AND PURGING FILE FOLDERS IN A FILE STORAGE FACILITY

FIELD OF THE INVENTION

The present invention relates generally to an automated system and process for tracking paper files and the like, and more particularly to an automatic system and process for tracking and purging file folders in a file storage system having predetermined or limited expansion capacity.

BACKGROUND OF THE INVENTION

In office environments, although there is a trend toward the paperless office, where files will exist primarily in electronic form, there is continued reliance on paper files and paper file folders, which are generally stored on open shelving units or in filing cabinet drawers. In some environments, such as health care, legal, insurance, and corporate, the number of files and the contents of those files can quickly grow to exceed the capacity of most file systems and the space available for file storage.

The problems of storage and tracking of individual files have generally been addressed by improving the physical storage shelving to make it more compact or to provide some automatic means of file retrieval. For example, U.S. Pat. No. 4,219,296 discloses an automatic file storage and retrieval apparatus, in which a movable carriage locates and pulls out individual files stored on coded shelving. Although systems like the one described are basically effective, they are expensive and they have a limited capacity. Also, file folders which are inactive and not likely to be needed take up valuable file storage space.

Some large businesses have addressed their growing file storage needs by allocating greater space within their buildings to the file storage function, and even constructing additional buildings for file storage; however this is generally an expensive solution, requiring high construction costs as well as operating and staffing costs.

Another solution has been to move the paper files that will not be needed to an off-site storage facility, where the files are stored on shelving or in cataloged boxes and the like. For example, a typical medical records storage facility associated with a large city hospital might typically include as many as one million patient files, with 450,000 patient files on-site and the remainder in off-site storage. A file can be retrieved from off-site storage when needed by a system of delivery vehicles or other means. The drawback of this method is that retrieval takes time; often there is a delay of several hours or days between the time the recognition is made to retrieve a file and the time the file is received. Also, there is a high cost associated with storage and retrieval of records stored off-site.

Furthermore, there is a problem in classifying which files should be kept on site in primary storage and which files should be sent to the off-site storage facility. This problem has generally been addressed by having a single purging criteria applied to all the files as a whole. Such a purging criteria might be, for example, to remove all files older than a certain cut-off date, the logic being that older files would most likely not be needed for current referrals. Purging criteria based on cut-off dates does not address the common situation in which files older than an arbitrary cut-off date are still needed for various reasons and will need to be retrieved from off-site storage, incurring time delays and high costs.

Another common drawback of conventional filing systems is file section overflow, in which individual filing sections may become overfilled. This results from some file sections filling at a faster rate than other file sections due to an increase in the number of files or an increase in the thickness of individual files due to added content. In these situations, in order to make adequate room for new files within overfilled file sections, a manual process known as back shifting is performed, in which the file contents for several shelf sections are redistributed to make more room in the overfilled sections. Back shifting is a time-consuming, tedious process, which can cause delays in normal filing operations during the time the back shifting is carried out.

Another problem in managing paper files is how to effectively deal with pending requests and multiple pending requests. Oftentimes, an individual file will be requested by several users simultaneously. For example, in the medical field, a new patient's file will need to be seen by doctors in various medical departments, such as radiology and pathology, as well as administrative departments, such as patient billing, in conventional filing systems, pending file requests are handled by hand-written routing slips, and files are often not re-routed until they are returned to the file shelves. Most existing filing systems do not have a way to deal effectively with routing the requested file to the various users in a time-efficient manner to minimize delays.

The present invention overcomes the disadvantages of the prior art filing systems.

SUMMARY OF THE INVENTION

A solution to the problems of prior file storage systems is provided by the present invention, which optimizes the use of available file space by seeking to keep the shelves full or at a predetermined percentage of being full, such as 90–95 percent full, while avoiding the problems associated with overfilled files and back shifting.

Accordingly, it is an object of the present invention to provide a computerized file tracking and purging system which seeks to keep most file sections in a file storage facility nearly full but never overflowing.

It is another object of the present invention to provided a computerized file tracking and purging system which keeps those records which are deemed to be most active within the storage facility and remove or purge the inactive files for removal to off-site or distant storage.

It is yet another object of the present invention to provide a computerized file tracking and purging system which determines for each file section, hierarchically, which files are most likely to be requested and which files are least likely to be requested.

In accordance with the preferred embodiments of the present invention, the present invention is a computer-implemented shelf manager system for tracking, file maintenance, and file purging in health care, government, legal and other record-intensive environments. This present invention is applicable to file storage situations such as open shelves, mobile shelves, or mechanical shelving systems Attorney wherever there is a desire to prevent the size of individual file folders from growing beyond the capacity of fixed-capacity shelves. The objects of the present invention are achieved by providing an automated system and process for managing paper files, such as medical records contained in file folders and the like, in a file storage system having predetermined size or limited expansion capacity.

The shelf manager system of the present invention is used advantageously with the filing method known as terminal digit filing, in which a file room or file storage facility is divided in an basically equal number of sections. In the present invention, each file folder is assigned a unique file identifier, which links it to the section in which it will be stored.

The shelf manager system of the present invention includes a computer and a database coupled to the computer for storing sets of data for each file folder, which are linked by means of the file folder's unique identifier. The kinds of information stored in the database for each file folder include, as a minimum, the identifier, the physical thickness of the file folder, and the storage section to which the file folder is assigned. In addition to this information, the file database includes various information related to the file folder's content. In the case of a medical file folder, for example, the content information will advantageously include the patient's visit history, disease history, and other information.

Whenever a file folder enters or leaves the file room or file storage facility it is logged-in or logged out through a logging station, which is coupled to the computer. The logging station has the primary purpose of updating the thickness measurement for the file folder. The thickness is determined by measuring the file folder's weight, ideally on an electronic scale, although it is contemplated that the measurement could also be determined by physical measurement with an electronic caliper. The weight measurement is converted by the computer to an updated thickness measurement by applying an algorithm that relates weight to thickness. At the same time, the total file thickness for that file's assigned shelf section is recalculated and compared to a user chosen threshold value, usually in the range of 90 to 95 percent. Information related to the file folder's content is also updated in the computer database, such as patient appointment history If the total thickness for all file folders within a storage section exceeds the set threshold percentage of the available storage space for the storage section, the purging subroutine is initiated. A set of computer algorithms apply file-usage criteria to each file within that file section to identify some folders for purging within that section. The folders for purging are added to a purge list, which may be printed out to be used as a guide by personnel performing the actual physical purging, usually during the night. The purged files are removed for shipment to off site storage. The purging subroutine identifies just the file folders needed to reduce the total thickness for all file folders below the threshold percentage for that section.

For the current shelf section, the file folders are purged according to the likelihood that certain files will not be requested in the future by applying purging algorithms to the individual files. The purging proceeds in two stages. In the first stage, file folders are purged based on a set of predetermined criteria, such as previous visit history, zip code, disease code, type of exam, and other factors that would be predictive of whether that particular folder would not be requested again. In the second stage, file folders are ranked by the date of last visit.

In alternative embodiments, document image scanning provides multiple copies of pertinent file information to fulfill multiple pending file requests. In another alternative embodiment, the file folders include radio frequency identification tags for passive detection of file folder identification. In a still further alternative embodiment, data from the shelf manager system controls a digital printing press to create direct print color-coded file folders for use with the shelf manager system.

BRIEF DESCRIPTION OF THE DRAWINGS

The foregoing and other objects, features and advantages of the invention will be apparent from the following more particular description of a preferred embodiment of the invention, in conjunction with the accompanying drawings. In the drawings:

FIG. 15 illustrates the graphical user interface screen for the pending requests subroutine of the present invention;

FIG. 17 illustrates the graphical user interface screen for the folders master subroutine showing the folders add dialogue box screen of the present invention;

FIG. 20 illustrates the graphical user interface screen for the login/logout history subroutine of the present invention;

FIG. 29 is a flowchart of the audit system subroutine of the present invention;

DESCRIPTION OF THE PREFERRED EMBODIMENTS

Figure 1:
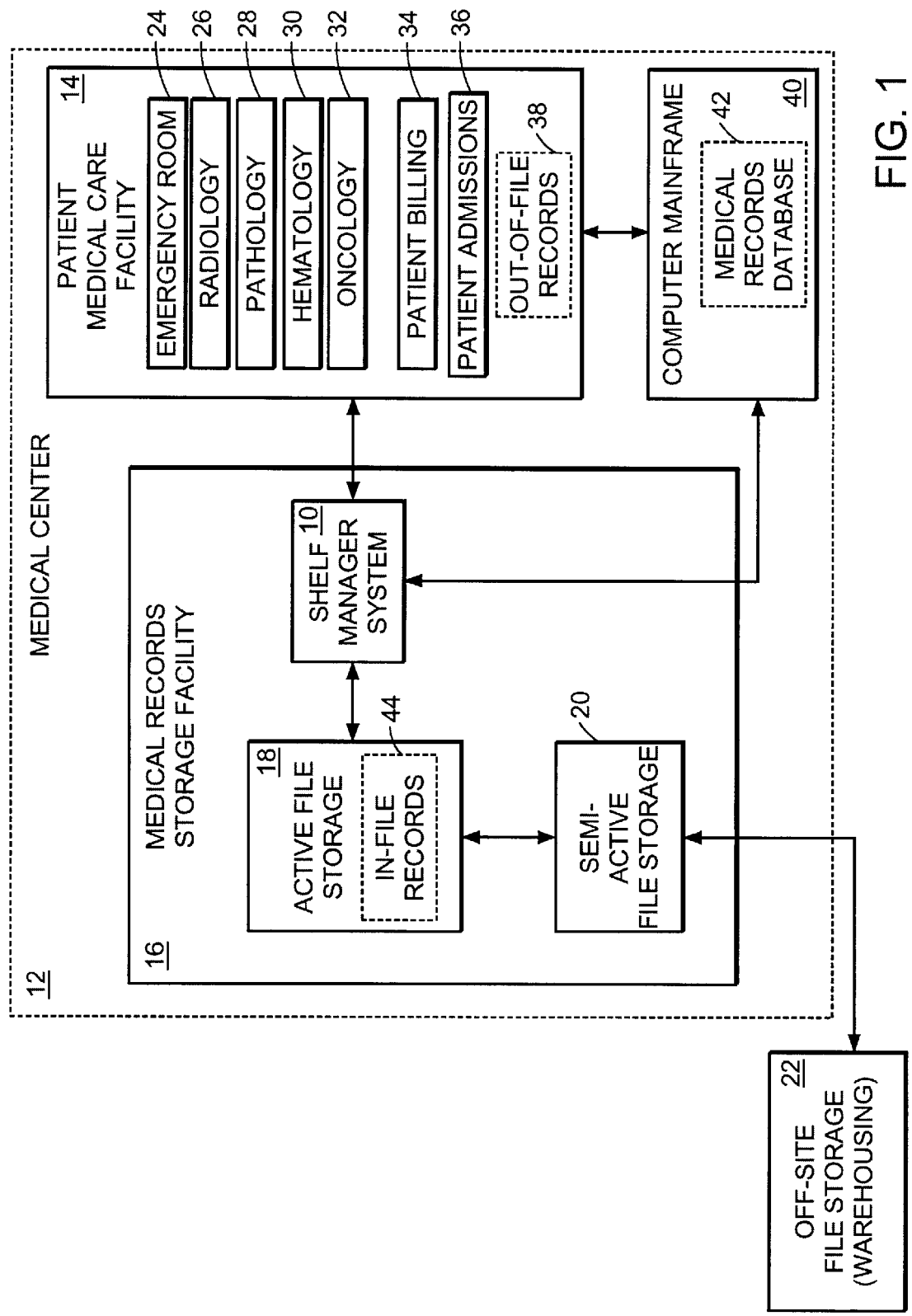
FIG. 1 illustrates the shelf manager system of the present invention within its operating environment.

Turning initially to FIG. 1, an exemplary system is shown which incorporates a shelf manager system 10 in accordance with the preferred embodiment of the present invention. In FIG. 1, the preferred embodiment of the present invention is for use in a medical center 12 or like environment. However, it should be noted that the principles of the present invention are applicable in any environment in which large volumes of records are kept as paper files. Such other environments include, for example, federal and state government agencies, law firms, and insurance companies. Also, although the preferred embodiments discuss file folders stored on open shelving, for simplicity, it is understood that the principles of the present invention apply equally to other expandable file holders such as x-ray jackets, which typically include an outer jacket, an inner jacket and the x-ray film itself. The preferred embodiments also describe files stored on open shelving, but it is understood that the principles of the present invention also apply to file systems using filing cabinets or other file storage means.

In general terms, the shelf manager system 10 of the present invention comprises a computer, computer software, and related computer input and output devices which are used to dynamically track and control the movement of file folders between a patient medical care facility 14 and a medical records storage facility 16. File activity is the term given to express a measure of the likelihood that a given file folder will be requested for transfer to the patient medical care facility 14. Active files are those having the highest file activity and most likely to be requested; semi-active files have much lower file activity and are less likely to be requested than active files; and inactive files have the lowest or no activity and are therefore the least likely to be requested.

The shelf manager system 10 analyzes file folder activity using a set of computer-implemented algorithms that identify the most active files, which must be stored in active file storage 16, the next grouping of semi-active files, to be stored in semi-active file storage 18, and inactive files which have a very low likelihood of being requested and can thus be safely stored in off-site warehousing facilities 20 permanently or for infrequent retrieval.

This is accomplished by tracking paper growth in the active file storage 18 by continuously calculating the total thickness of paper sheets added or subtracted from the file system as a whole, and particularly within file storage sections, as will be described, and producing a purge list whenever a predefined threshold is exceeded. The purge list is used for removing certain low activity files from the active file storage 18 reduce the total thickness below the threshold. Based on the principles of operation of the present invention, the efficiency of the file storage system is increased because the files that are most likely to be requested are the same files that are most likely to be resident in active file storage 18, and files that are less likely to be requested are moved either to semi-active storage 20, or in off-site storage 22. The present invention also ensures that most of the available file space in the active file storage 18 will be almost fully utilized. In addition, the shelf manager system 10 of the present invention prioritizes and handles pending requests and provides reporting functions.

In FIG. 1 the medical center 12 may be, for example, a large metropolitan hospital or even a small medical affiliate, which would typically provide medical treatment services to patients and also be capable of providing these medical services to the same patient population over an extended time period. The medical center 12 includes a patient medical care facility 14 and a medical records storage facility 16, which stores and manages all individual patient files, generally in the form of paper files contained in folders, which will be described in more detail in what follows.

In a metropolitan hospital, the patient medical care facility 14 is typically departmentalized into a number of functional units having various diagnosis or treatment specialties such as emergency 24, radiology 26, pathology 28, hematology 30, and oncology 32. This listing is merely exemplary and not all-inclusive. In addition to diagnosis and treatment departments, the patient medical care facility 14 also includes administrative (non-diagnosis and non-treatment) departments such as patient billing 34 and patient admissions 36. Again, this listing is merely exemplary and not all-inclusive. For a given patient seeking treatment for illness or injury, multiple departments will normally be responsible for the patient's processing, diagnosis, and treatment. Those departments will require access to the patient's medical file for reasons related to the specialty of each requesting department, and the files will need to be updated with new information from the diagnosis or treatment that was performed or for administrative reasons, or both. The various departments request patient files to be physically transferred from the medical records storage facility 12 to the patient medical care facility 14, as needed, and then returned to the medical records storage facility 16.

Requests for patient file folders are called pending requests and it is possible for there to be multiple pending requests for a patient's file folder at any one time. The shelf manager 10 tracks all pending requests. Pending requests are entered into the shelf manager system 10. Each requested patient file folder 52 is then physically removed from the shelf, the routing slip is printed, and the file folder 52 is routed to the requester. When the file is returned to the medical records storage facility 16, the shelf manager system 10 searches for any other pending requests. If other pending requests are found, the file folder is electronically flagged and it is rerouted to the requester's locale. This process continues until all the pending requests are filled for a particular patient's file folder. When a pending request has been filled and the file moved from the file storage facility 14, the file is termed an out-of-file record 38. Out-of-file records 38 may be physically within the requester's department or in transit between departments.

In addition, the medical center 12 typically includes a computer mainframe 40, which stores data related to individual patients in a medical records database 42. The kinds of information tracked for individual patients may include: name, address, visit history, disease & treatment codes, insurance, and billing information. The computer mainframe 40 may be physically located within the medical center 12 or at a separate or distant location. If at a separate location, the computer mainframe 40 would be accessible to designated hospital personnel in the medical center 12 by means of conventional local area network (LAN) or wide area networking (WAN) technology.

Although medical records computers, such as the computer mainframe 40, store an increasing quantity of patient data, the primary patient files are in paper form. Over time, the trend will be toward increased storage of patient records in electronic form, but reliance on paper records will continue well into the future.

In FIG. 1, it can be seen that the medical records storage facility 12 includes an active file storage 18 for storing in-file records 44, and a semi-active file storage 20. The active file storage 18 is generally in the form of static shelving which will be described in more detail in connection with FIG. 2. The active file storage 18 has to be sufficiently large to provide storage space for the majority of files which may be requested by the patient medical care facility 14. For a large metropolitan hospital, the number of files in active storage may number more than 400,000, partly because patient files are rarely destroyed and the patient files may go back several decades. It is important for the active storage 18 to be in close proximity to the patient medical care facility 14, so that patent records as required by the various medical departments are conveniently accessible to the doctors, laboratories, and administrative personnel in the patient medical care facility 14 as needed, without undue delay.

The difficulty of maintaining a large active storage 18 is readily apparent. As total file volume grows, the conventional solution has been to physically add additional space and personnel to cope with the increased volume. New medical records storage facilities are acquired in the form of additional buildings and support staffs to handle the need for increased storage space. The shelf manager 10 eliminates the need for providing additional active file storage 18 by efficiently utilizing the existing space, specifically by keeping the active file storage 18 as full as possible only with those files that are most likely to be requested by the patient medical care facility 14. The remaining files may safely be moved to the semi-active storage 20, where the files are stored on less-accessible mobile shelving units, which provide an increased storage density, and finally to low cost off-site storage.

Figure 2:
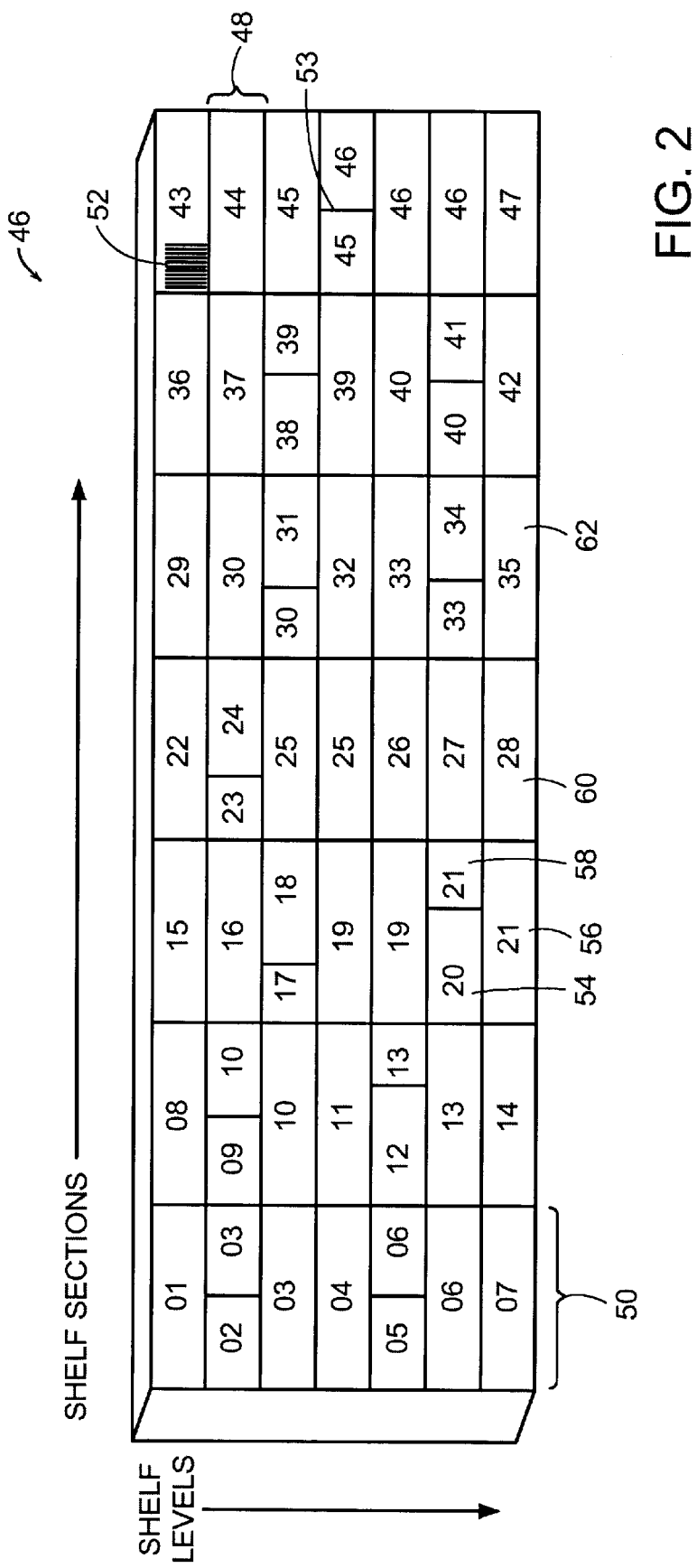
FIG. 2 illustrates active file storage shelving storage as used with the present invention.
Figure 3:
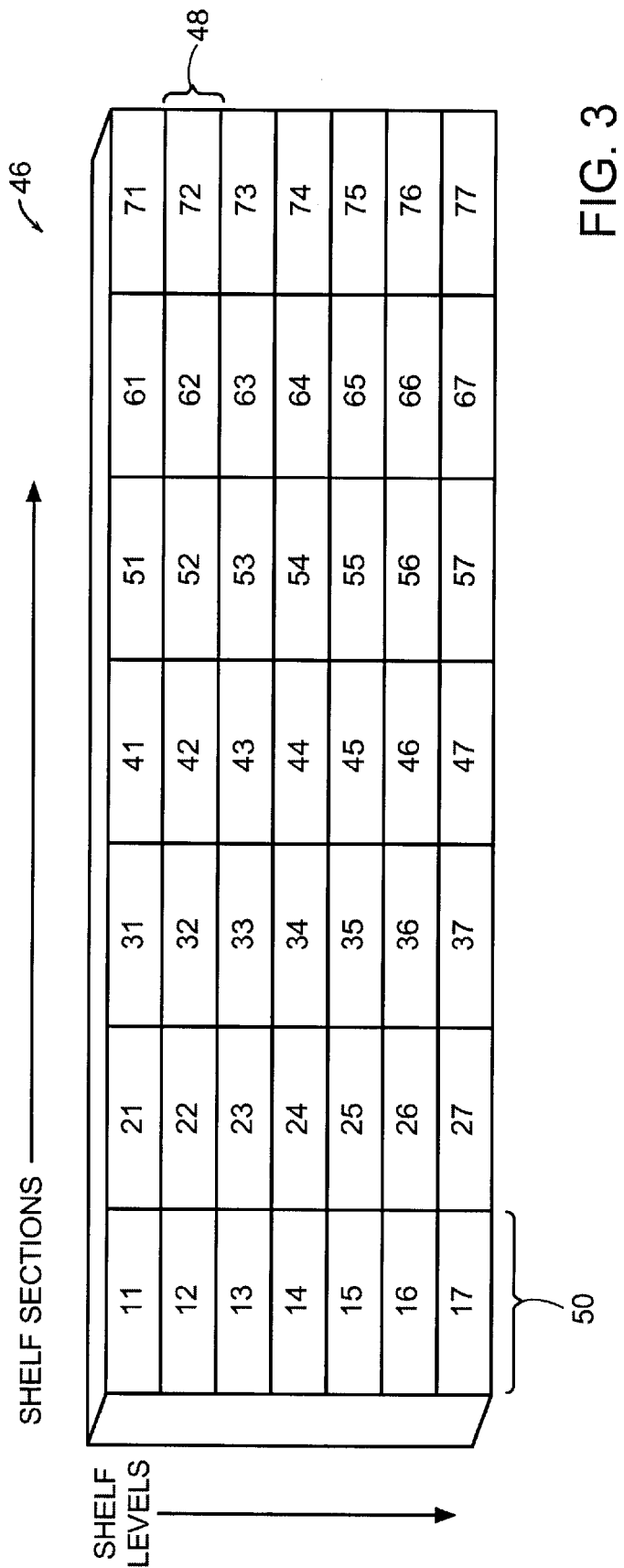
FIG. 3 illustrates a typical medical file folder and its component parts.

Referring now to FIG. 2 and FIG. 3, the organization of the active file storage 18 is shown in more detail. For the purposes of the present discussion, the active file storage 18 is advantageously localized to a single file room. However, the principles of the present invention are application to file storage configurations of all types without limitation. The file room includes several steel shelf units 46, organized and arranged in an optimal manner to form aisles, to maximize the use of available space. Each shelf unit 46 includes a plurality of shelf levels 48 and shelf sections 50. Shelves of this type are typically eight feet high and accommodate six to ten shelf levels. Also, each shelf section has a typical length dimension in the range of 30 inches to 48 inches. The shelf unit shown in FIG. 2 can therefore be considered exemplary. The shelf manager system 10 tracks the fullness of each shelve independently, so there is no need to have all the shelf units be uniform in height or length.

The file folders 52 stand freely on the shelf and preferably fill a shelf section most efficiently from left to right, rather than being stacked from bottom to top, although the present invention is not limited to the method the shelves are filled.

The shelf arrangement may include vertical file supports or vertical file guides 53 utilized to provide support to the file folders in sections which are less than full or to otherwise subdivide a shelf section, as will be described in what follows.

In the preferred embodiment of the present invention, the file room is subdivided into a number of subsections, and the subsections are advantageously designated by unique numbers or other indicia. Also, it is not required for the subsections to be the same width as shelf sections. In FIG. 2, the shelf subsection 54 which shows the identifying number "20" is smaller than one shelf section width, while the shelf subsection 56, 58 which shows the identifying number "21" is larger than a section width. As a third example, the subsection 60, which shows the identifying number "28" is exactly equal to a subsection width. FIG. 2 also illustrates that shelf subsections need not be constant in width. Over time, some subsections will expand and some sections will contract, because the thickness of individual file folders will vary.

In contrast, FIG. 3 shows an alternative shelf arrangement in which the subsections are equal in width to the shelf sections. In both shelf arrangements shown in FIG. 2 and FIG. 3, each subsection has a unique identifier, allowing the subsection to be tracked independently of the other shelf subsections. Also, each shelf subsection may advantageously be bar coded so that its location may be tracked by the shelf manager system 10.

In the preferred embodiment, the file folders 52 are organized according to the terminal digit filing system, which is widely used in many industries, particularly the medical field.

In the case of a typical medical center 12 such as a hospital, patient file numbers are issued sequentially and are never reused. It would not be uncommon for a large hospital to have issued more than a million sequential patient numbers over the years. In such a case, a newly issued file number might typically be "123-45-67," which would represent the $1,234,567^{th}$ patient to enter that hospital.

Terminal digit filing seeks to distribute the file folders 52 evenly in the total space available in the active file storage 18. Under this system, the active file storage 18 is divided, initially, into 10,000 even sections. The first division of the file space consists of 100 main sections representing the last two digits, 00 to 99, of a sequentially-issued number series of indeterminate length. These last two numbers are called the terminal digits (TD). For example, in the number 123-45-67, the terminal digits are "67." The "6" is the first terminal digit, representing ten percent of the total available file space; it is usually signified by the middle position color band on a side tab folder with three positions of color bands, manufactured for open shelf filing. The color coding of file folder 52 will be described in more detail in what follows and further on with reference to FIG. 4. The "7" is the second terminal digit, representing one percent of the total available file space; it is usually signified by the bottom position color band on a side tab folder with three positions of color bands, manufactured for open shelf filing.

The 100 terminal digit sections, 00 to 99, are each divided into 100 subsections, each subsection designated by two digits, 00 to 99, called the middle digits (MD). In the example 123-45-67, the middle digits are "45." The "4" is the first middle digit, representing 0.1 percent of the available file space; it is usually signified by the top position color band on a side tab folder with three positions of color bands manufactured for open shelf filing. The "5" is the second middle digit, representing 0.01 percent of the available file space. Unless the active file storage 18 is unusually large, designed to accommodate several hundred thousand to a million or more file folders 52, it will not usually be necessary to add a fourth color band to represent second middle digit.

The first three digits, "123" in the example number 123-45-67, are called the tertiary digits and are filed in sequential order after the file folder 52 is placed in terminal digit and middle digit order. If all the numbers in a series of 1,234,567 numbers were in the same file space, the tertiary digits in this example would designate the $123^{rd}$ folder filed in sequential order in the "45" middle-digit subsection of the "67" terminal-digit section.

Terminal digit filing uses color-coding to identify files belonging to the same section or subsection. Using terminal digit filing, it is almost impossible to misfile a file folder, because of the color bands associated with each file. If a file folder 52 is misfiled, it will attract attention because of its different color-band pattern compared with the other file folders 52 for that subsection. Using color coding to represent both of the terminal digits and the first of the middle digits of a sequentially issued number reduces the area of a possible misfile to 0.1 percent of the total active file storage 18. An active file storage 18 containing 150,000 folders would have 150 file folders 52 in each middle digit section with the same color bands. In the present example, terminal digit 7 is represented by the color brown in the bottom band; terminal digit 6 is represented by the color yellow in the middle band; and middle digit 4 is represented by the color purple on the top band. Typically, these 150 file folders 52 would fit on a single shelf, and any misfiles would be limited to this area or would show up as a clash of color in another section.

Using the terminal digit filing system, file numbers in each subsection should grow evenly, statistically. This is true to a point; however, the thickness of individual files varies according the content of the file, which can be greater or less than average, depending on the quantity of patient data.

Figure 4:
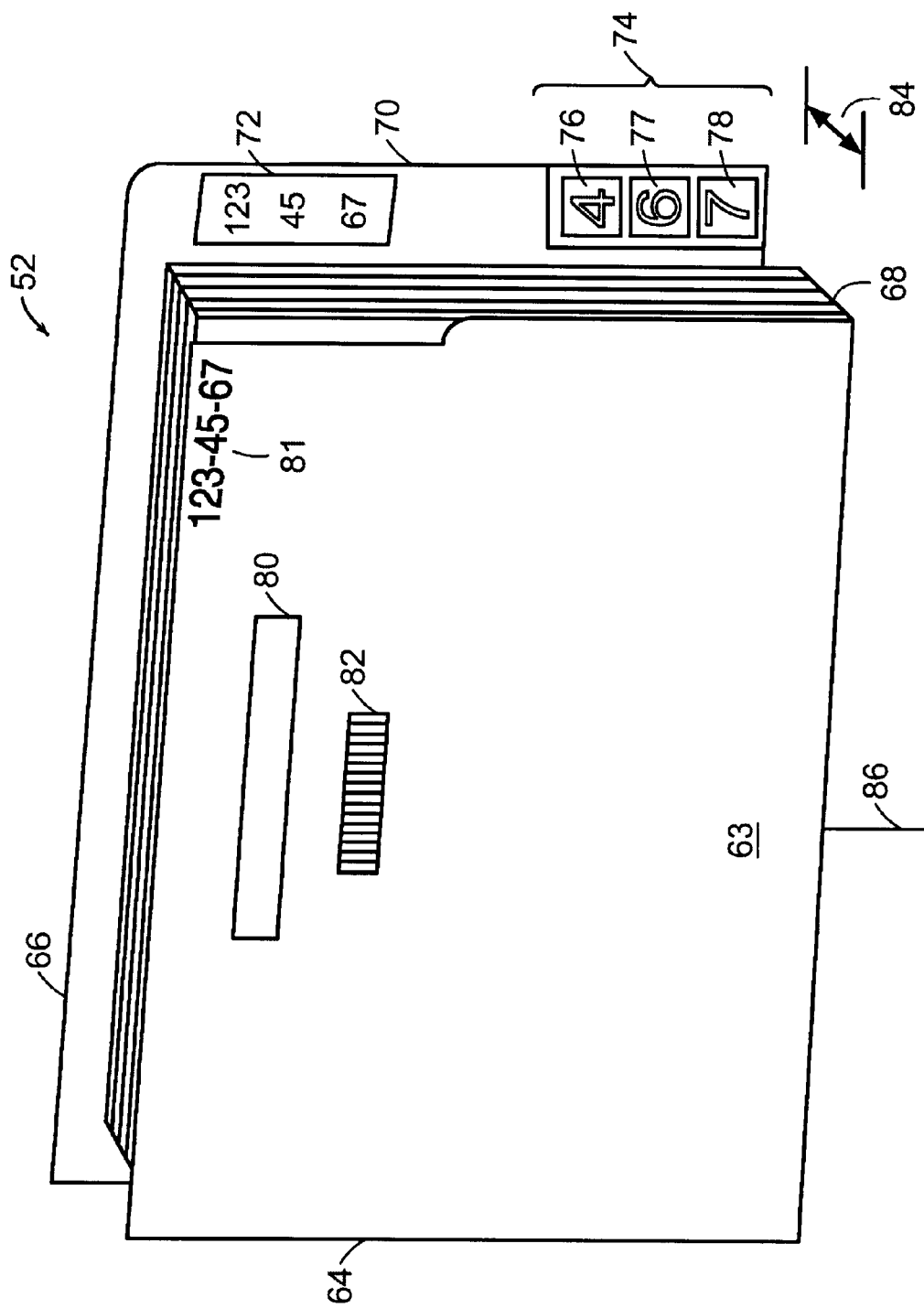
FIG. 4 illustrates an alternative active file storage shelving configuration.

Turning now to FIG. 4, a typical file folder 52 is illustrated of the type which may be effectively utilized with the present invention. The file folder 52 is preferably of the type produced and manufactured by Ames Color-File of Somerville, Massachusetts, for medical applications. The file folder 52 includes file stock substrate 63 folded into a front cover 64 and a rear cover 66. File content 68 is positioned between the front cover 64 and the rear cover 66, and consists of individual perforated paper sheets or pages of patient-related data. These pages generally include laboratory test reports, physician's notes and numerous types of pre-printed forms associated with the patient's processing, diagnosis, and treatment. The file content 68 is continually supplemented and updated and thus provides a historical record of the treatment of the patient. In cases where a patient is undergoing extensive or continual diagnosis and treatment, or in cases when the patient has been using the same hospital for many years, more than one volume or even several volumes may be required for a single patient.

The file content 68 is generally held between the file folder covers 64, 66 by a flexible paper fastener such as the one described in U.S. Pat. No. 4,084,911, which is hereby incorporated by reference.

The rear cover 66 includes a tab portion 70 for indexing the files. The tab 70 of the rear cover 66 extends beyond the edge of the front cover, so that, when the file folder 52 is in-file in the shelf unit 46 shown in FIG. 2, the tab 70 will be visible at a glance or from a distance. The tab 70 includes a patient number block 72 and the terminal digit number 74, which indicates the section wherein the file folder 52 is to be filed. The individual digits of the terminal digit filing system 74 are included on small color-coded squares 76, 77, 78, wherein specific digits correspond to specific colors, as previously described. In FIG. 4, the digits "467" represent the terminal digits "67" and the first middle digit "4." A file folder 52 with this designation will be properly filed in section "67" of the 100 sections of the file room and in subsection "4" within that section. The color-coding is visible from a distance, so that it is immediately apparent that the file folder 52 has been correctly filed with respect to the other file folders 52 having the same terminal digits, as discussed above. As part of the present invention, during manufacture of the file folder 52, the patient name, terminal digit numbers and color-coded squares may be provided by means of direct printing on the substrate 63 of the file folder from a digital color press of the type manufactured by Indigo N.V. of Maastricht, The Netherlands, which utilizes liquid toner for high speed color printing. This embodiment of the present invention will be described in more detail further on.

The front cover 64 includes a patient name block 80 well as a second patient number block 81 to provide additional file identification indicia when the file folder is removed from its shelf. The front cover 64 also includes a bar code label 82, which is utilized by the shelf manager system 10 of the present invention for tracking data about the file, as will be described in what follows.

The file has an associated thickness measurement 84, which indicates how much file space a file takes up on a shelf, and this measurement is used by the shelf manager system 10 to create a file purge list. The file content 68 consists essentially of single sheets of paper, which have an average thickness of 0.01 inches. The thickness 84 of the file folder 52 has been found to average approximately 200 pages per inch, including the thicker front cover 64 and rear cover 66 with the tab 70. It is within the scope of the present invention to provide measurements of the thickness 84 of file folders directly by means of an electronic caliper or the like.

In the preferred embodiment of the present invention, it has been recognized that a file folder's weight 86, indicated by the arrow in FIG. 4, is proportional to its thickness 84; therefore, by weighing a file, and by making a simple mathematical computation, a thickness determination can be made. Specifically, one sheet of paper weighs approximately 0.01 pounds, and an empty file folder weighs approximately 0.1 pounds. A file folder having a thickness 84 of one inch also has a folder weight 86 of approximately 2.0 pounds. Although it is recognized that paper sheets and folder stock are available in a range of thicknesses, the averages presented here have been found to work effectively in achieving the objectives of the present invention.

Figure 5:
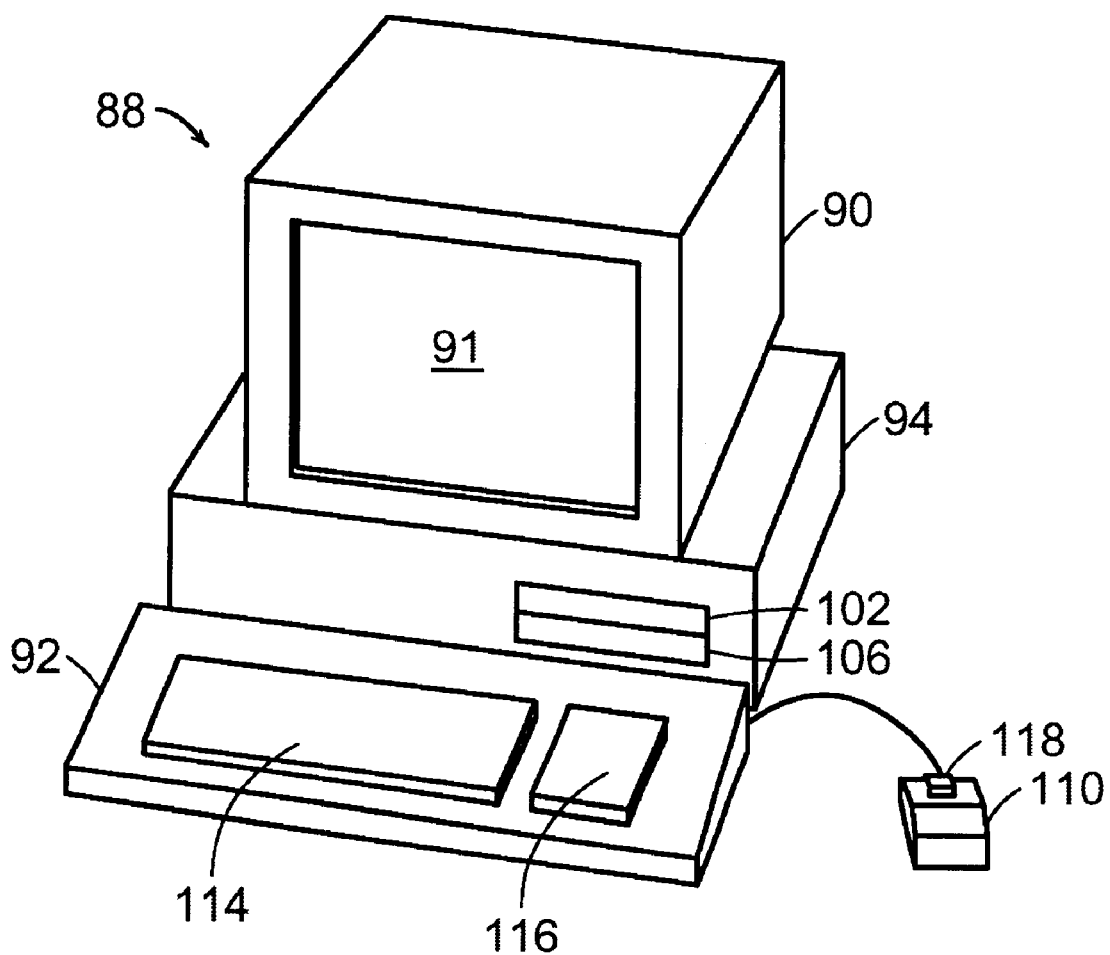
FIG. 5 illustrates a personal computer system of the type which may be used to implement the present invention.
Figure 6:
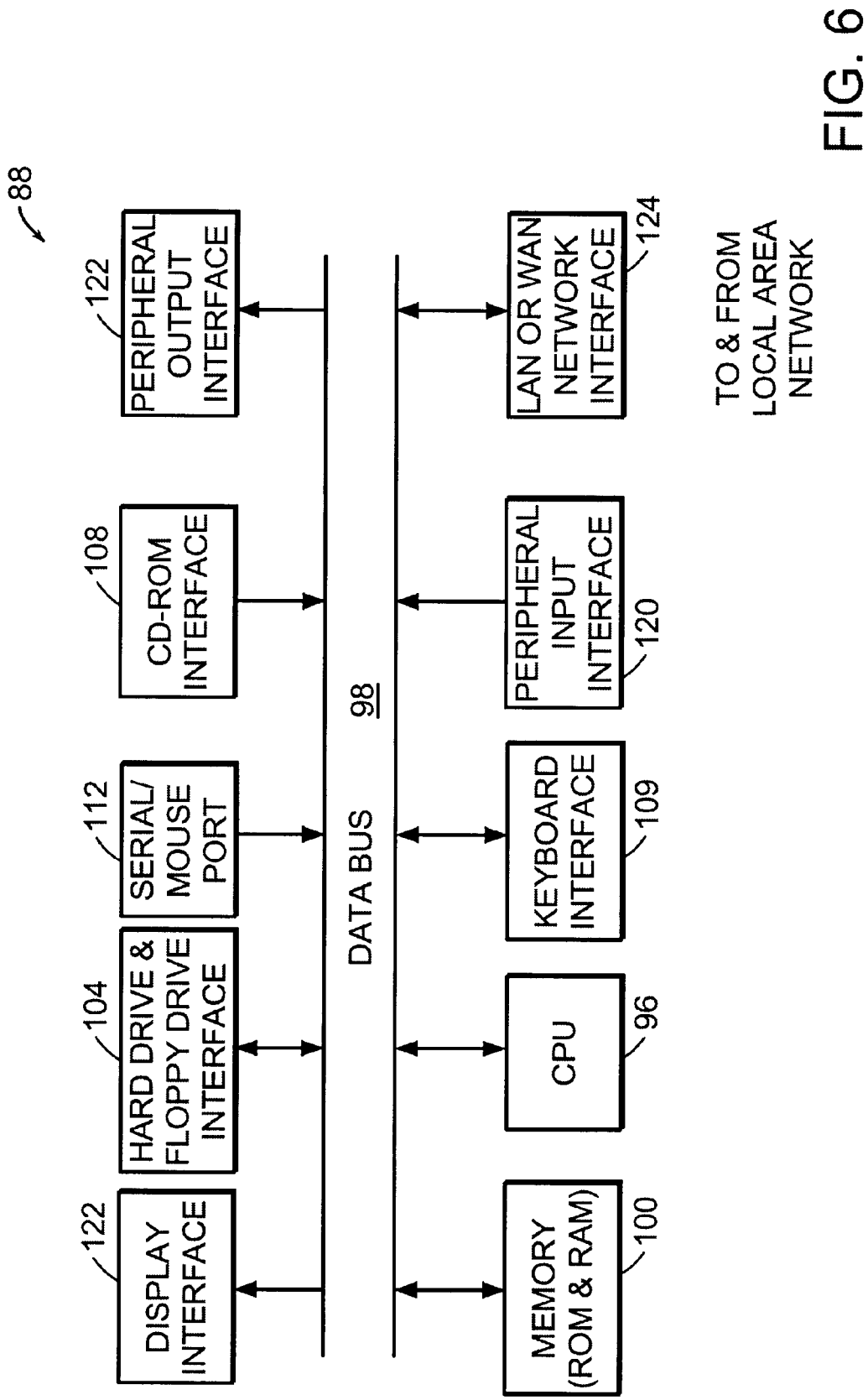
FIG. 6 illustrates the internal components of the computer system shown in FIG. 5.

Referring now to the FIG. 5 and FIG. 6, a computer system 88 is illustrated which is incorporated in the present invention. The computer system shown in FIG. 5 and FIG. 6 is a standalone desktop computer system, such as a Dell Optiplex Pentium-II personal computer manufactured by Dell Computer Corporation of Round Rock, Tex. However, it is to be understood that other general purpose computer systems may be advantageously used in the present invention.

The major physical components of the computer system 88 are a display monitor 90 including a display screen 91, a keyboard 92, and a computer base unit 94 that internally houses a number of electronic circuits including central processing unit (CPU) 96. As shown in FIG. 6, the computer system 88 comprises a bidirectional data bus 98 interconnecting the CPU 96, a plurality of input devices, output devices, and the system memory.

The base unit includes internal memory 100, on a circuit card therein, typically comprising random access memory (RAM) for temporary storage of information and read only memory ROM for permanent storage. Also housed in the base unit 94, the computer system 88 includes one or more mass storage devices in the form of hard disk drives and floppy disk drives 102, which are connected either directly or indirectly to the computer's data bus through a hard drive & floppy drive interface 104. Additional mass storage is in the form of a conventional CD-ROM which is connected to the computer's data base through a CD-ROM interface 108. For descriptive purposes, the computers internal memory 100 and mass storage devices 102, 106 will be collectively referred to as "storage" when data can be stored in any type of data storage unit.

Computer input is provided by a conventional keyboard 92 connected to the data bus 98 through a keyboard interface 109, and also provided by a conventional mouse 110 connected to the data bus 98 through a serial/mouse port 112. The keyboard includes a plurality of alphanumeric keys 114 and may also include a dedicated numeric keypad 116. The mouse 110 includes at least one button-type switch 118 operated by a user of the system. A cursor is displayed on the screen 91 and its position is controllable via the mouse 110 or the keyboard 92, as is well known. Herein, the terms "click" and "clicked upon" are used to describe the situation in which a cursor is positioned over a screen object and the mouse button 118 or one of the keyboard keys 114 is pressed and, in some implementations, then released. The computer 88 also includes a peripheral input interface 120 for connecting additional input devices as will be described below.

Computer output is in the form of a conventional display monitor 90, having a CRT display screen, which is connected to the system bus 98 through a display interface 122. The display device need not be a separate display monitor, but may be housed in the same unit as the CPU processor 96. The computer 88 also includes a peripheral output interface 122 for connecting additional output devices such as printers as will be described in connection with FIG. 7.

Figure 8:
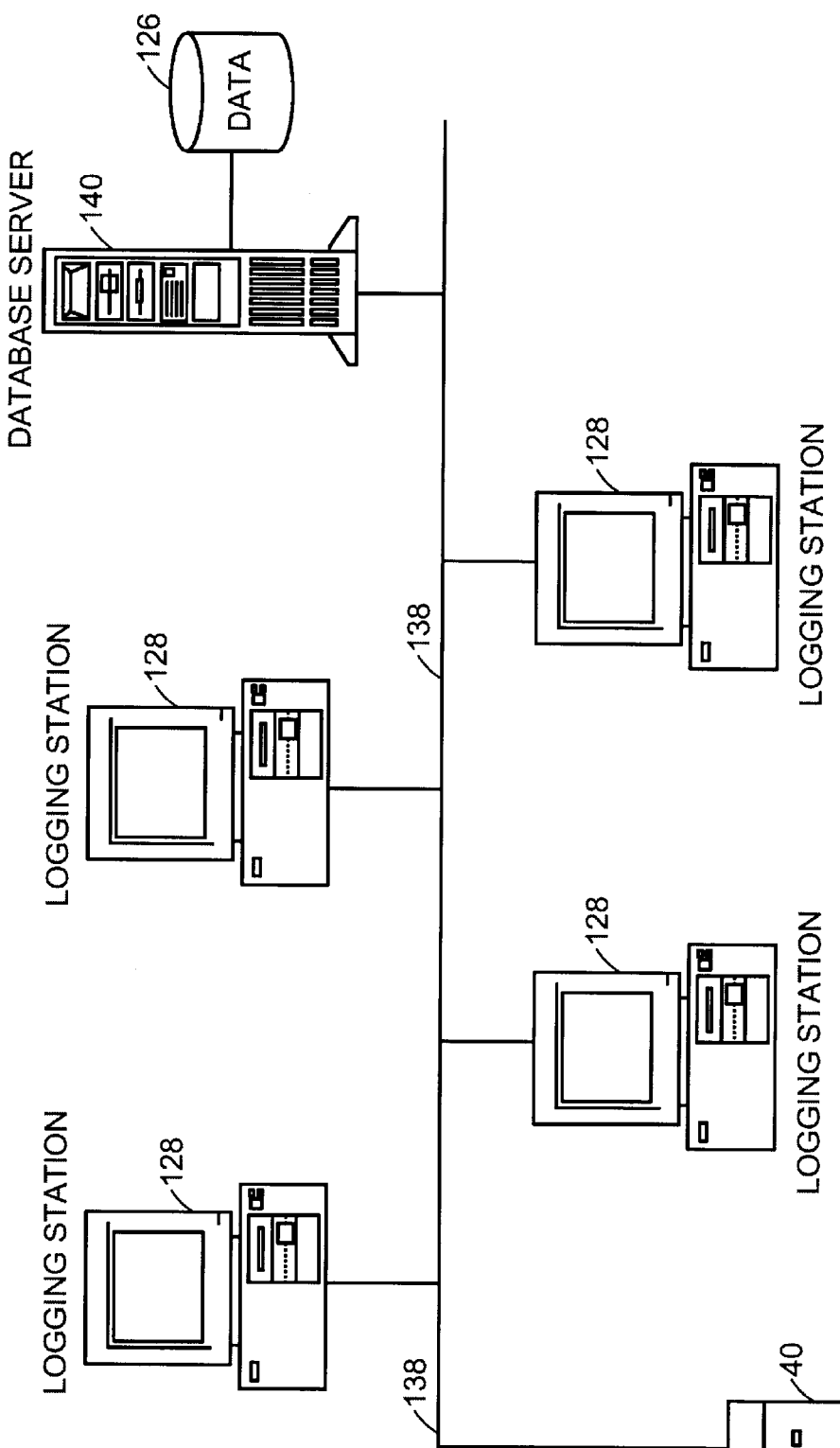
FIG. 8 illustrates a multiple logging station embodiment of the present invention incorporating a database server as part of a local area network.

The computer also includes a network interface 124 so that it may be linked to a local area network (LAN) or wide area network (WAN) as will be described in connection with FIG. 8.

In general operation of the computer 88, information in the form of control and data signals are received from the connected input devices. The signals are provided via the system bus 98 to the CPU 96 for processing, for storage on the mass storage unit 102, and for display on the display screen 91, or for output of other peripheral output device.

The computer system 88 further includes operating software stored in memory 100 or stored in mass storage 102 and then loaded into memory 100 when executed. The software includes an operating system for controlling and coordinating the computer system 88. The present invention, operating in conjunction with the computer 88, includes the capability to process data, graphics, and sound while providing a windowing environment for display on the display monitor screen 91. The operating system may be a Windows 95, Windows 98, or Windows NT 4.0 or later operating system developed and sold by Microsoft Corporation of Redmond, Washington.

The shelf manager system 10 is a file management tool particularized for managing medical file folders and incorporates a relational database 126 to perform this function. In the preferred embodiment, this relational database was developed utilizing Foxpro, created by Microsoft Corporation. Foxpro is an object-oriented data development system which provides tools for developing relational databases management systems and applications, which have the capability of organizing information into tables, editing that information, running queries, and running reports. The Foxpro product operates within the Microsoft Windows and DOS operating system environment and utilizes such features as pop-up dialogue boxes, which gives the user a choice of entering or modifying program parameters at key points while operating the database application. It is contemplated that other relational databases may also effectively be used to implement the principles of the present invention. Also, Visual Basic also available from Microsoft, is utilized for interfacing to an electronic scale and bar-code scanner, which is described in what follows.

Figure 7:
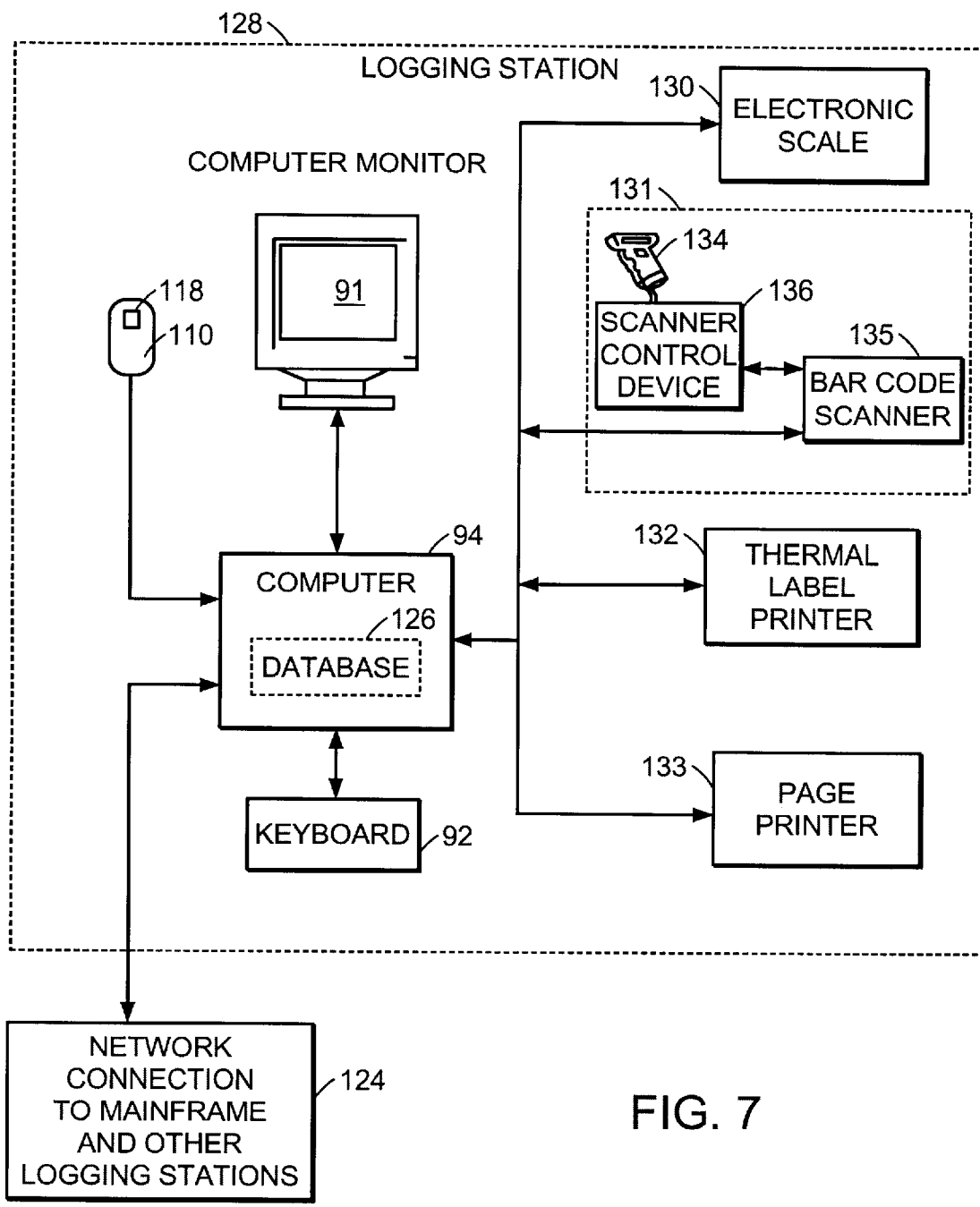
FIG. 7 illustrates a logging station and its various components.

Turning now to FIG. 7, a logging station is shown as used in the present invention. Whenever a file folder 52 is removed from or redeposited into active file storage 18, the logging station 128 is used to identify the file folder 52 and to determine and update the file folder thickness 84 data by determining file folder weight 86. The logging station 128 includes the personal computer 88, an electronic scale 130 input device, a bar code scanner 132 input device, a thermal label printer 134, and a page printer 135. The various components of the logging station 128 are advantageously located contiguously on a table-top location to provide for the cooperative operation of the various peripheral components.

The electronic scale 130, bar code reader 131, thermal label printer 132, and page printer 133 are coupled to the computer 88 through the respective peripheral input interface 120 and the peripheral output interface 122.

The electronic scale 130 is preferably of the type available from Salter Weigh-Tronix Co. of London, England. The scale is a bench type scale having the capability of determining file folder weight 86 to a precision of 0.01 pounds. This corresponds to the weight of a single page of paper. Thus the addition or subtraction of single pages of a file folder 52 may be accurately tracked using the scale. The computer 88 uses the weight 86 measurement to compute the current thickness 84 of the file folder 52.

The bar code reader 131 includes a standard gun type scanner 134 manufactured by PSC, Inc. and attached to a wedge decoder 135 manufactured by Percon, Inc. of Mount Wilson, Oreg. The bar code reader 131 is used to scan the bar code label 82 on a file folder 52 so that it may be accurately tracked by the shelf manager system 10. It is anticipated that portable bar code scanners may also be used. Furthermore, the bar code reader 132 incorporates a scanner control device 136 and supporting software. When the scanner is NOT READY or if a SCANNING ERROR occurs, the scanner control device 136 shuts off the scanner and the application software provides an alarm to signal for appropriate intervention by the user.

The bar code label printer 132 is a direct thermal printer manufactured by Eltron, Inc. The shelf manager system 10 automatically prints bar code labels as required or whenever the operator manually types a record number. It is possible for one patient's folder to occupy one, two or several volumes. The shelf manager system 10 of the present invention automatically determines when a second or additional volume should be created. A volume creation subroutine automatically determines if the file folder thickness 84 exceeds a predetermined threshold value, and in response to this indication, the shelf manager system 10 initiates a file creation subroutine that automatically prints a file label for the new file folder volume. This subroutine will be discussed in connection with FIG. 12.

In the preferred embodiment, the logging station 128 is a standalone system, but it may also be part of a local area network, or a client-server network. Referring to FIG. 8, implementation of the present invention as part of an Ethernet network 138 is illustrated. In the figure, a number of logging stations 128 are shown, indicated as computer workstations, with the attached peripherals not shown for simplicity. It is conceivable that ten or more logging stations may be required to manage file folders in a major medical records storage facility 16. Also connected to the Ethernet network 138 is the hospital mainframe 40, which allows the individual logging stations to retrieve basic patient data from the hospital mainframe 40 and to update data to the hospital mainframe 40. The network configuration also includes a database server 140 which controls and provides network access to the database 126.

Figure 9:
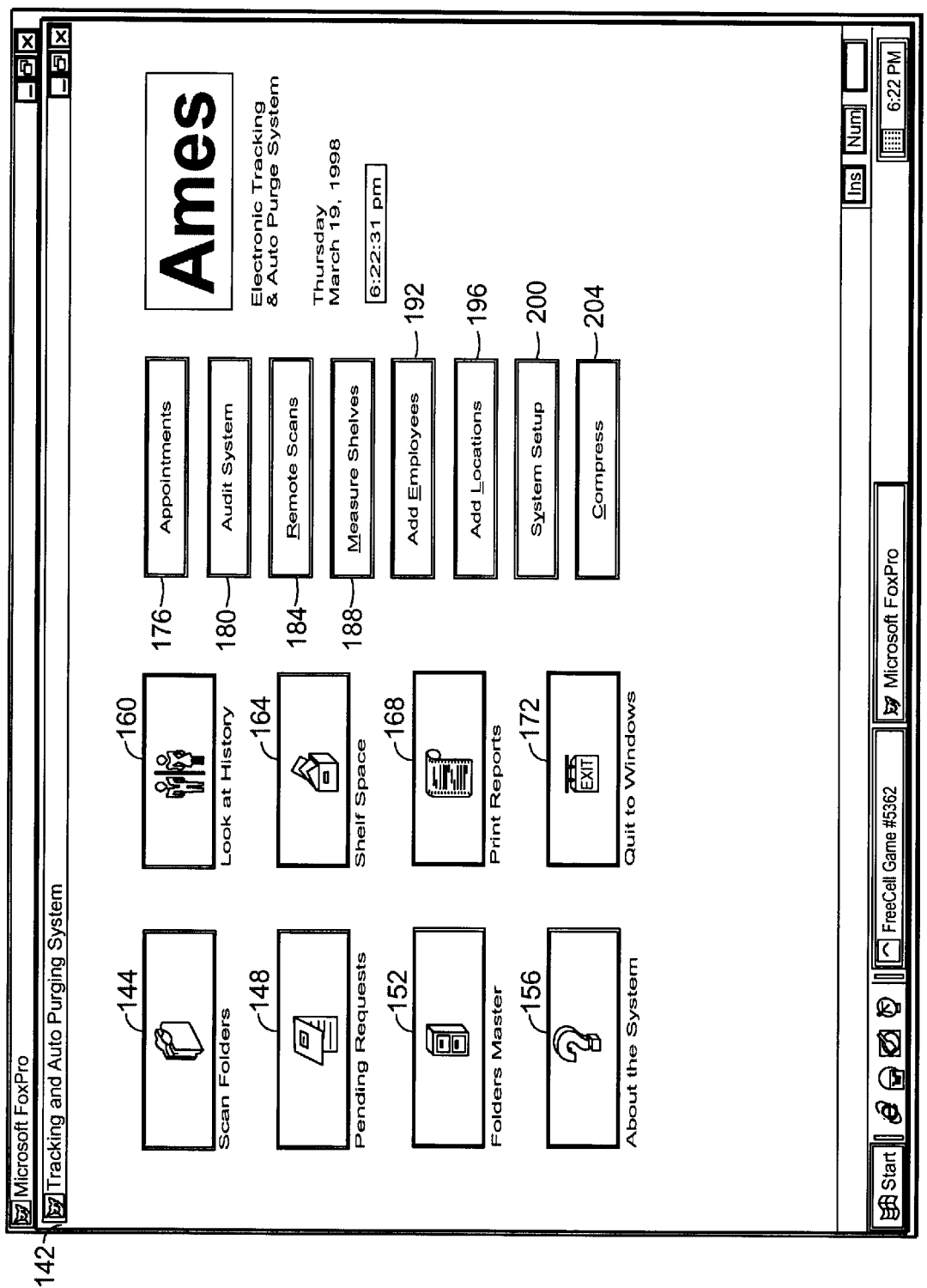
FIG. 9 illustrates the graphical user interface screen for the main menu of the present invention.
Figure 10A:
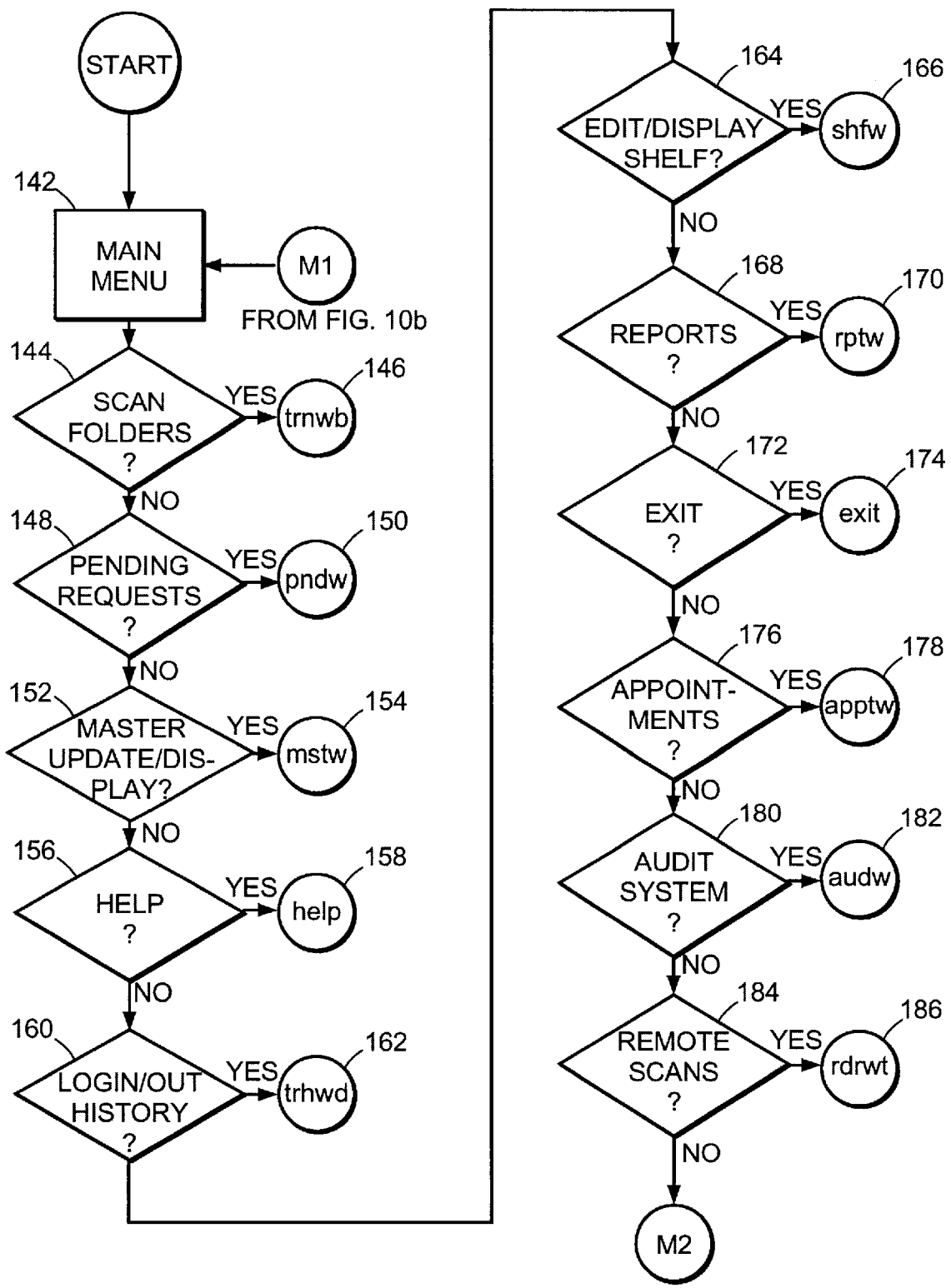
FIGS. 10a–10b together comprise a flowchart of the main menu function of the present invention.
Figure 10B:
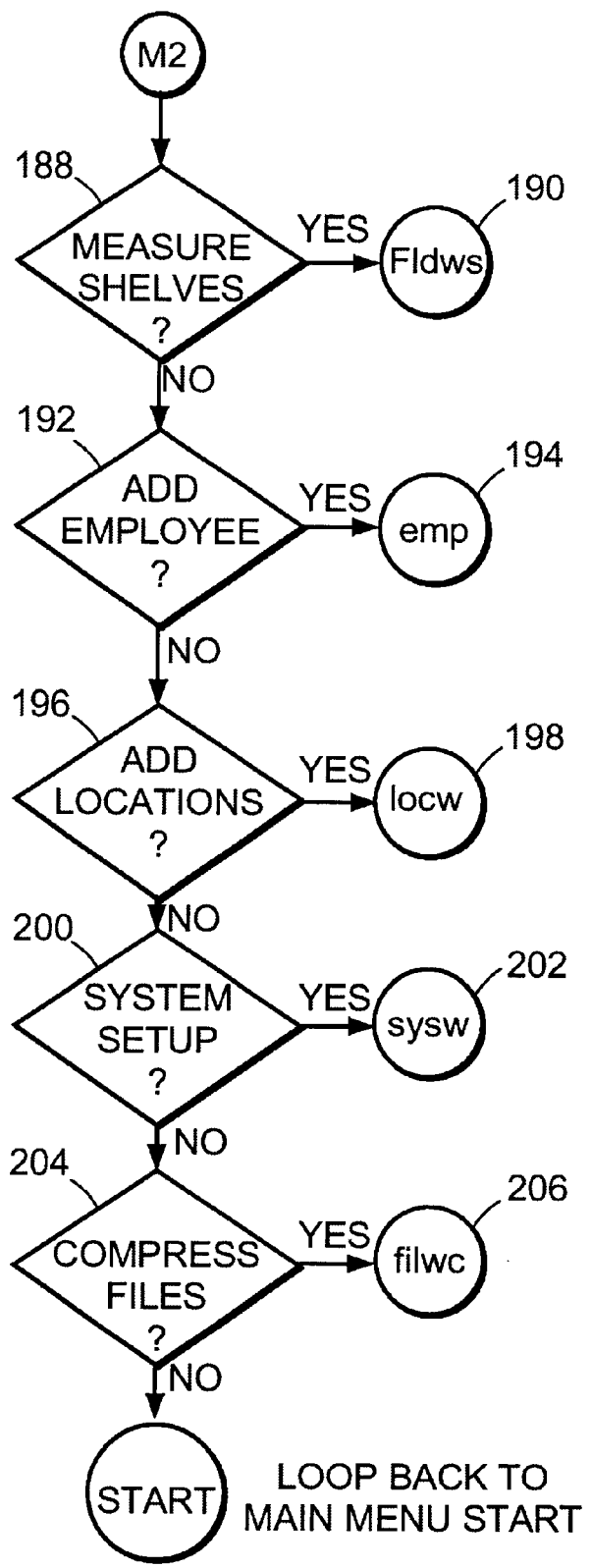
Figure 11:
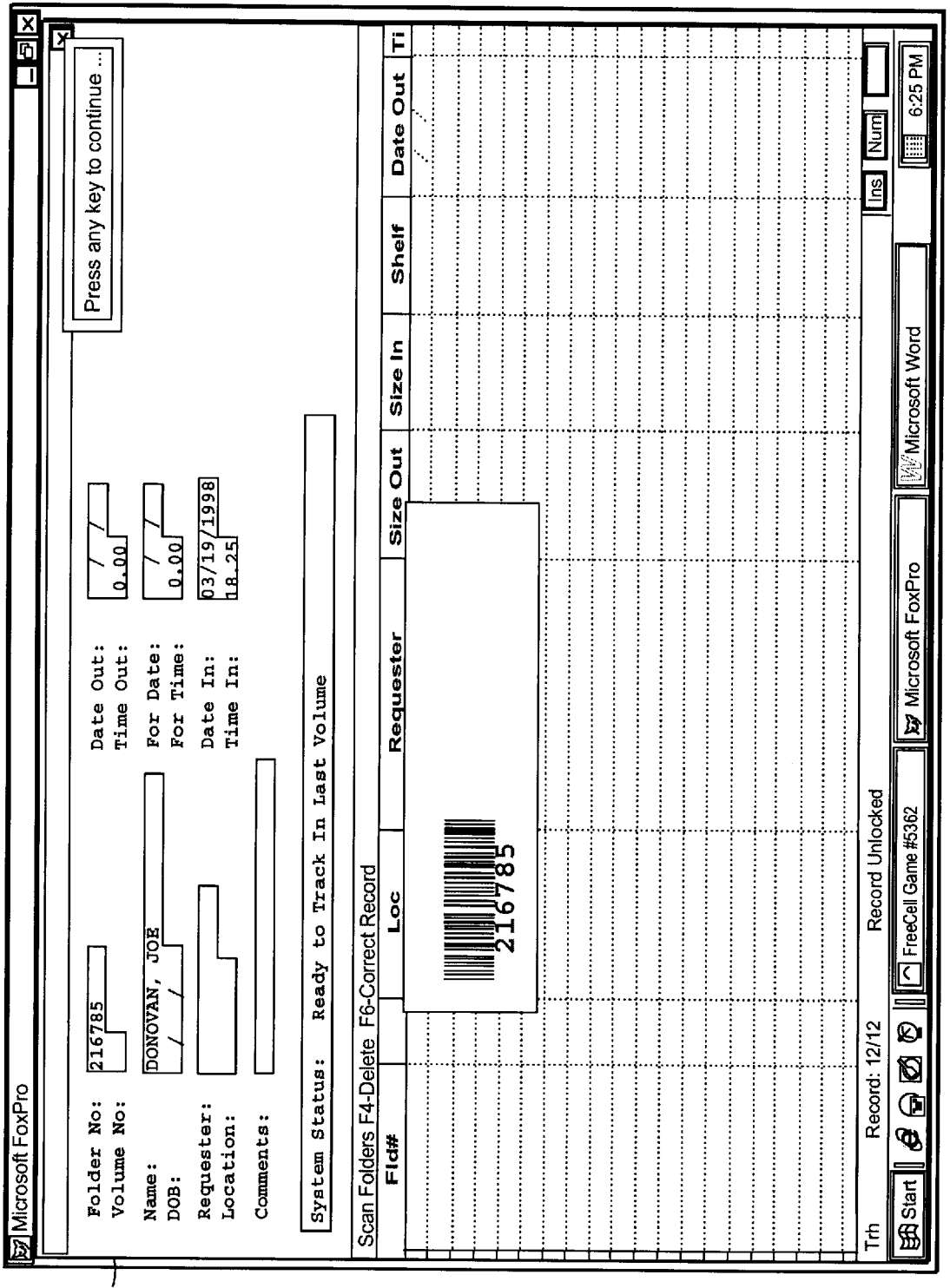
FIG. 11 illustrates the graphical user interface screen for the scan folders subroutine of the present invention.
Figure 12A:
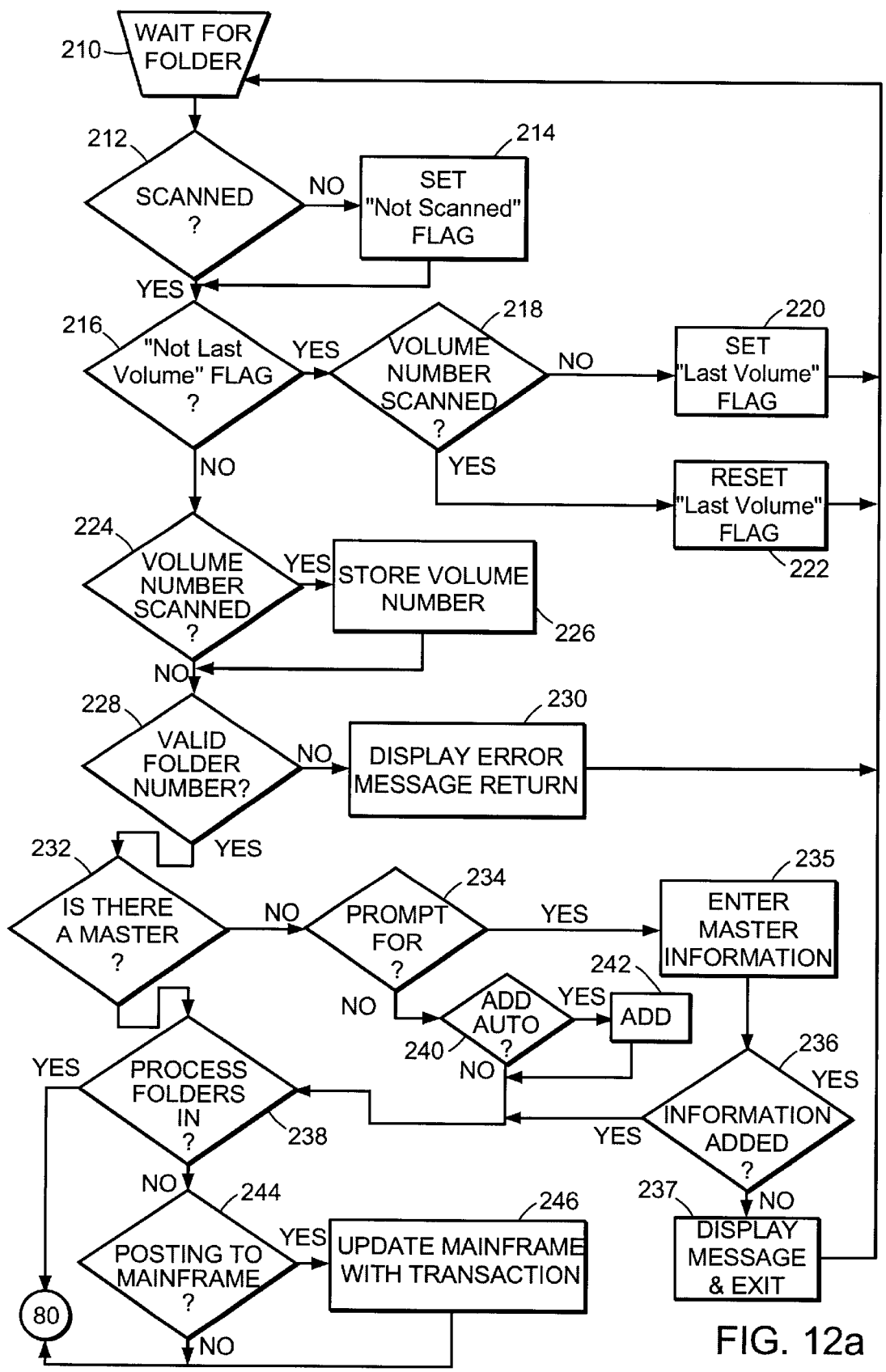
FIGS. 12a–12e together comprise a flowchart of the scan folders subroutine of the present invention.
Figure 12B:
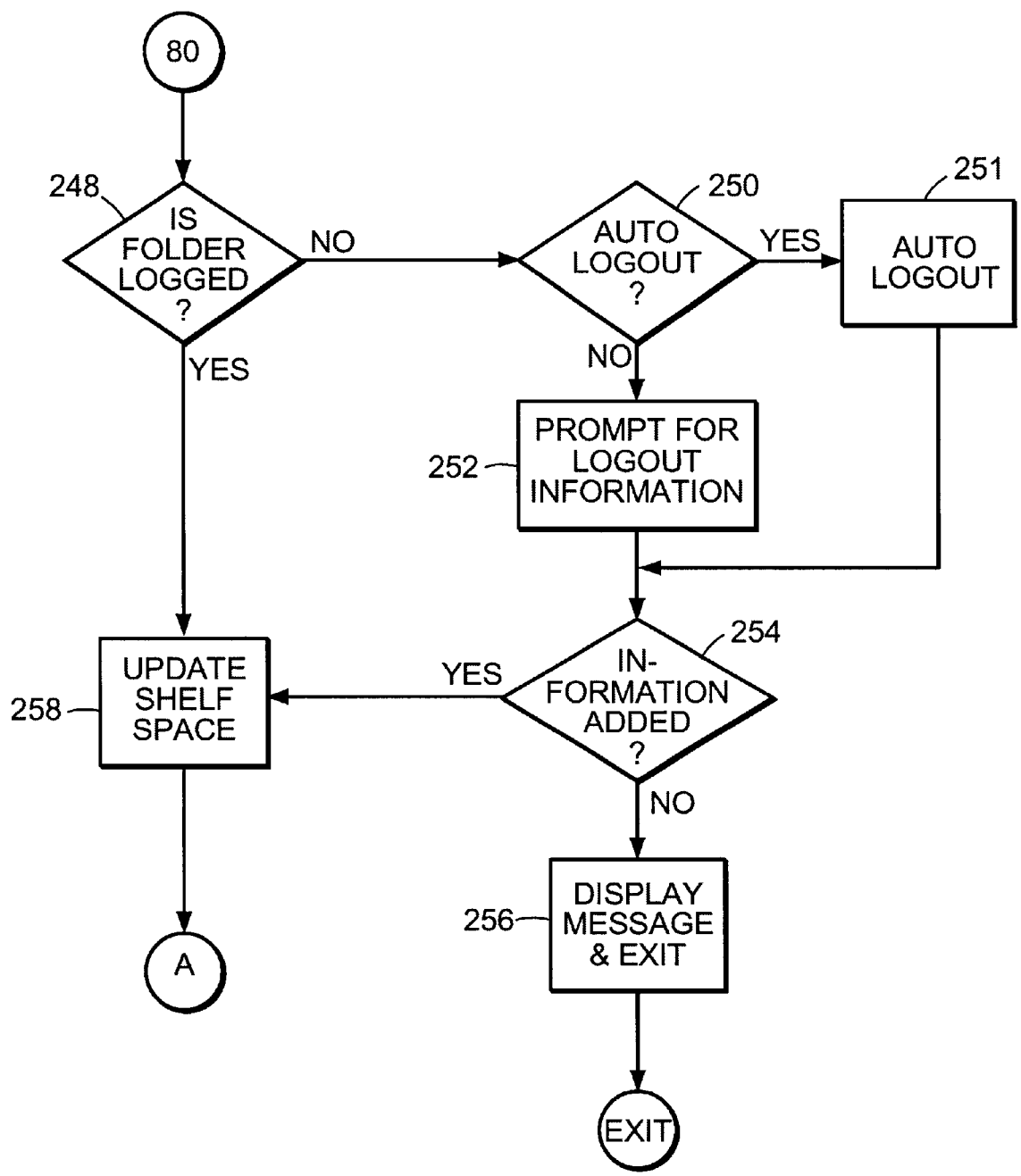
Figure 12C:
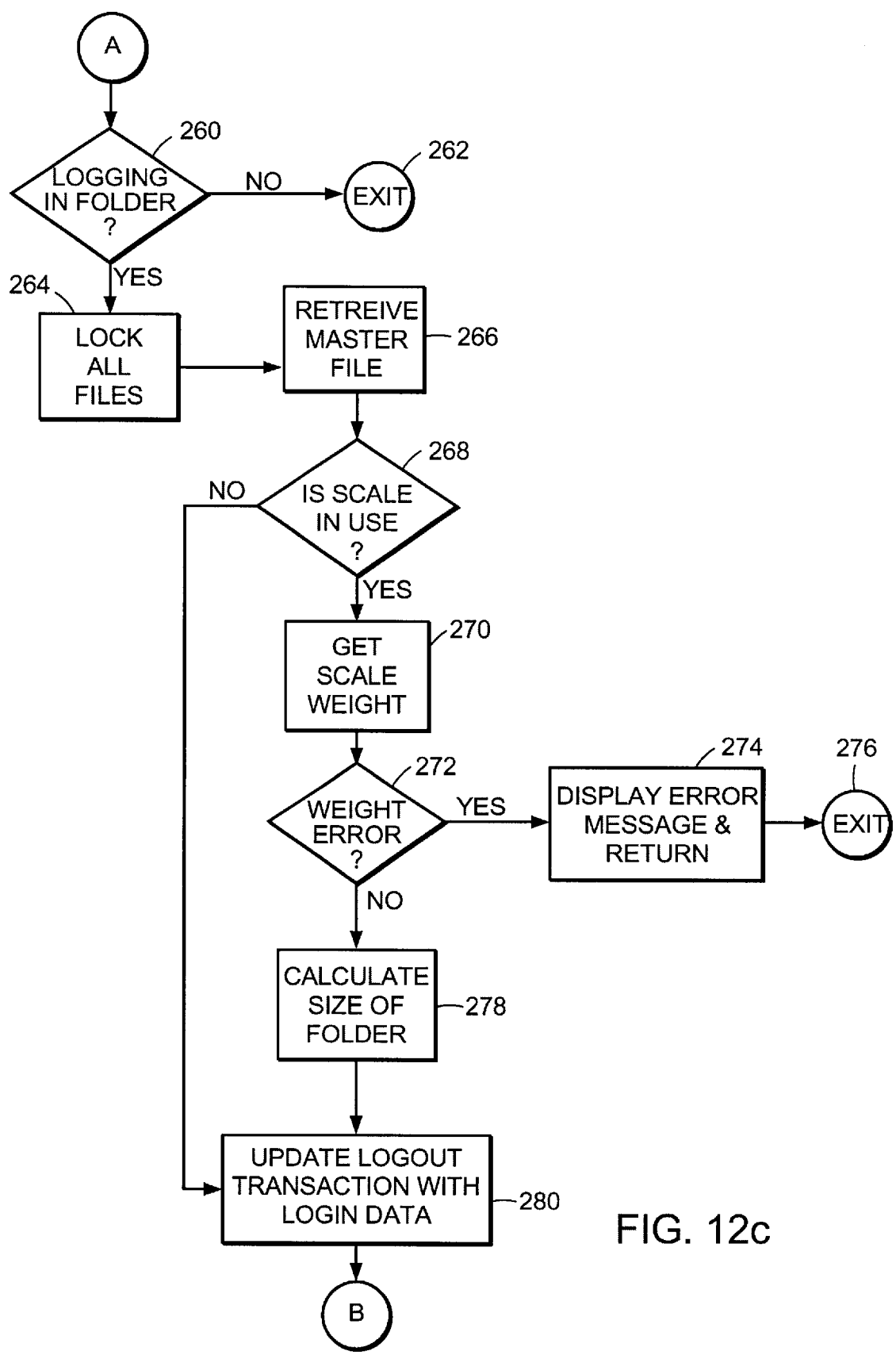
Figure 12D:
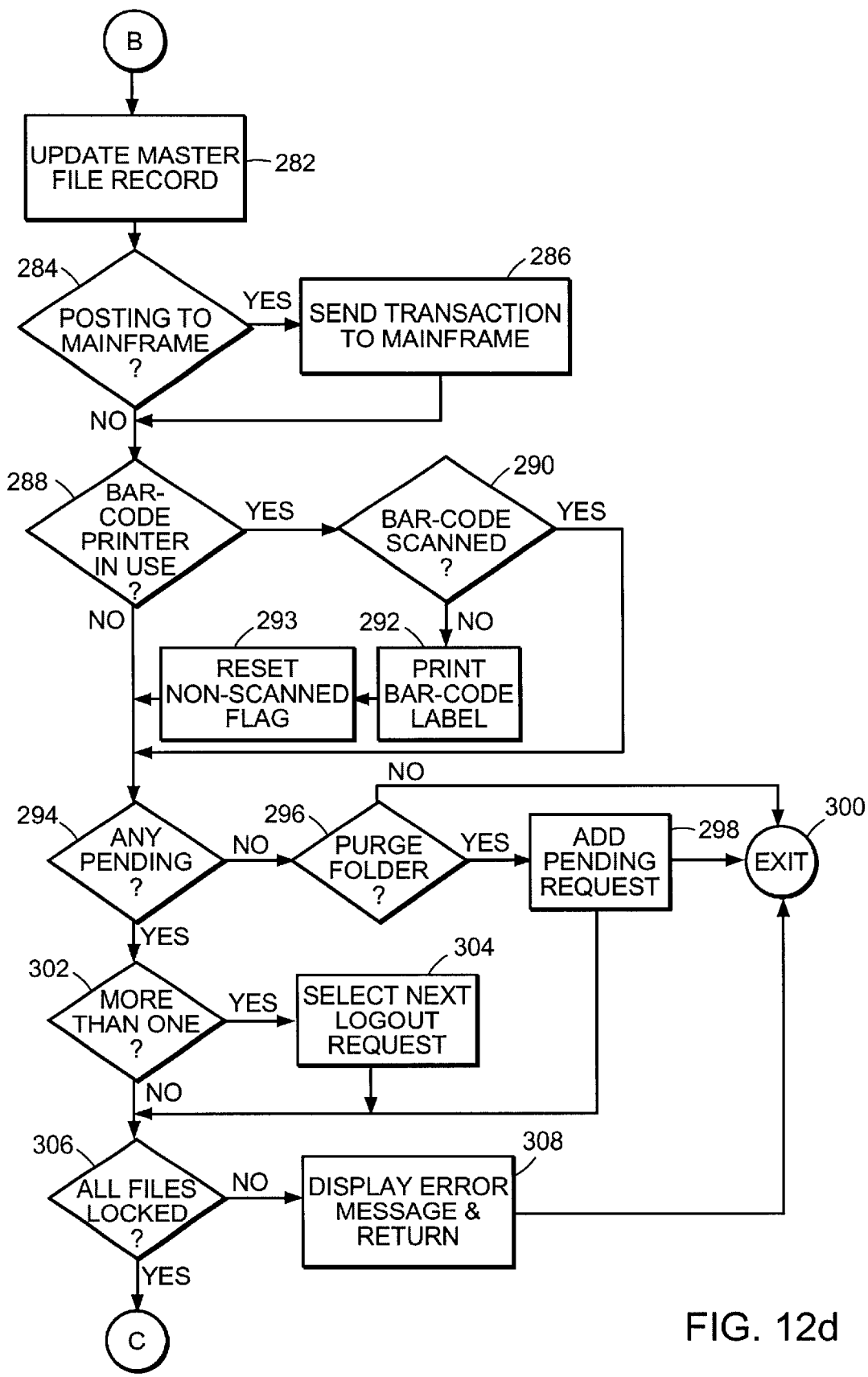
Figure 12E:
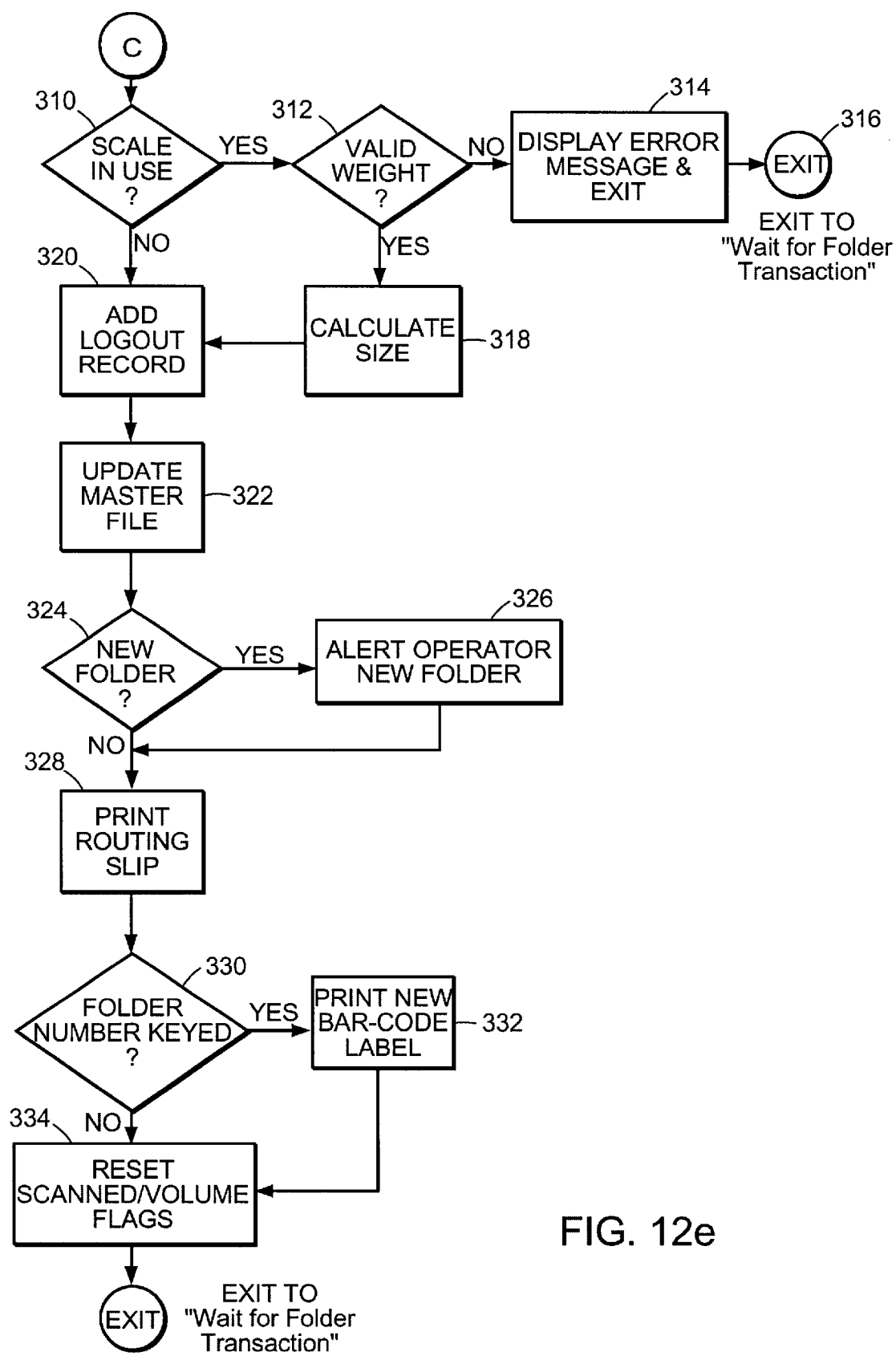

Turning to FIG. 9, the user interface screen for the system menu 142 is shown as seen on the display device 91. The system menu 142 includes three columns of user-selectable screen buttons which call up various program functions. The screen buttons are selectable in a conventional manner by moving a mouse-controlled cursor around the display screen 91 until the cursor is positioned over the screen location corresponding to the chosen function and then by clicking the mouse 110 to select that program function. When a program function is selected in this manner, the system calls up that subroutine to which the system call is directed, and the subroutine is executed, providing the user with other screens which provide requested information or allow for the input of data or parameters necessary for that subroutine function. After completed execution of the user-selected functions, the main menu program will loop back to the system menu screen 142. The flowcharts in FIG. 10a and FIG. 10b show the program functions associated with the main menu 142 for each of the various screen buttons shown in FIG. 9. The individual subroutines will be discussed in more detail in what follows.

The scan folders button 144 calls the subroutine TRMWB 146, which allow the user to log out folders to various locations including off-site storage locations, and allows the user to log folders back into the system. This folder master function is described with more particularity in connection with FIGS. 12a–12e.

The pending requests button 148 calls the subroutine PNDW 150, which provides the user with screens to enter requests for folders and track those requests. The pending request function is described with more particularity in connection with FIGS. 15 and 16.

The folder master button 152 calls the subroutine MSTW 154, which provides basic information about a folder such as the last time logged out, the date of last log-out, the requestor, and the location, etc. This folders master function is described with more particularity in connection with FIGS. 17 through 19.

The about the system button 156 calls the HELP subroutine 158, which provides information about how to use the system to the user.

The Log-in/Log-Out History button 160 calls the subroutine TRHWD 162, which provides the user with a history of all folder activity. The Log-in/Log-out History function is described with more particularity in connection with FIGS. 20–21.

The shelf space subroutine 164 calls the subroutine SHFW 166, which displays statistics of all shelf space, including shelf size, inches used, and locations. It allows the user to edit existing data and enter new information about shelf spaces and locations. The shelf space function is described with more particularity in connection with FIGS. 22–23.

Figure 25:
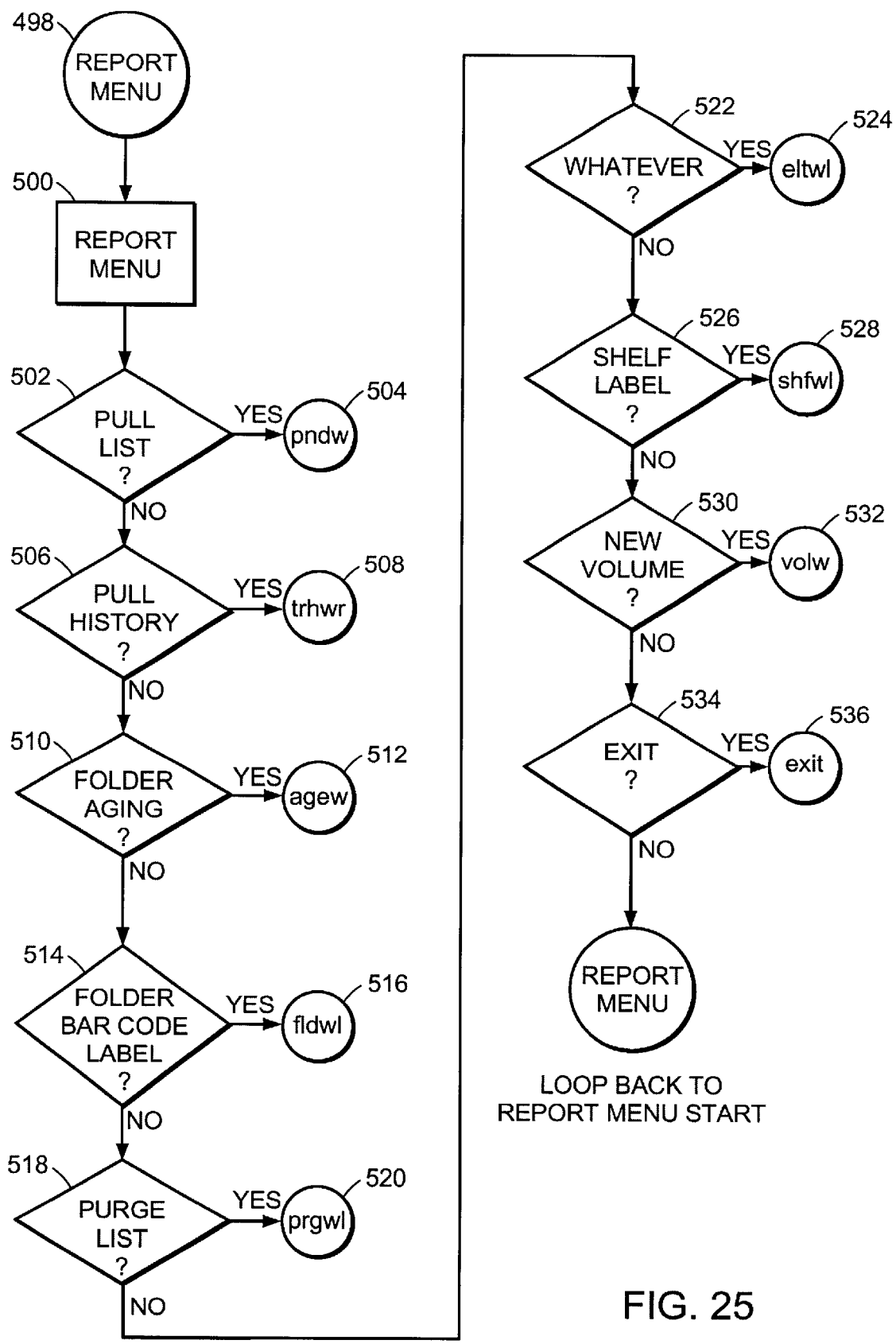
FIG. 25 is a flowchart of the print reports subroutine of the present invention.

The print reports button 168 calls the subroutine RPTW 170, which allows the user to print reports, folder labels, shelf labels and new volume labels. The print reports function is described with more particularity in connection with FIGS. 24 and 25.

The quit to windows button 172 calls the exit subroutine EXIT 174, which exits the shelf manager application.

The appointments button 176 calls the appointment subroutine APPTW 178, which manually downloads any appointment information from the computer mainframe 40. The appointments function is described with more particularity in connection with FIGS. 26 and 27.

The audit system button 180 calls the import pull list subroutine AUDW 182, providing the with either a screen output of print output of errors detected is the database such as mismatched patient names and numbers. The audit system button 180 is described with more particularity in connection with FIGS. 28 and 29.

The remote scans button 184 calls the remote scans subroutine RDRWT 186, which allows the user to update the present location of folders logged out by using portable bar code readers. The remote scans function is described with more particularity in connection with FIGS. 30 and 31.

The measure shelf button 188 calls the measure shelves subroutine FLDWS 190, which allows the user to record, measure, label folders on each of the shelves. The measure shelf function is described with more particularity in connection with FIG. 32.

The add employees button 192 calls the add employee subroutine EMP 194, which allows the user to list all employees engaged in folder scanning along with their passwords. The add employees function is described with more particularity in connection with FIGS. 33 and 34.

The add locations button 196 calls the add locations subroutine LOCW 198, which allows the user to enter the locations for logged-out files, including those in off-site locations. The add locations function is described with more particularity in connection with FIGS. 35 and 36.

The system setup button 200 calls the system setup subroutine SYSW 202, which allows the user to set and modify the configuration parameters used by the system. The system setup function is described with more particularity in connection with FIGS. 37 and 38.

The compress button 204 calls the compress files subroutine FILWC 206, which is periodically used to reorganize and streamline all the application files. The compress function is described with more particularity in connection with FIG. 39 and 40.

Turning now to FIGS. 11 and 12a–12e, the scan folder subroutine is discussed in more detail. The scan folders subroutine allow the user to log-out file folders to various locations and log-in the file folders back into the shelf manager system 10. The scan folders screen 208 displays folder specific information such as folder and volume number, patient name, folder size upon leaving and returning to the file room, the shelf number where the folder is stored, and various date-related information.

In operation, following the flowcharts in FIGS. 12a–12e, the log-out subroutine begins with step 210, in which the program is waiting for a folder. The user places a folder 52 on the electronic scale 130 and scans the bar code label 82 with the bar code reader 131 or alternatively enters a folder number and volume number via the keyboard 92. In steps 214 and 216, the program determines if the folder was scanned; if not scanned, the system sets a flag. In step 216, as an option, a determination is made whether the file folder is the last volume, by scanning the volume number in step 218. If there is no volume number, the last volume flag is set in step 220, indicating that the file folder has only one volume. If there is volume number, the last volume flag is reset in step 222. The volume number is scanned in step 224 and the volume number is stored in step 226.

For the folder number scanned from the bar code label 82 or entered via the keyboard 92, the system compares the number in step 228 to valid file number criteria. If the file number is not valid, an error message is returned to the screen 208.

Before a folder can be scanned, a determination is made in step 232 whether there is a master record for the current file folder 52. If there is no master record, the user is prompted in step 234 to enter basic master record information such as the patient's last and first name in step 235. If the master record was present, or if the information was not added in step 236 to the master at this time, the program exits in step 237. If the master record was present in step 232, or if the information prompted for was entered, the information is added in step 236, the program proceeds to step 238 to process the folder in. Optionally, the system can automatically create a master file without operator intervention via the add auto step 240 and the add 242 step.

The program has the provision determining in step 244 if there is a computer mainframe, and if so, updating the master patient information in the mainframe in step 246.

The subroutine next determines in step 248 if the folder has been logged or not. If the folder has not been logged, a determination is made if there has been an auto logout in step 250. If yes, the system automatically creates a logout 251. If no, the user is prompted to enter logout information in step 252. If the information has not been properly entered in step 254, the program exits in step 256. If the folder was logged in step 248 or if the information has been entered in response to the prompt, the shelf space field of the record is updated in step 258.

The log-in part of the subroutine begins with step 260, where a determination is made whether the file is being logged in. If the file is not being logged in, the program exits in step 262. If the file is being logged in, the program first locks all files in step 264 and retrieves the master file in step 266.

The next part of the subroutine directly concerns the weighing of the file folder 52 on the electronic scale 130 and the determination of the folder's size. First, in step 268, it is determined if the scale 130 is in use, indicating that the file folder 52 is present. If the scale 130 is in use, the weight is read in step 270. In step 272, a determination is made whether the weight measurement is valid or whether an error occurred. If there was a weight error, an error message is displayed in step 274 and the program exits in step 276. If there is no weight error, the size of the file folder 52 is calculated in step 278. The screen and record are then updated with the next login data in step 280. If the scale 130 was not in use in step 268, the program proceeds directly to the update step 280.

The master file record is next updated with the new size information in step 282, and if the shelf manager system 10 is connected to a computer mainframe 40, in step 284, the updated information is downloaded to the mainframe in step 286.

The system next proceeds to print a bar code label if needed. First, in step 288, a determination is made whether the bar code label printer 132 is in use, or ready to print a new label. In step 290, if is determined whether the bar code for the file folder 52 had been scanned. If the bar code was not scanned, the assumption is made that the file folder 52 requires bar code label to be printed, and the label is printed in step 292, and the non-scanned flag is reset in step 293.

In step 294, the file folder 52 is checked for any pending requests, and if there are no pending requests, a determination is made, in step 296, whether or not the folder 52 should be purged from active file storage 18. If the decision is made to purge, an off-site pending request is created in step 298 and the program proceeds to step 306. If the determination is not to purge, the program exits directly in step 300.

If there are pending requests, as determined in step 294, the file folder 52 is logged out. The program first determines in step 302 if there is more than one pending request; if there is, the operator selects the next logout request in step 304. After step 304, the program determines if the files are locked in step 306. If the files are not locked, an error message is displayed in step 308 and the programs again exits at step 300. If all the files are locked in step 306, the program proceeds in step 310 to determine whether the scale 130 is in use, and if the weight on the scale is valid in step 312. If the weight is not valid, an error message is displayed in step 314 and the program exits in step 316. If the weight is valid, the size of the folder is calculated in step 318. If the scale was not is use, or after completion of calculating the file size, the master file is updated in step 322. In step 324, a determination is made if the present file folder 52 needs a new folder. If a new folder is required, the system user is alerted in step 326, so that the folder data may be properly supplied. Otherwise, a routing slip is printed to accompany the file to the requestor's location. If the user manually inputs the folder number into the system via the keyboard, the system prints a new bar code label in step 332. In step 334 the scanned/volume flags are reset and the program exits in step 336 to await a new folder transaction.

Turning now to the subject of file folder purging, it has been stated that an object of the present invention is to provide a shelf manager system 10 which keeps the active file storage 18 as nearly full as possible with files that have the highest probability of being requested. The purpose of this, as stated previously, is to minimize the expensive transport of files, to and from the off-site storage facility 22.

FIGS. 13 and 14a–14c describe the program flow of the purge program. Ideally, the purge program is performed in real time while scanning folders in or periodically, such as on a nightly basis. The purpose of the purge program is to determine whether any individual shelf subsections are more than a predetermined percentage full. To make this determination, the purge program uses the thickness data for each file folder 52 within a file subsection 54. As discussed previously, purge program looks at each shelf subsection 54 independently to determine if a subsection is filled beyond its preset threshold value. If the threshold value is exceeded, the purge program uses file usage algorithms to remove the file folders 52 within a shelf subsection 54 which have the lowest probability of being requested in the future.

Initially, when an active file storage facility 18 is being set up for the first time to utilize the shelf manager system 10 of the present invention, an initial audit of the entire facility 18 will normally be conducted. During this audit, each shelf section will be measured. The total occupied inches of files for each section will also be measured for each middle digit section (1000 total), according the terminal digit filing system discussed above. Thus, for each middle digit section, an occupied percentage of physical inches available will be initially established and mapped to the database of the shelf manager system 10. This is a required first step.

Figure 13:
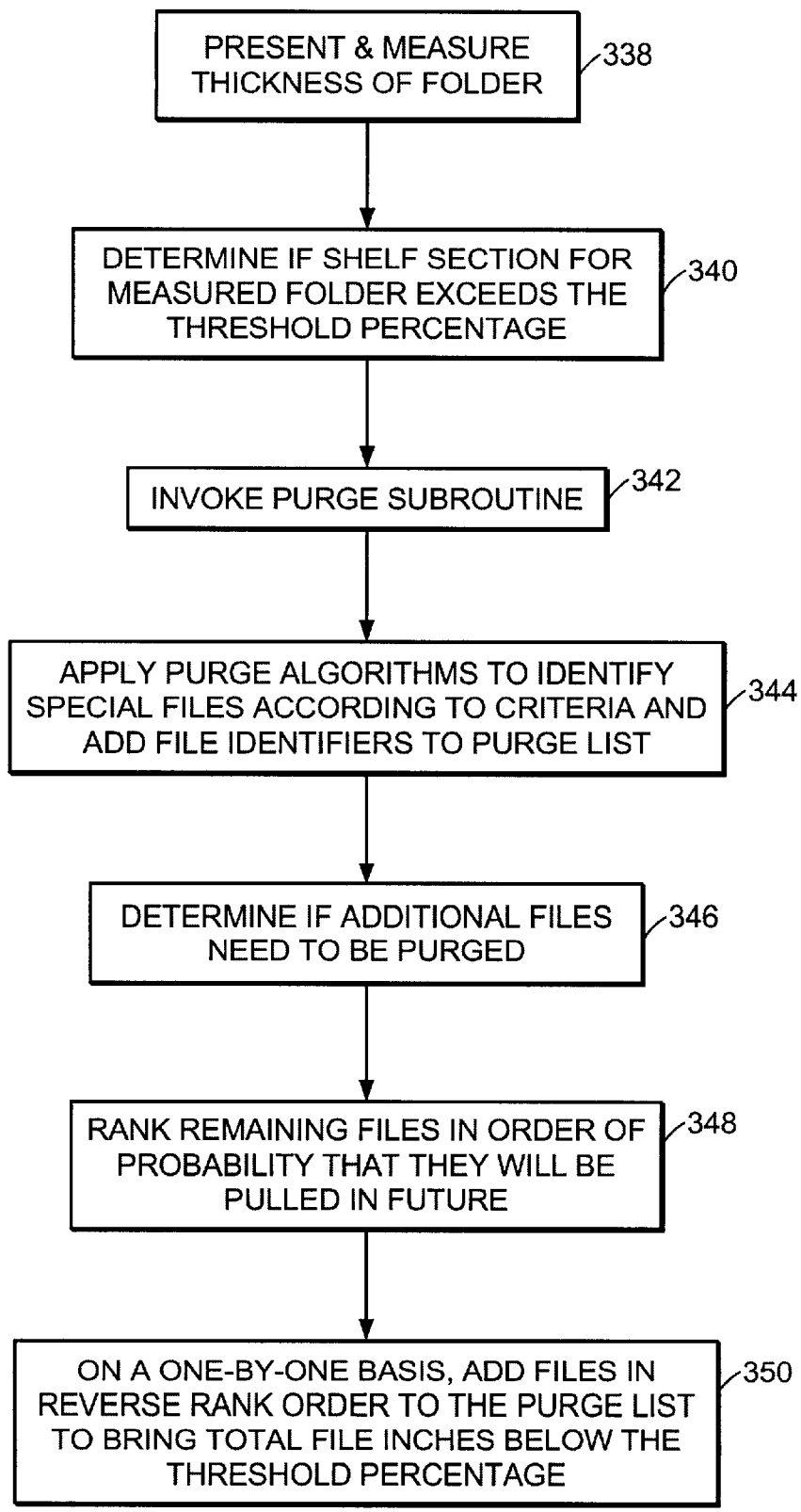
FIG. 13 illustrates in flowchart form the data flow of the file purging subroutine of the present invention.

FIG. 13 is a generalized view of the file folder purging process as it occurs after the initial audit. Whenever a file folder 52 is logged-in via a logging station 128 in step 338, it is weighed and its thickness determined. The shelf manager system 10 then determines in step 340 if the threshold percentage for the file folder's subsection has been exceeded by the newly measured thickness for the file folder 52. This determination will be made by comparing the total file inches of all file folders in the subsection, including the newly logged-in file folder 52, to the available inches in the shelf subsection, and determining if the percentage full exceeds a threshold percentage, generally 90 to 95 percent, which can be set by the user. If the threshold has been exceeded for that folder's section, shelf manager 10 automatically invokes the purge subroutine in step 342.

Once the purge subroutine has been invoked, the purge process proceeds in two stages. In the first stage, step 344, purging algorithms are applied to all files in a section to identify certain "special files" which are automatically added to the purge list. These special files are identified according to criteria which establishes a low probability that the file will be requested in the future. Certain special criteria are based on patterns in the patient's visit history, including the following:

Breaks in Patient's Visit History

Five visits in the last two years followed by no visits in the last six months is generally indicative of a patient's death off-site, or a situation stabilized enough to not require further treatment at the facility, or a move to an alternative treatment center.

Distant Zip Codes

If patient's home zip code does not match any local zip codes, this may be indicative of a patient who was traveling and will not return for any subsequent visits.

Disease Codes

Certain disease codes, such as specific types of cancer, followed by no visits for a predetermined time period may be indicative of a patient's death offsite, or a move to an alternative treatment center.

Administrative Requests

Non-diagnosis or non-treatment requests are generally one time only requests.

Periodic Treatment Codes

Certain treatments are periodic, such as annual mammography tests. The file folders should be purged to off-site storage 22 at the conclusion of the patient's visit and returned prior to the next scheduled exam.

New Unit Numbers

Approximately five percent of new patients seen by a medical facility are chronically ill, thus leaving 95 percent of newly added patients as episodic and may therefore be safely removed after six months of inactivity.

In the second stage, in step 346, a determination is made whether additional purging is required to bring the subsection percentage below the threshold value. If additional files need to be purged, all the remaining files in a shelf subsection 54 are ranked in step 348 in order of the last time each was requested. The assumption is that the longer a file remains in active file storage 18, the higher the probability that it will be requested in the future. In step 350, files are added in reverse rank order to the purge list, with the program recalculating the subsection percentage as each file is added to the list, until the subsection percentage is below the threshold setting for that subsection.

This process is continued all logged-in folders until all affected subsections exceeding the threshold percentages have been purged. A purge list is then printed to be used as a guide to personnel who physically remove the files from the shelves. This process occurs as shelves fill to the threshold, which could result in a small group of folders being removed daily vs. the accepted practice of purging yearly.

It is contemplated that in some instances, a file purge could be conducted for all the sections in the file storage facility 16, at the same time or in succession. For example, if the user changed the threshold percentage from a higher to a lower number, (for example from 95 percent to 90 percent), to provide more space in all the shelf sections, the purge subroutine could be run for all shelf sections.

Figure 14A:
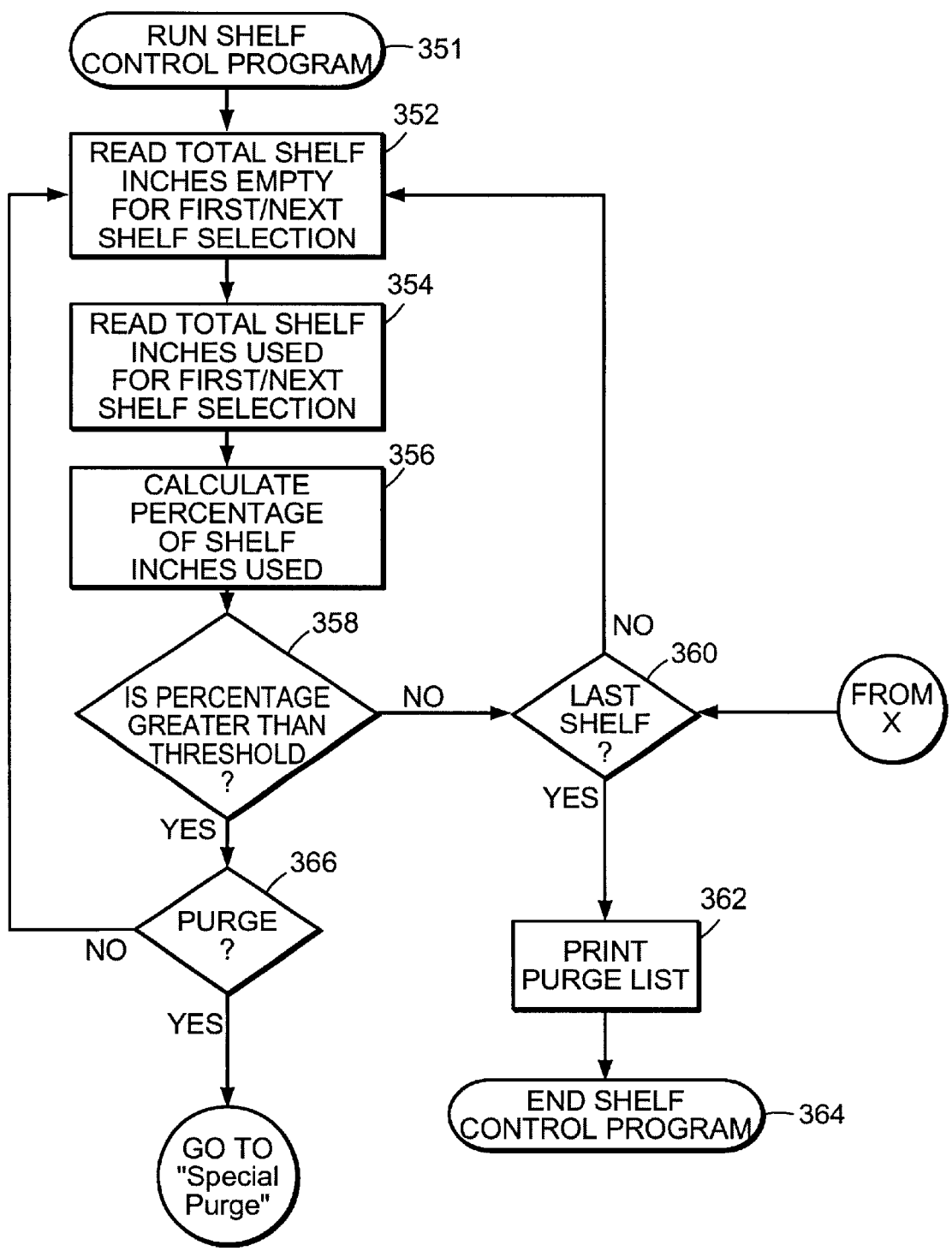
FIGS. 14a–14c together comprise a flowchart of the file purging subroutine for the present invention.
Figure 14B:
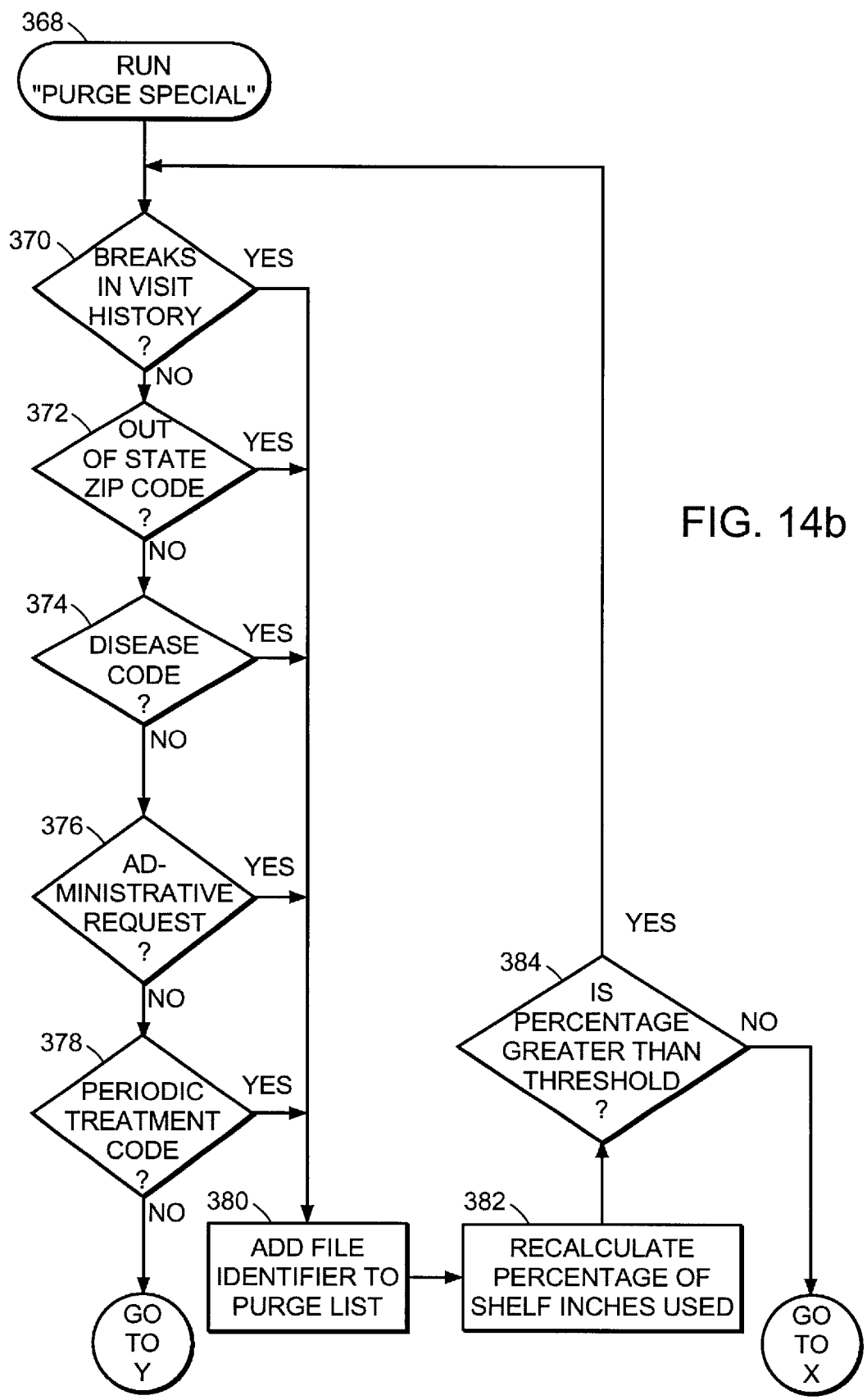
Figure 14C:
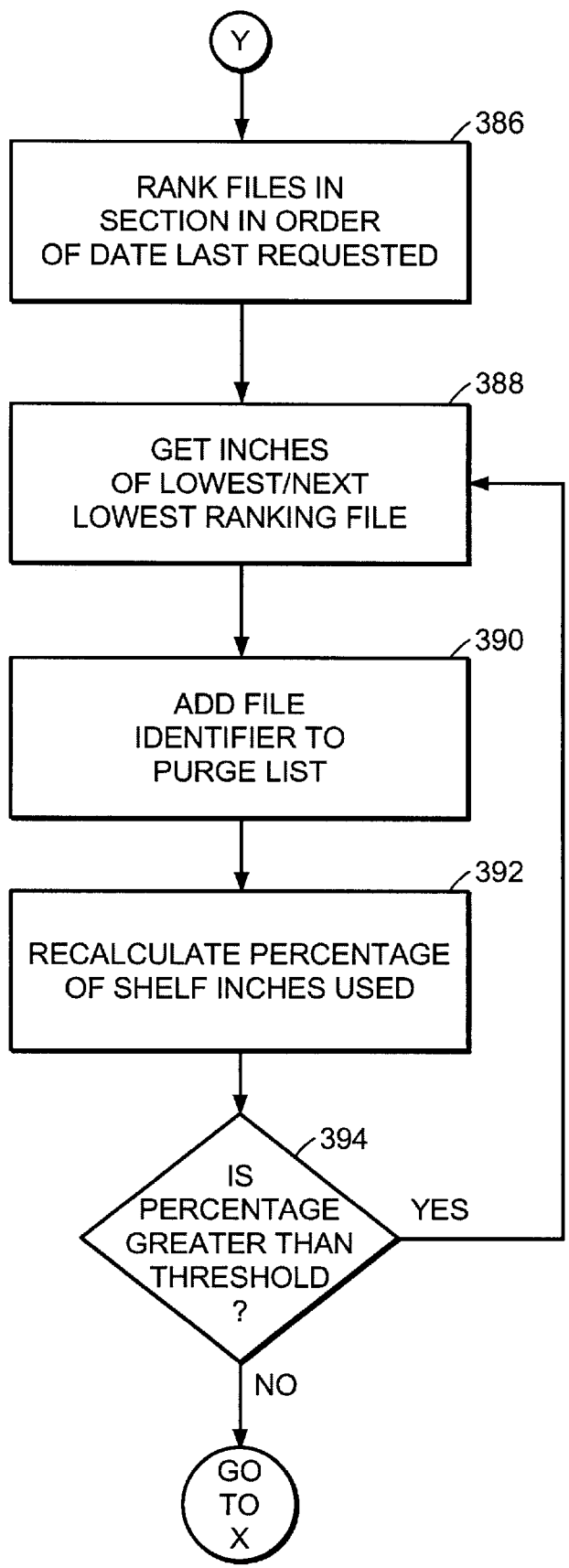

Turning to FIGS. 14a–14c, the purge program is shown in more detail. In step 351, the purge program is initiated. The total file inches for the first shelf subsection is retrieved in step 352 and the total file inches used for that subsection is retrieved in step 354. The percentage of shelf inches used is then calculated in step 356. If it is determined that the threshold percentage is not exceeded, in step 358, the program will determine if other shelve subsections need to be tested for purging in step 360. If there are other shelf subsections, the program will go back to step 352; if not, the program will print the purge list in step 362 and end the purge program in step 364. However, if the threshold is exceeded in step 358, a determination will be made whether to purge in the shelf subsection in step 366. If the determination is not to purge, the program will go to step 352 and select data for the next shelf subsection; if the determination is to purge, the program will proceed to start the special purge with step 368.

As discussed in connection with FIG. 13, if a file folder 54 meets certain special criteria, the determination will be made to immediately purge that file folder 54. In step 370, the file is tested for breaks in patient visit history. In step 372, the file is tested for out-of-state zip codes. In step 374, the file is tested for specific disease codes that are episodic vs. chronic in nature. In step 376, the file is tested for administrative requests. In step 378, the file is tested for periodic treatment codes. If any of these tests are positive, the file identifier for that file is added to the purge list in step 380 and the percentage of shelf inches used is recalculated in step 382 followed by a determination of whether the percentage still exceeds the threshold in step 384. If the percentage does not exceed the threshold, the program goes step to 360 to choose the next shelf subsection.

If all the identified files have been added to the purge list, and the threshold is still exceeded, the program proceeds to step 386, where the files are ranked in the order of the date last requested. In step 388, the inches for the lowest ranking file are retrieved. The identifier for the lowest ranking file is added to the purge list in step 390. In step 392, the percentage of shelf subsection inches used is recalculated and a determination is made in step 394 if the percentage still exceeds the threshold for that subsection. If it does, the program loops back and purges the next lowest ranking file. This procedure continues until the shelf subsection percentage is below the threshold value; if the percentage does not exceed the threshold, the program goes to step 360 for the next shelf subsection.

The purging files criteria in the preferred embodiment are particularized for medical care files. However, the principles of the present invention are equally application to other file environments, as previously discussed. For example, in the banking industry the special criteria for purging mortgage files would include:

On-Time Loan Pavments for a Predetermined Number of Months

Indicative of continual and reliable mortgage payments that are likely to continue and not require attention.

Deadbeats

Indicative of uncollectible loans, and more active file.

Loan Repaid

Indicative of completed loan activity, where the file can be safely removed to off-site storage.

As another example, in the insurance industry the special criteria for purging insurance claim files would include:

Months Without Request since claim Was Paid

This would be indicative of completed activity with regard to a claim.

Settled Caims

Indicative of completed insurance claim activity, where the file can be safely removed to off-site storage.

Figure 15:
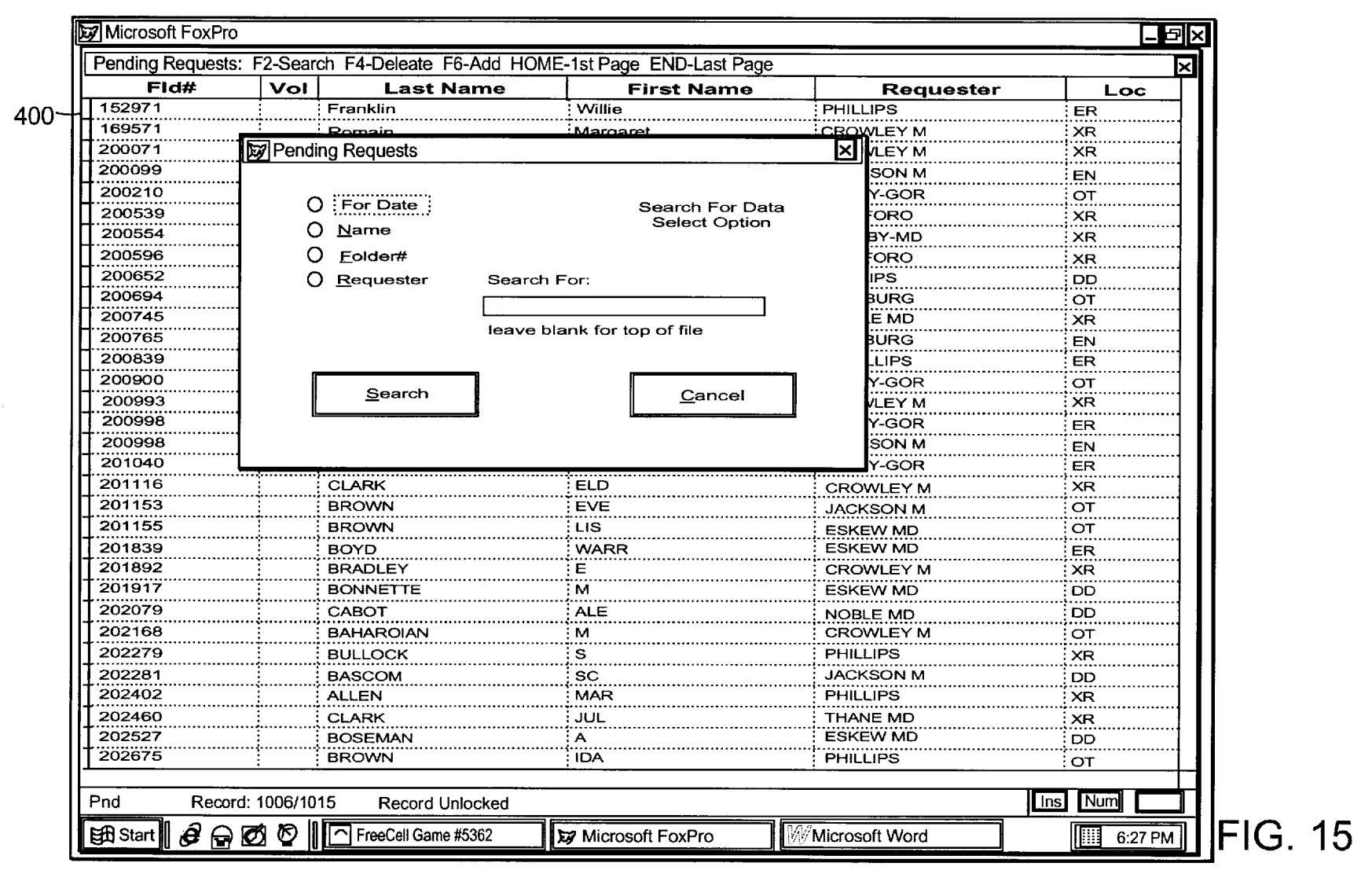
Figure 16:
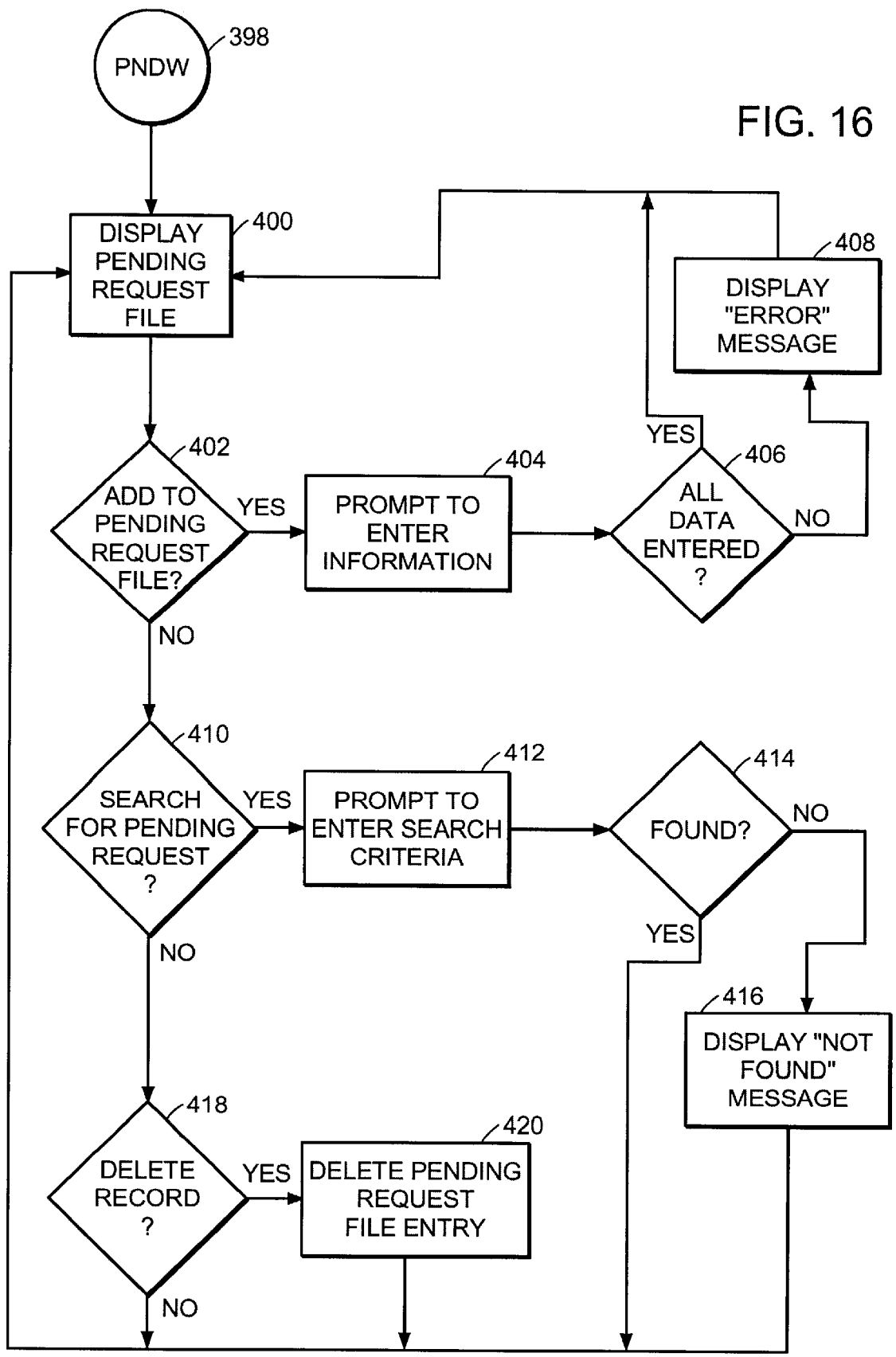
FIG. 16 is a flowchart of the pending requests subroutine of the present invention.

Referring now to FIGS. 15 and 16, the Pending Requests user screen and flowchart are shown. The pending request subroutine is used for tracking requests for file folders. In step 398, the pending request subroutine PNDW is initiated, causing the pending requests screen to be displayed in step 400. In step 402, the user may choose to add information to the pending request file, and is prompted to do so in step 404. When all needed data has been entered, in step 406, the program returns to step 400; or if the information is not entered, an error message will be displayed in step 408. In step 410, the user may choose to search for a pending request and is prompted to enter search criteria in step 410. If the data is found, it is displayed in step 414. If it is not found, a "Not Found" message is displayed in step 416. The user may also choose to delete a pending request entry in step 418 and carry out the deletion in step 420

Figure 17:
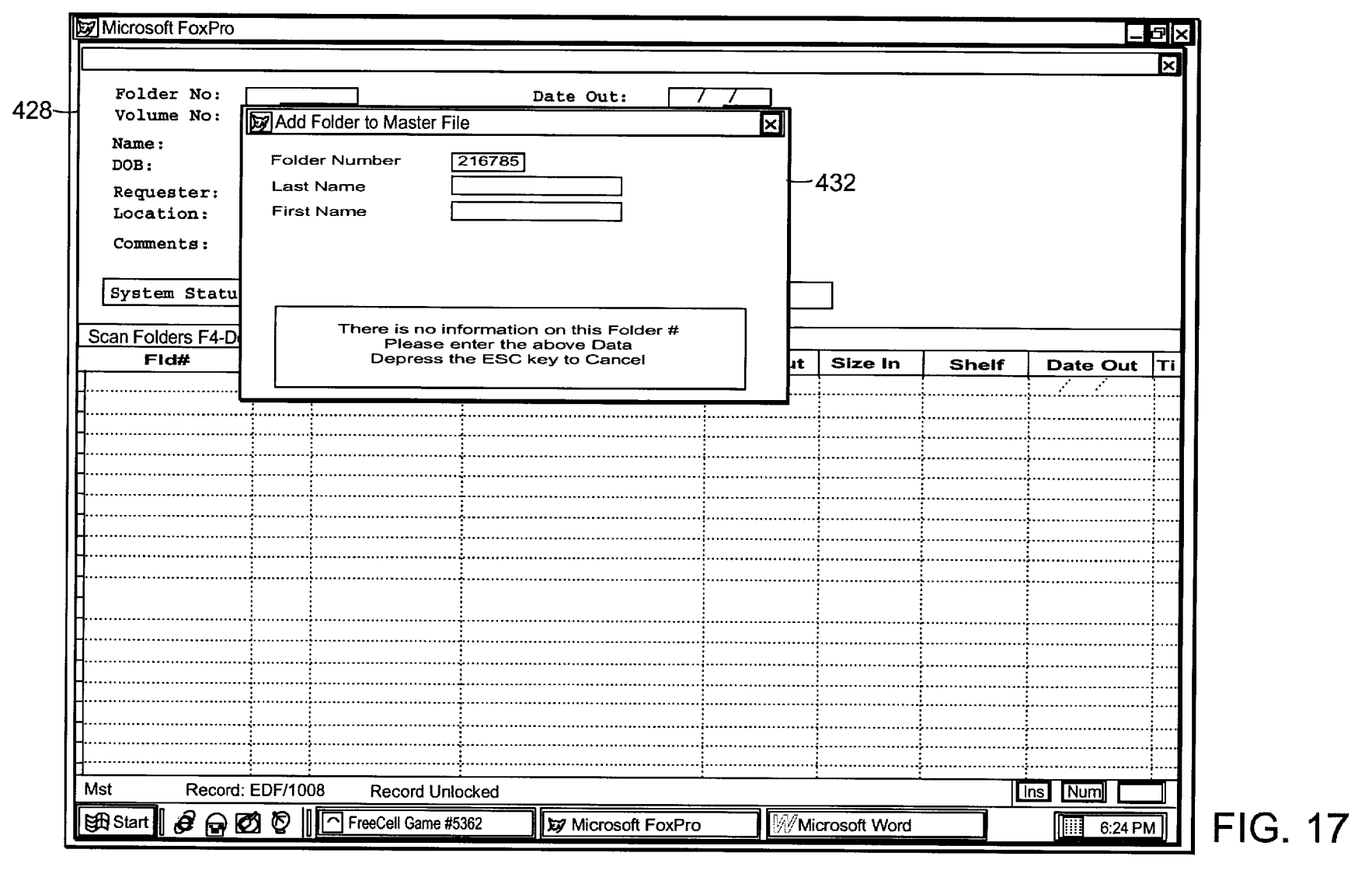
Figure 18:
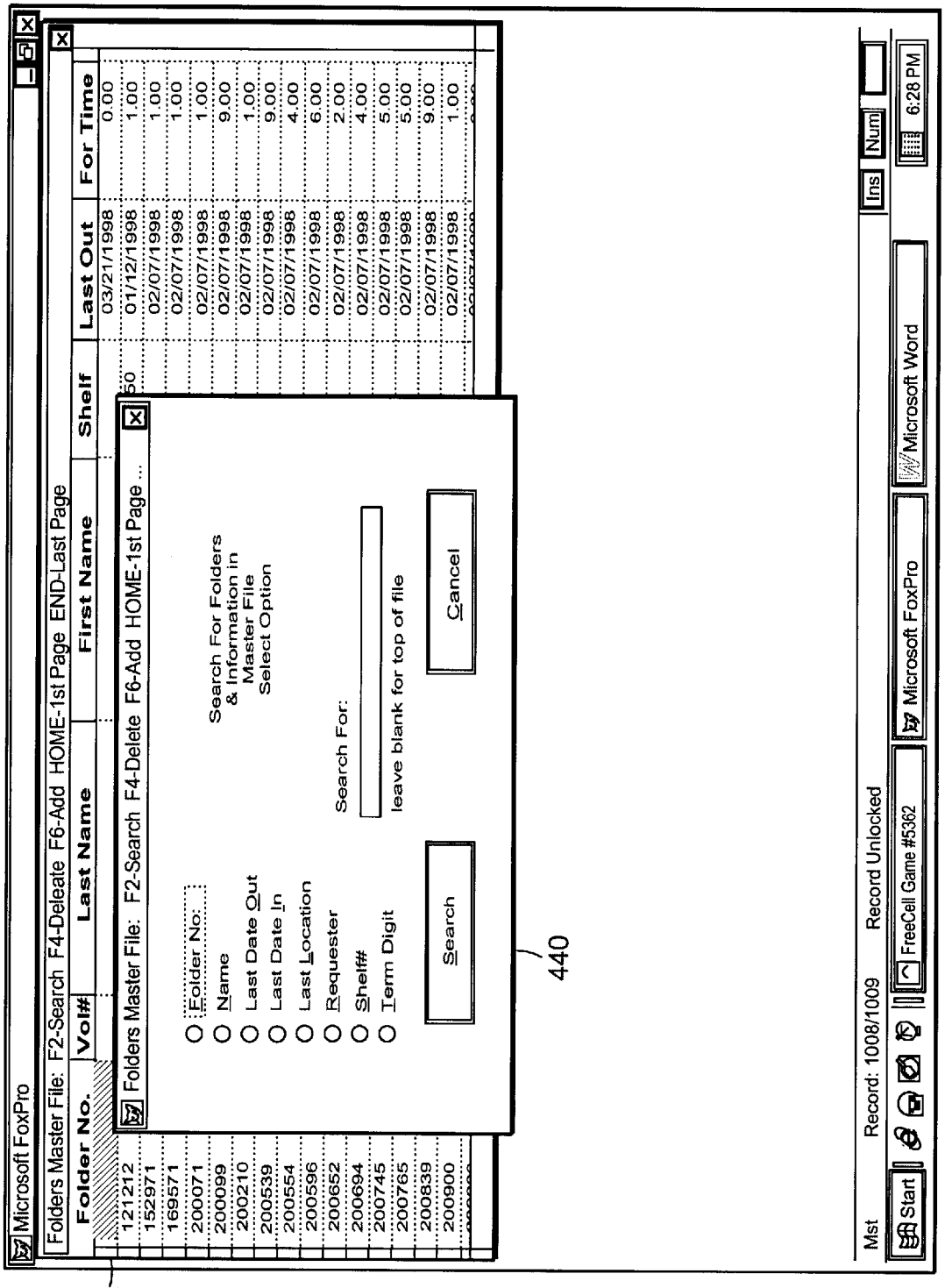
FIG. 18 illustrates the graphical user interface screen for the folders master subroutine showing the folders search dialogue box screen of the present invention.
Figure 19:
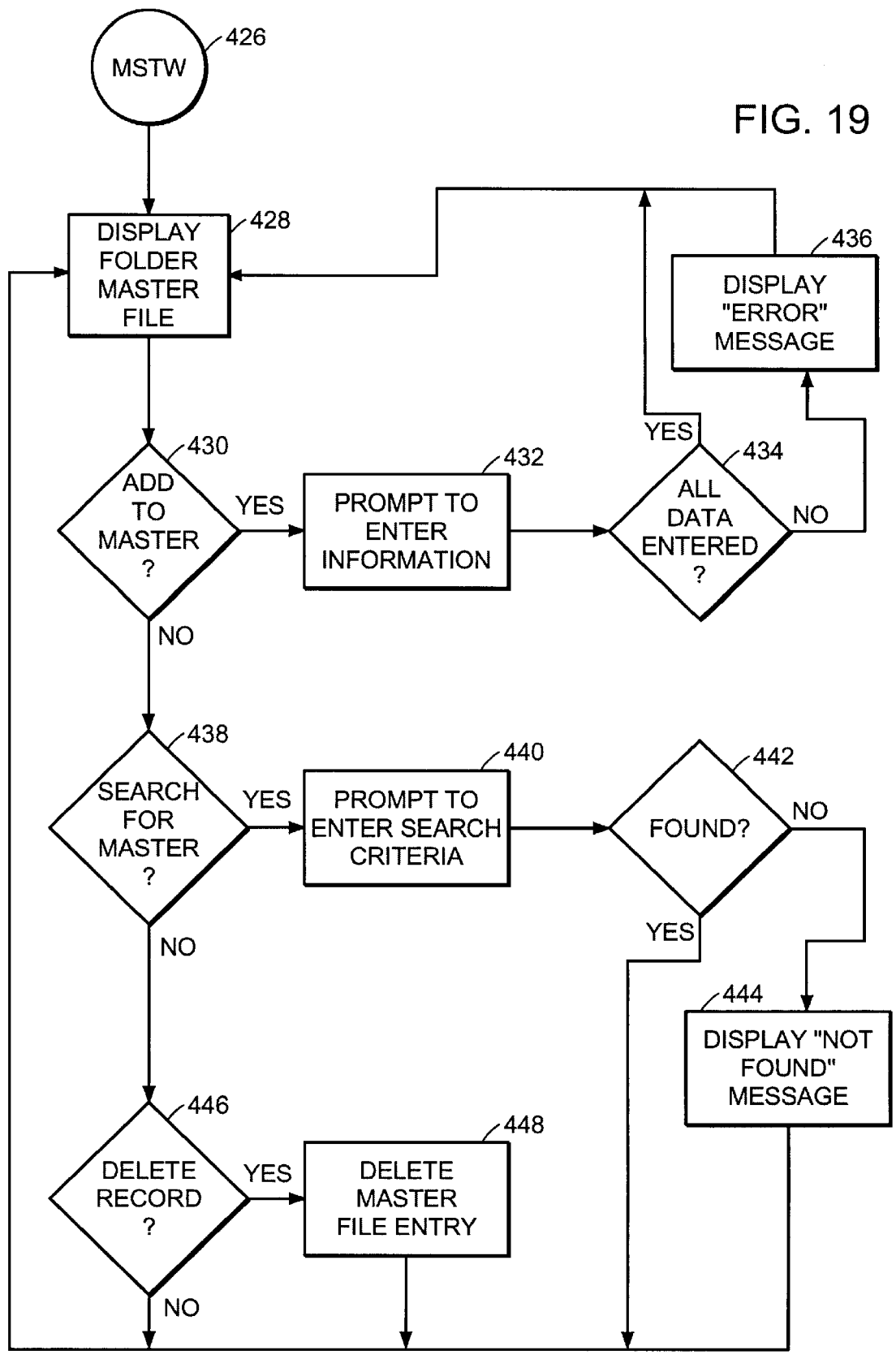
FIG. 19 is a flowchart of the folders master subroutine of the present invention.

Referring now to FIGS. 17 through 19, the Folders Master user screens and flowchart are shown. The folders master contains the basic information about a file folder such as the last time logged out, the date logged out, requestor, location, as well as other information. In step 426, the folders master subroutine MSTW is initiated, causing the folder master screen to be displayed in step 428. In step 430, the user may choose to add information to the master file and is prompted to do so in step 432. When all needed data has been entered, in step 434, the program returns to step 400, or if the information is not entered, an error message will be displayed in step 436. In step 438, the user may choose to search for a master record and is prompted to enter search criteria in step 440. If the data is found it is displayed in step 442. If it is not found, a "Not Found" message is displayed in step 444. The user may also choose to delete a master file entry in step 446 and carry out the deletion in step 448.

Figure 20:
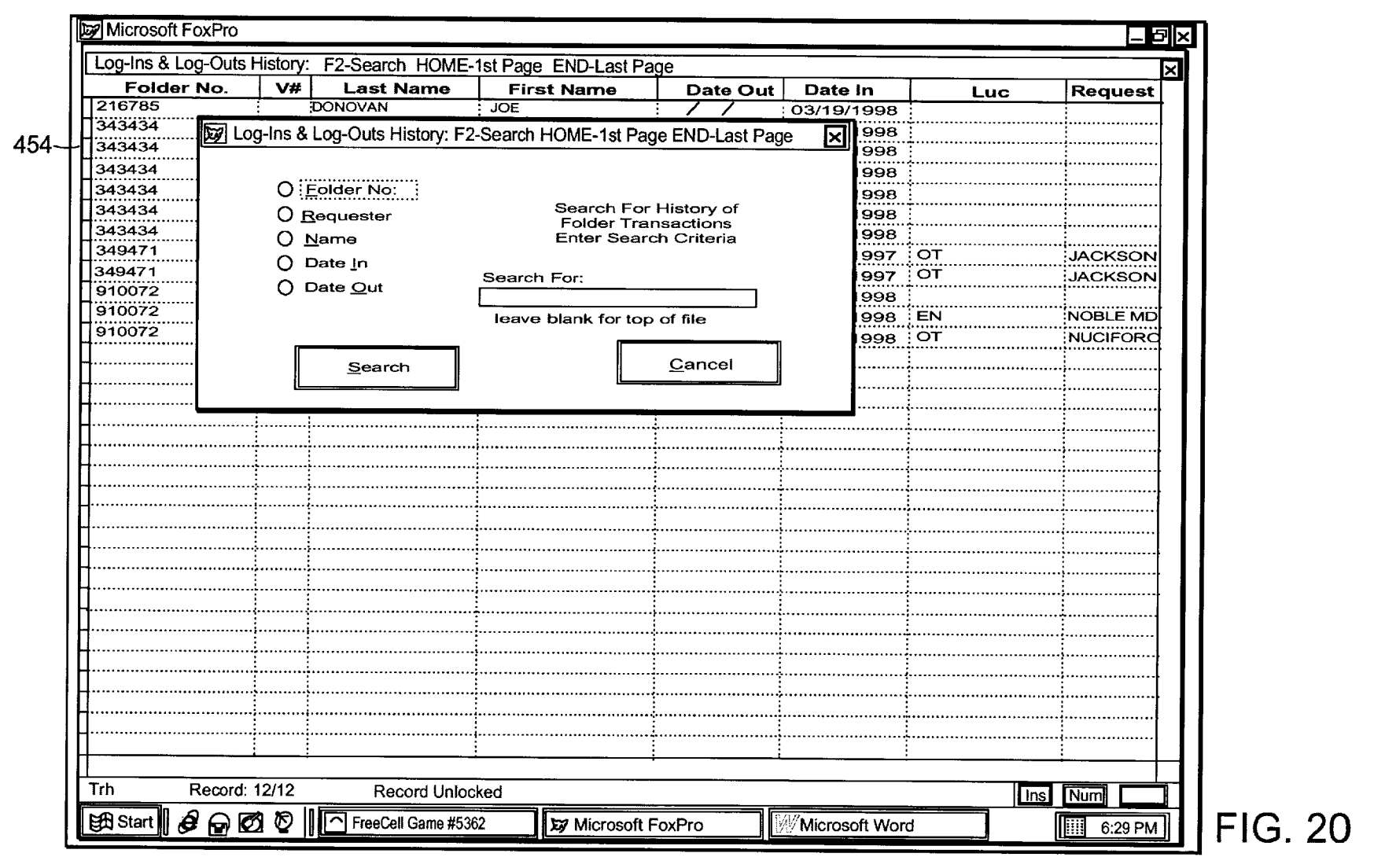
Figure 21:
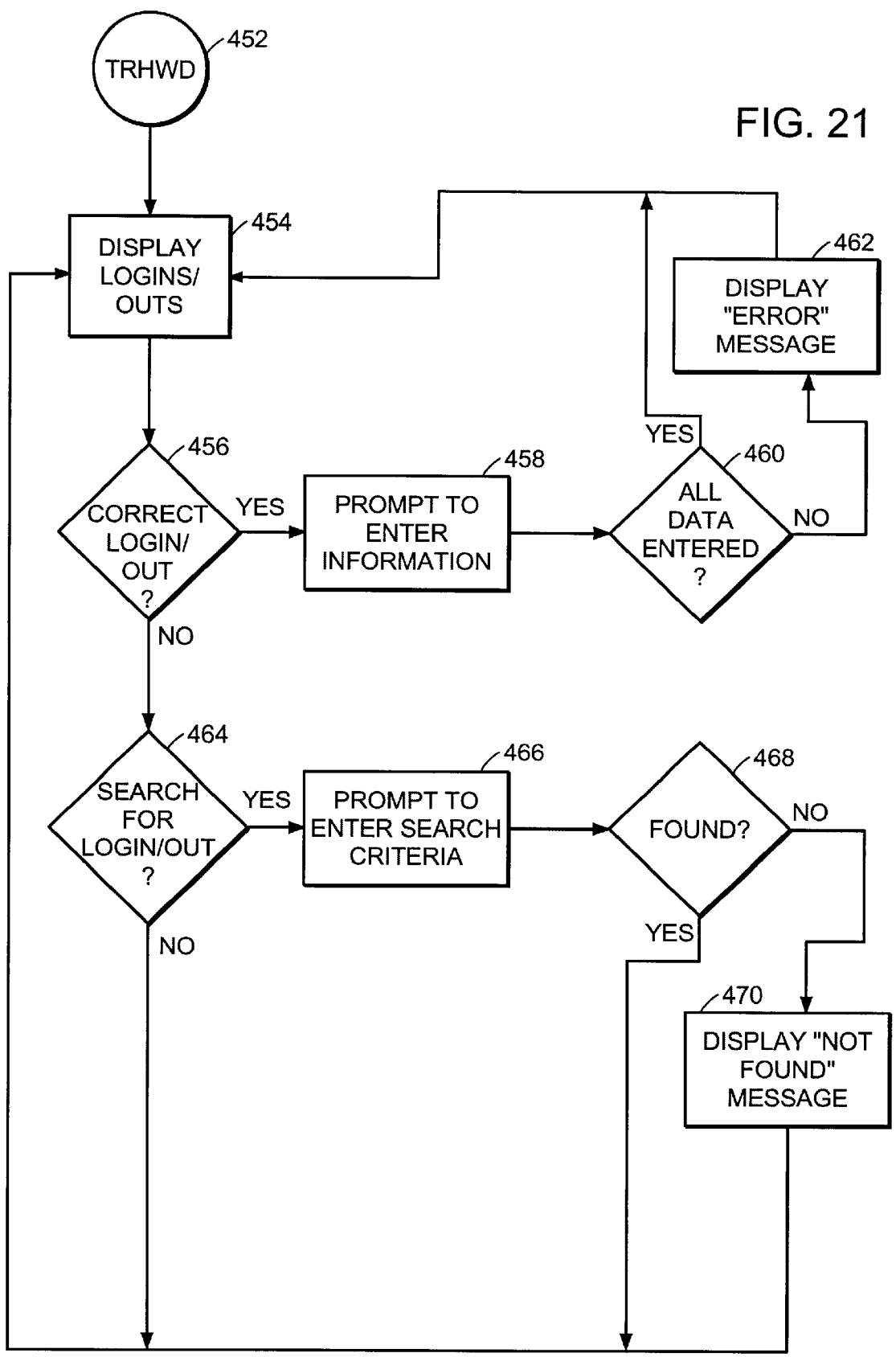
FIG. 21 is a flowchart of the login/logout history subroutine of the present invention.

Turning now to FIGS. 20 and 21, the Log-ins & Log-Outs History user screen and flowchart are shown. The log-Ins & log-out history provides a history record of activity associated with a file folder 54. In step 452, the log-ins & log-out history subroutine TRHWD is initiated, causing the log-ins & log-out history screen to be displayed in step 454. In step 456, the user may choose to correct information in the log-ins & log-outs history file and is prompted to do so in step 458. When all needed data has been entered, in step 460, the program returns to step 454, or if the information is not entered, an error message will be displayed in step 462. In step 464, the user may choose to search for a log-ins & log-outs history record and is prompted to enter search criteria in step 466. If the data is found it is displayed in step 468. If it is not found, a "Not Found" message is displayed in step 470.

Figure 22:
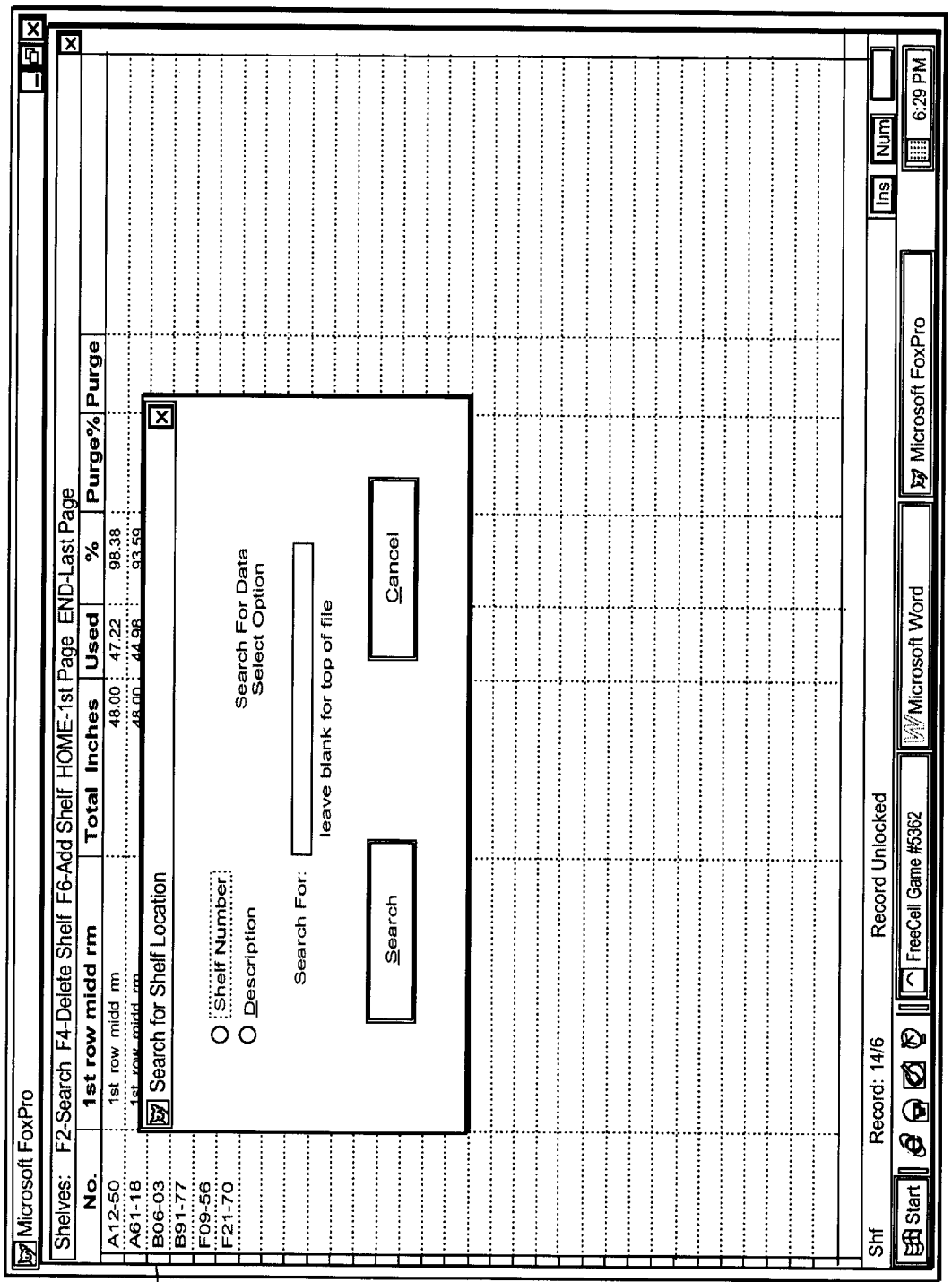
FIG. 22 illustrates the graphical user interface screen for the shelf space subroutine of the present invention.
Figure 23:
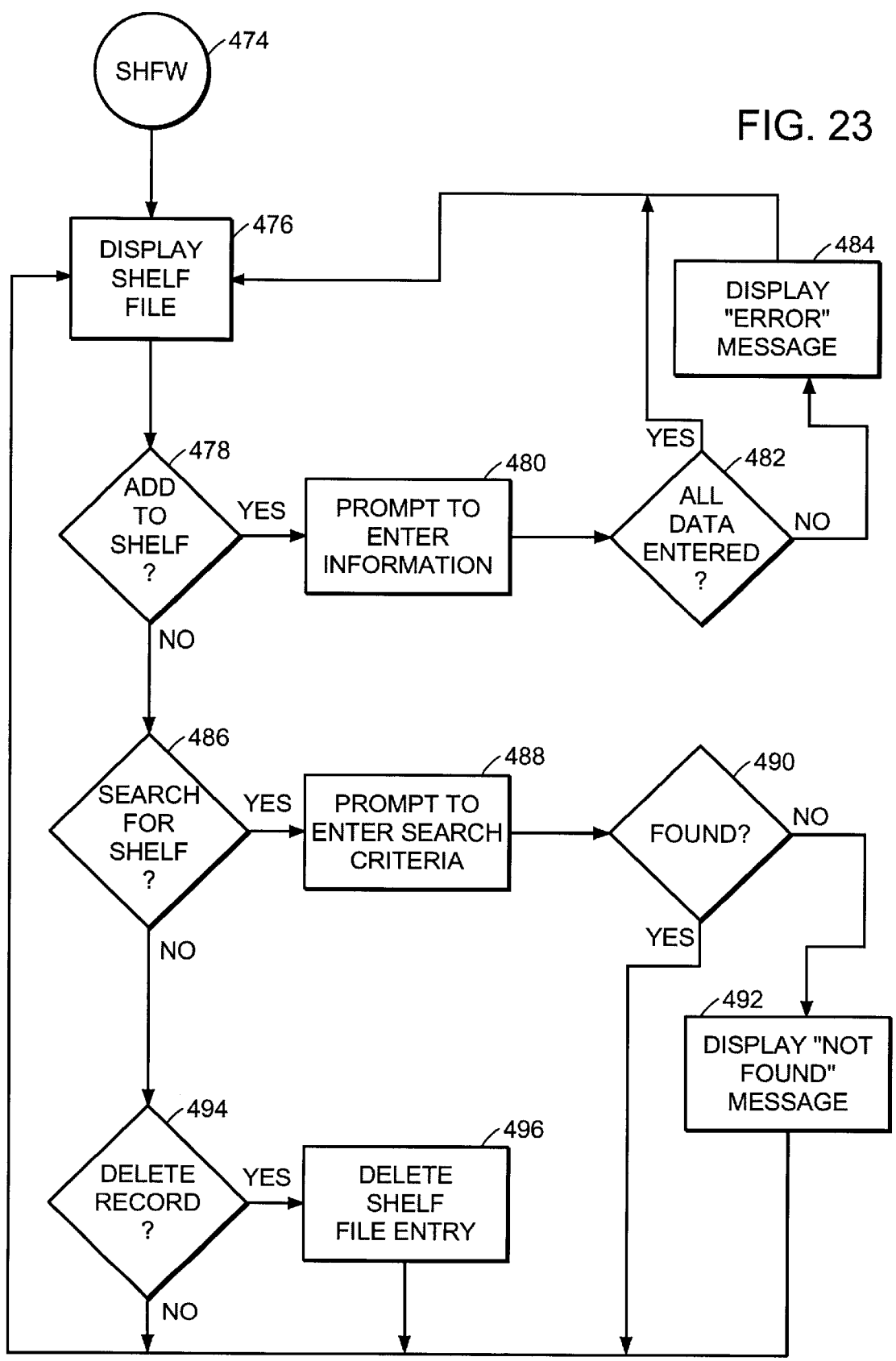
FIG. 23 is a flowchart of the shelf space subroutine of the present invention.
Figure 24A:
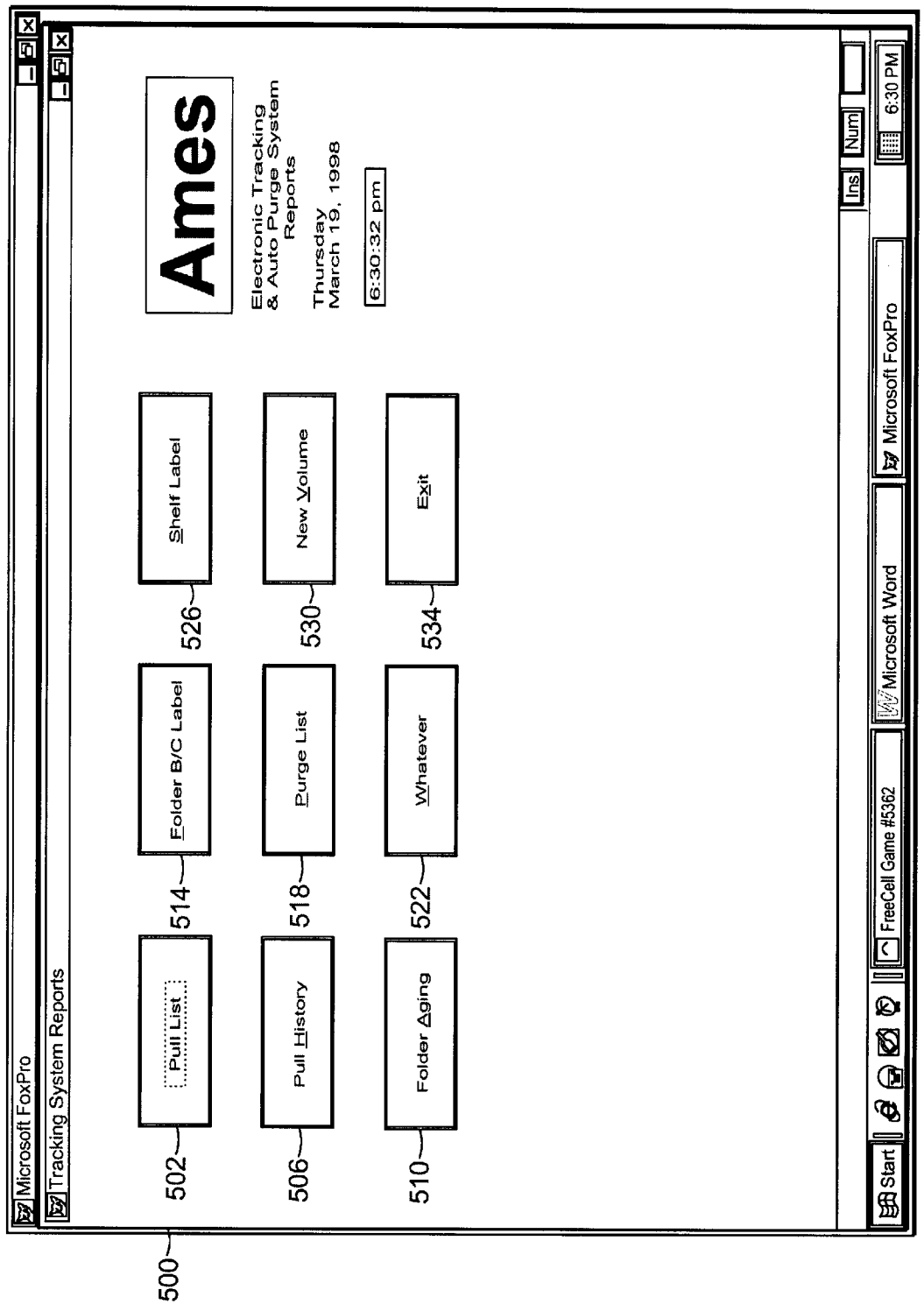
FIGS. 24a–24h illustrates the graphical user interface screens for the print reports subroutine of the present invention.
Figure 24B:
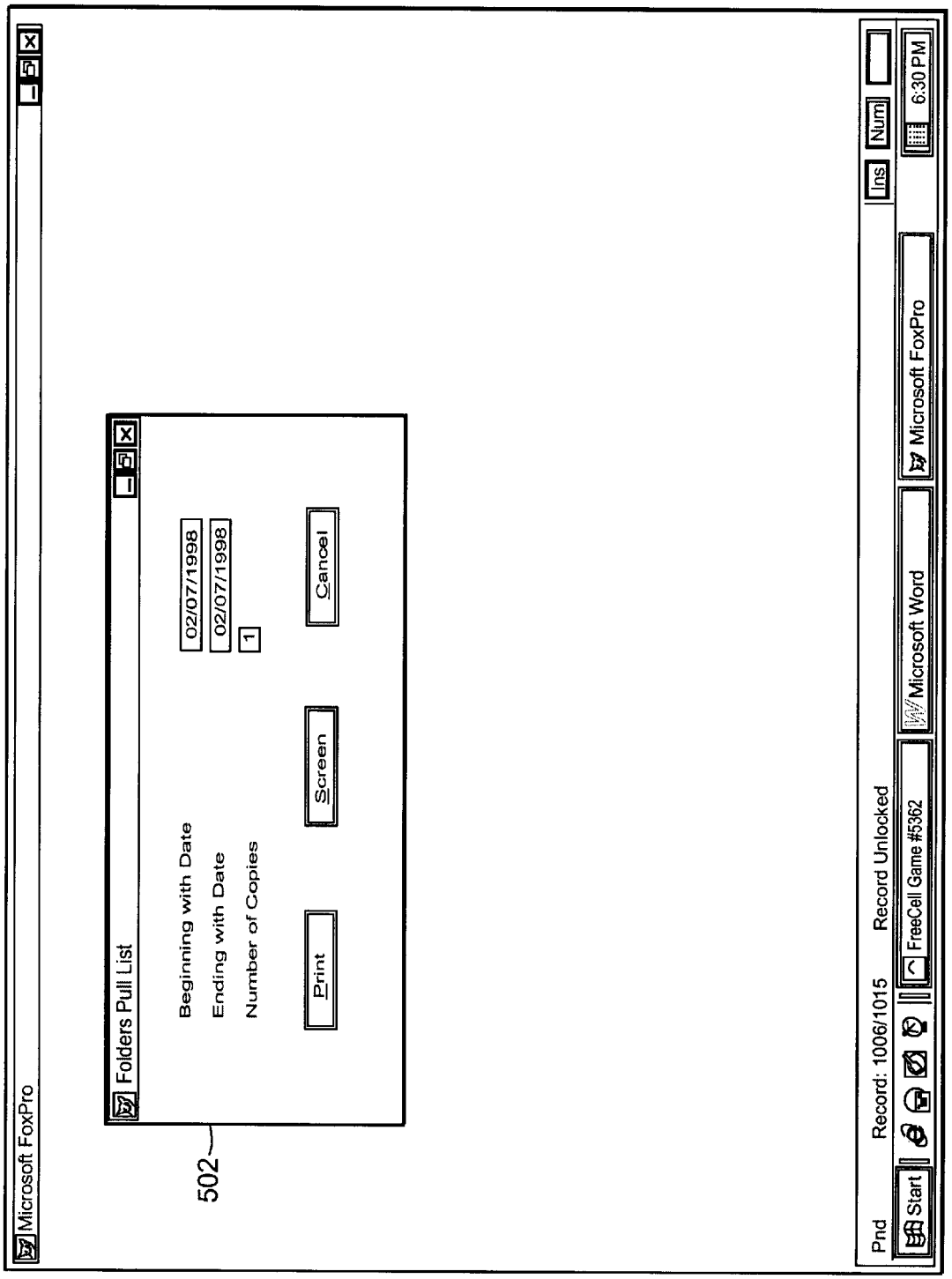
Figure 24C:
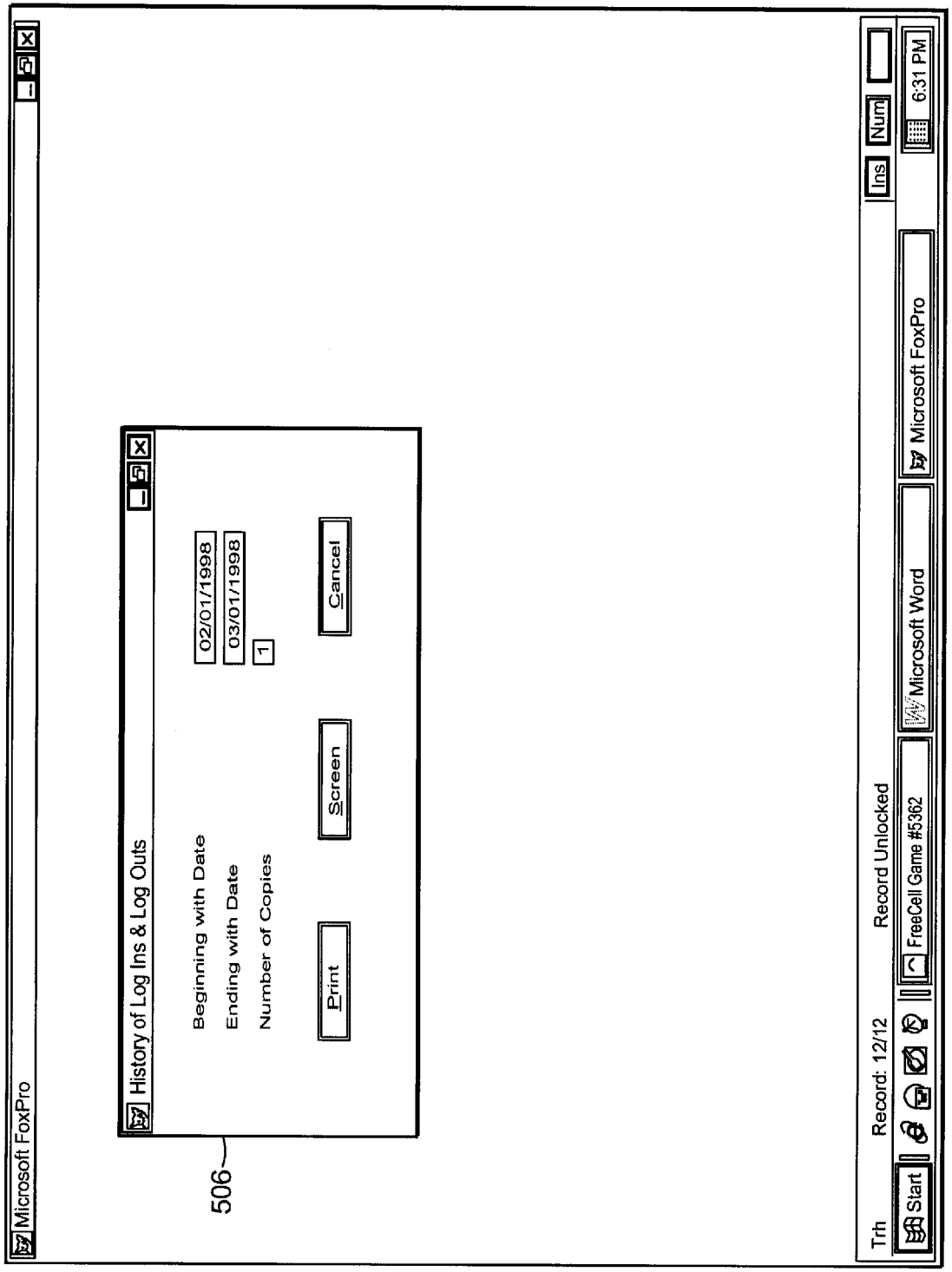
Figure 24D:
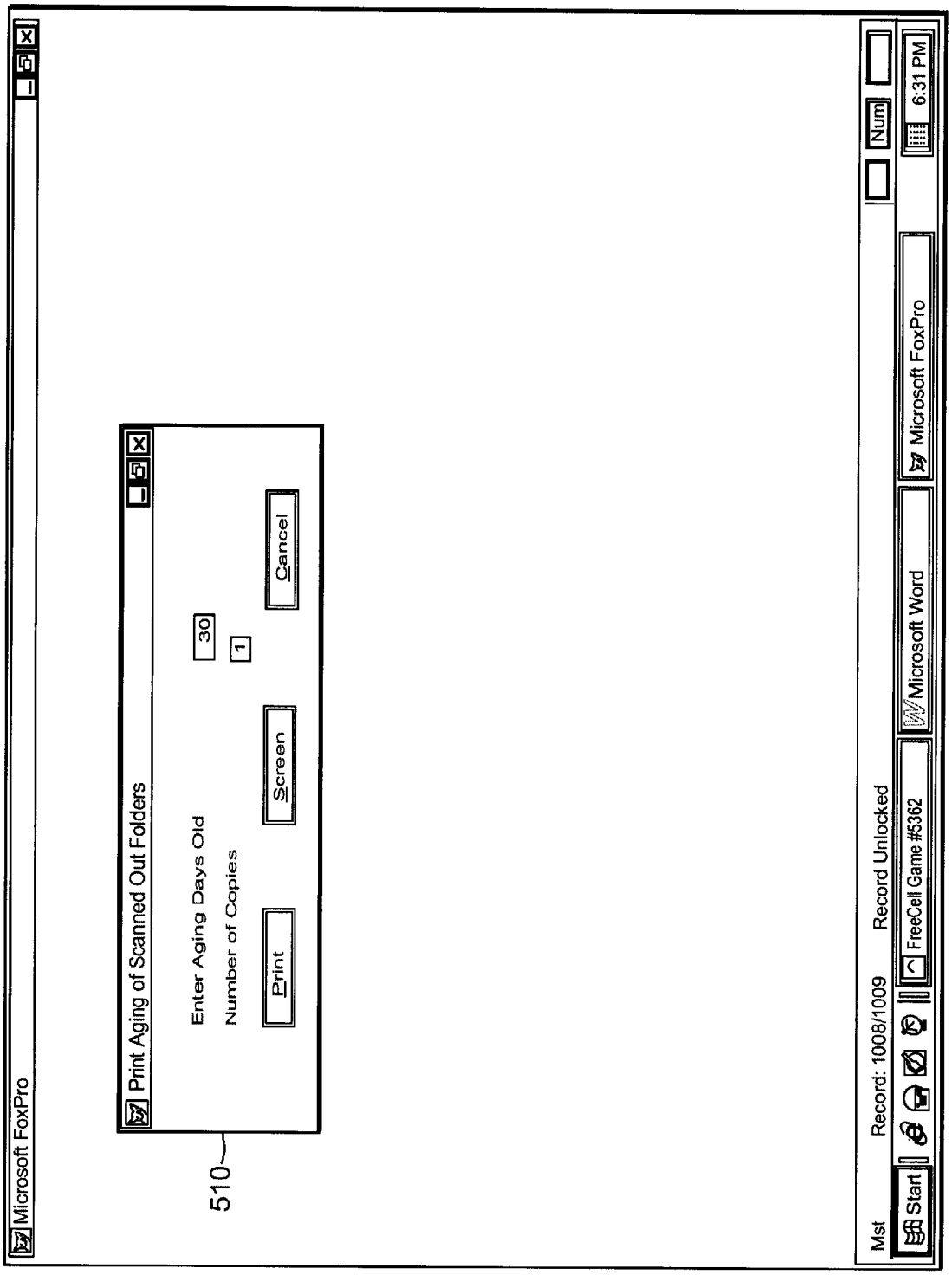
Figure 24E:
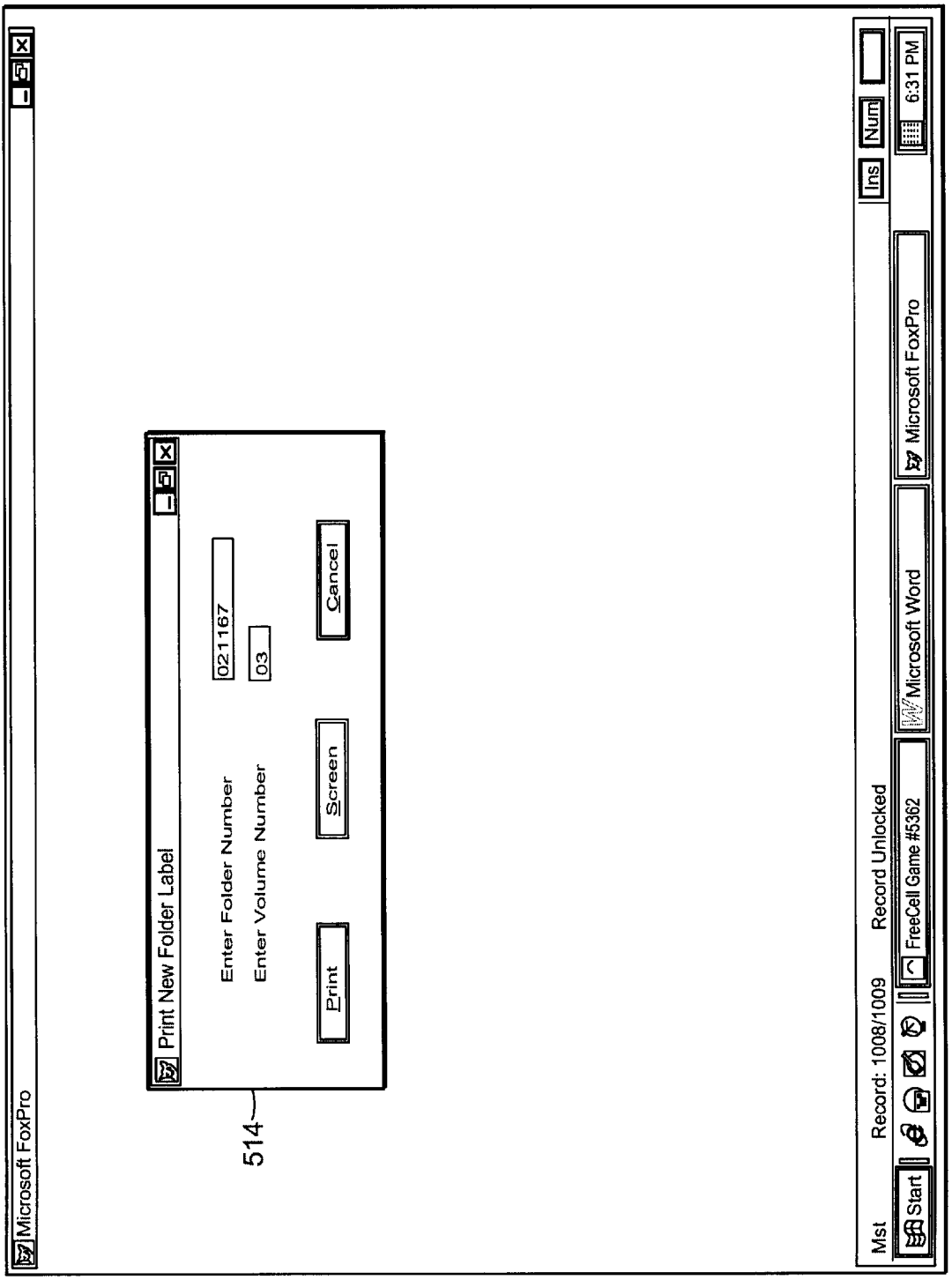
Figure 24F:
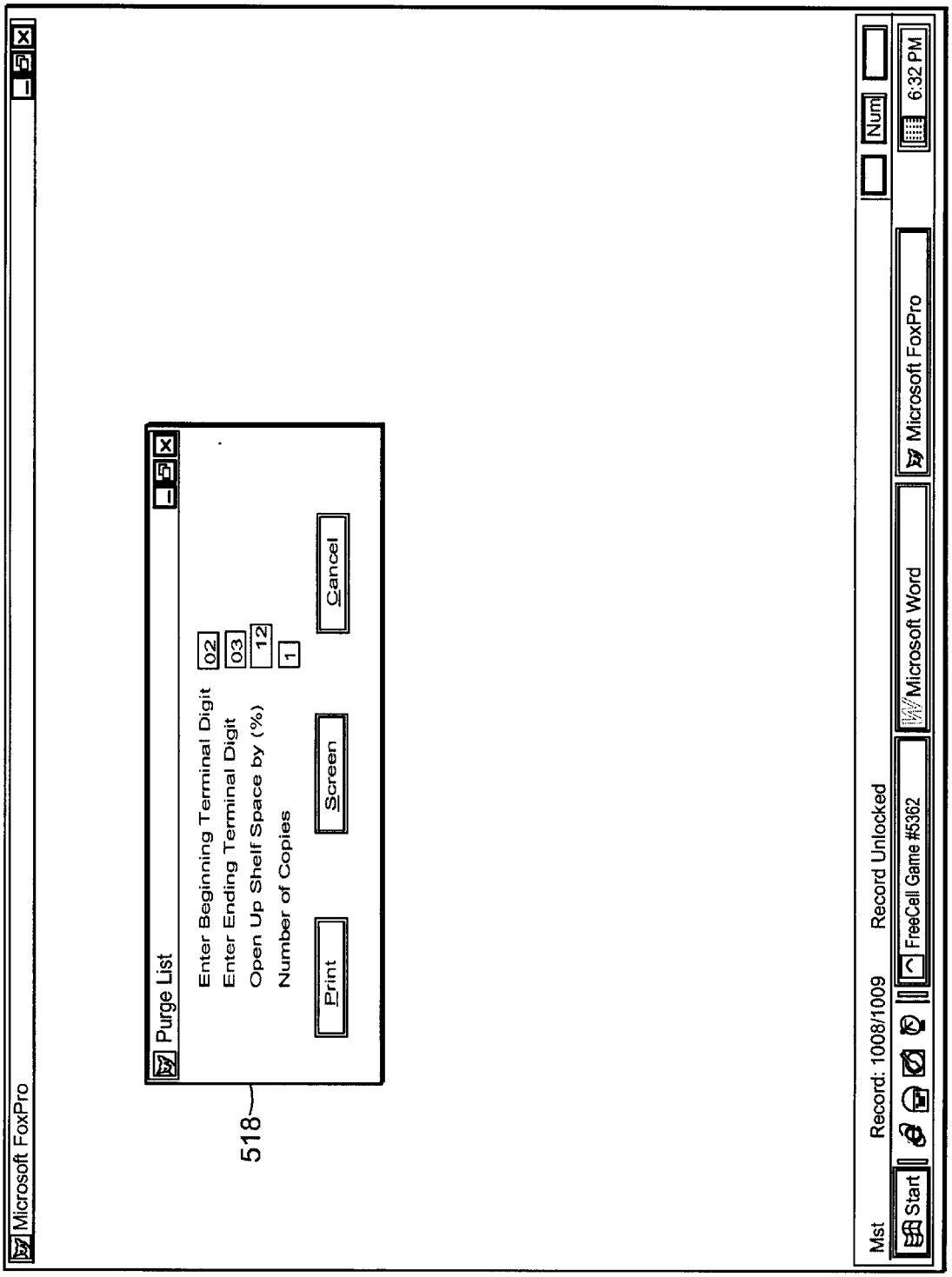
Figure 24G:
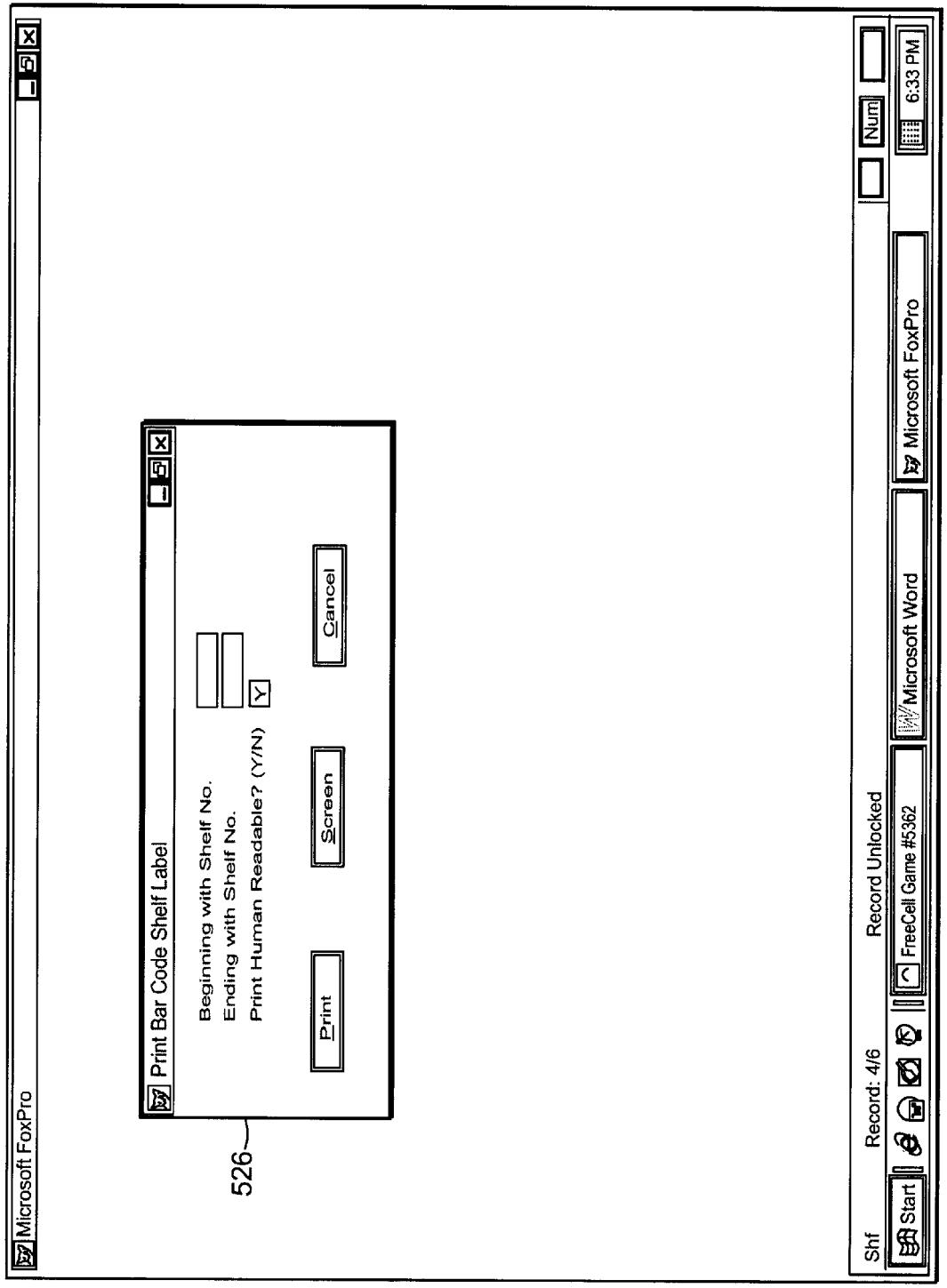
Figure 24H:
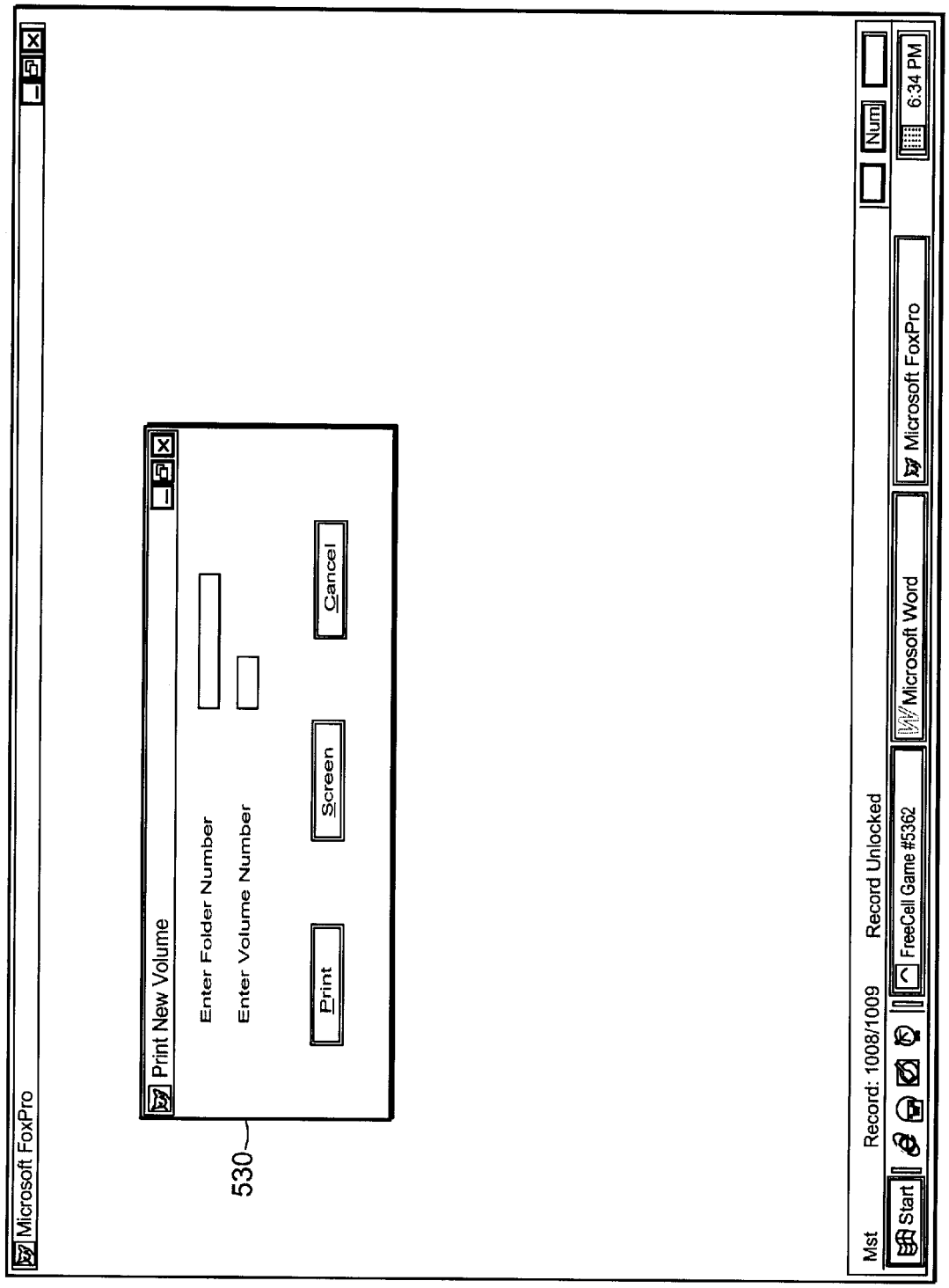

Referring to FIGS. 22 through 23, the Shelf Space user screens and flowchart are shown. The shelf space screen provides information on shelves including shelf size, shelf location, inches used, and percent used. In step 474, shelf space subroutine SHFW is initiated, causing the shelf space screen to be displayed in step 476. In step 478, the user may choose to add information to the shelf file is prompted to do so in step 480. When all needed data has been entered, in step 482, the program returns to step 476, or if the information is not entered, an error message will be displayed in step 484. In step 486, the user may choose to search for a shelf entry and is prompted to enter search criteria in step 488. If the data is found it is displayed in step 490. If it is not found, a "Not Found" message is displayed in step 492. The user may also choose to delete a shelf file entry in step 494 and carry out the deletion in step 496.

FIGS. 24a–24h and FIG. 25 illustrate the user screens and flowchart for the Print Reports Subroutine. The print reports menu is used to print reports, folder labels, shelf labels and new volume labels. In step 498, the REPORT MENU subroutine is initiated, causing the report menu screen to be displayed. The report menu screen gives the user several options for printing reports. The user may choose to print a pull list in step 502 initiating the print subroutine PNDW in step 504. The user may choose to print a pull history in step 506 initiating the print subroutine TRHWR in step 508. The user may choose to print a folder aging report, which shows the age of scanned out files, in step 510 initiating the print subroutine AGEW in step 512. The user may choose to print a file folder bar code label in step 514 initiating the print subroutine FLDWL in step 516. The user may choose to print a purge list in step 518 initiating the print subroutine PRGWL in step 520. The steps 522 and 524 are steps reserved for future expansion and not currently used. The user may chose to print a shelf label in step 526 initiating the print subroutine SHFWL in step 528. The user may choose to print the labels for a new file folder volume in step 530 initiating the print subroutine VOLW in step 532. Finally, the user may choose to exit the report menu in step 534 initiating the exit function EXIT in step 536. in.

Figure 26:
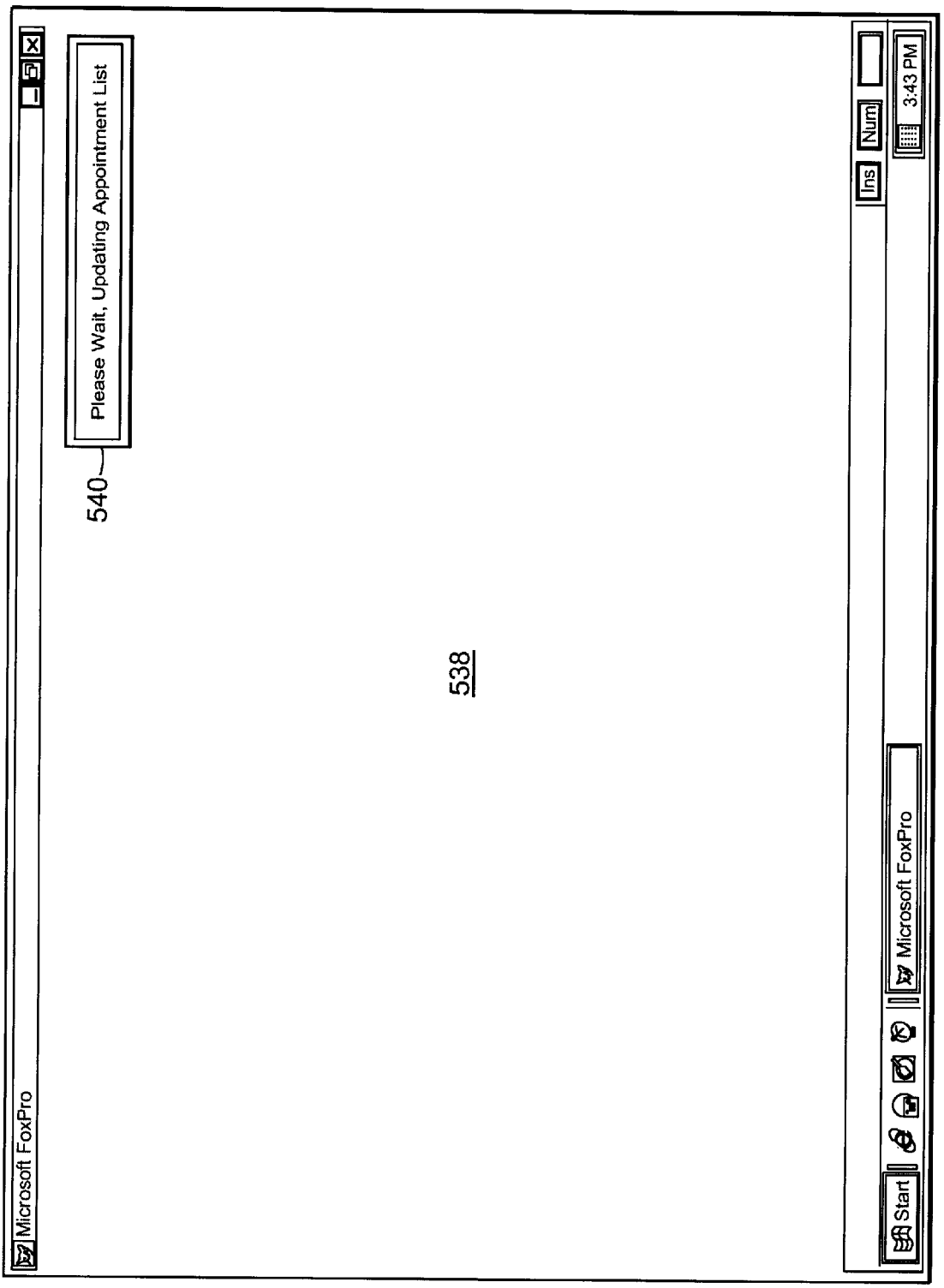
FIG. 26 illustrates the graphical user interface screen for the appointments function of the present invention.
Figure 27:
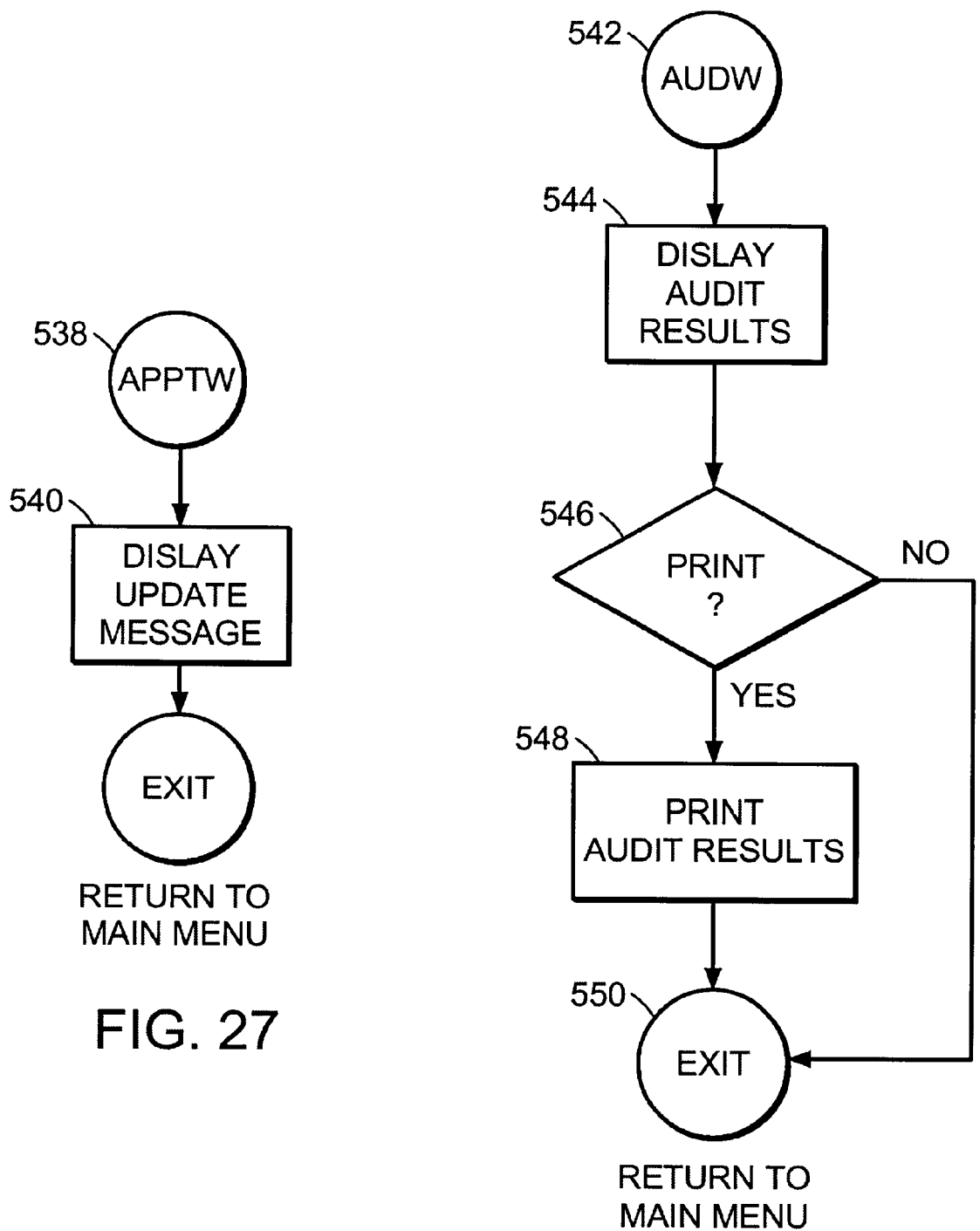
FIG. 27 is a flowchart of the appointments function of the present invention.

FIGS. 26 and 27 shows the user screen and flowchart for the Appointments subroutine APPTW. The updating of appointments can occur either automatically or periodically from the computer mainframe 40, or manually by selecting the Appointments button 176 on the Main Menu. While the shelf manager 10 is being updated with new appointments from the computer mainframe 40, a message box is displayed on the display screen 91. No user interaction is required while this process takes place.

Figure 28:
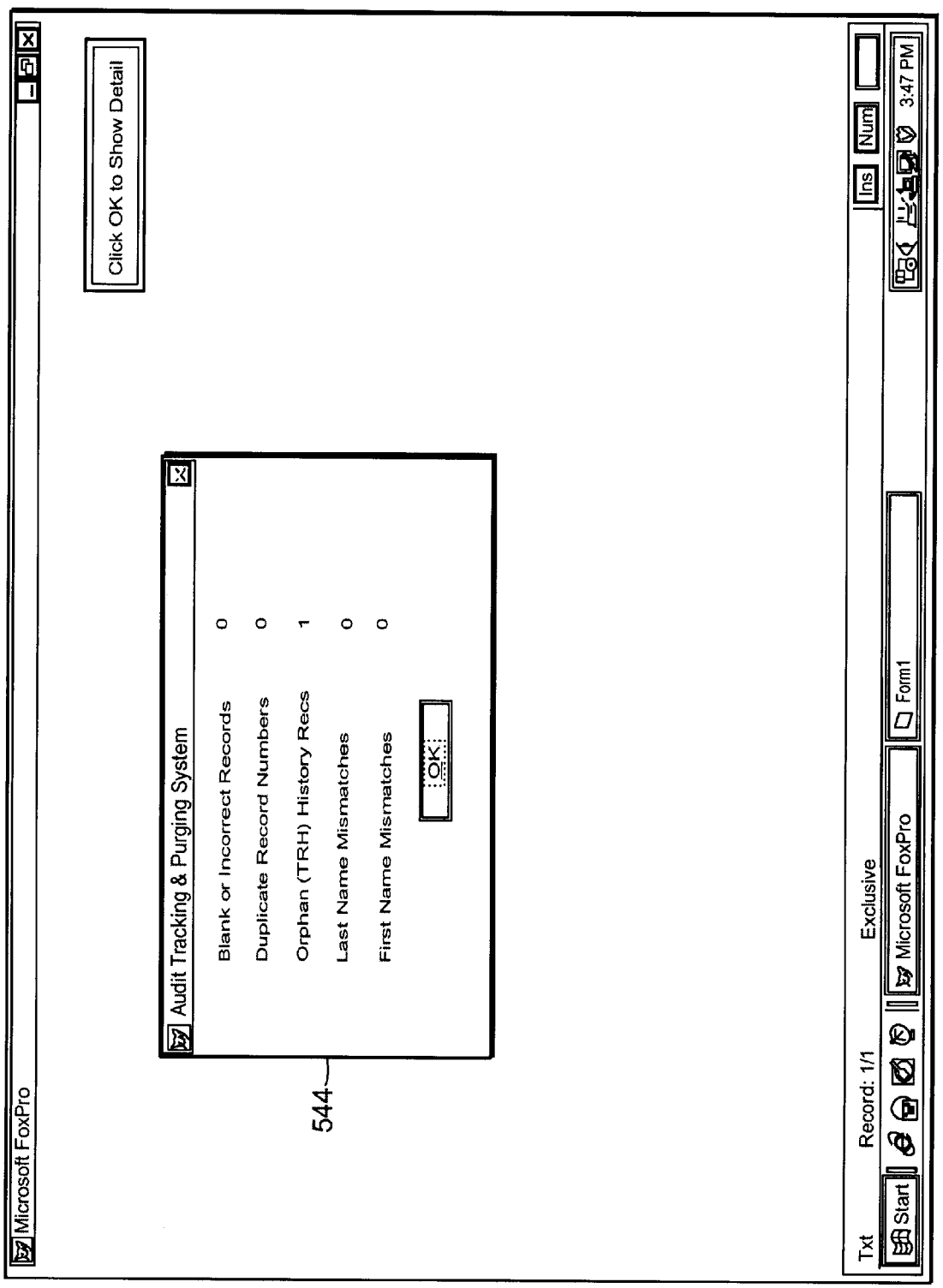
FIG. 28 illustrates audit system graphical user interface screen of the present invention.

FIGS. 28 and 29 shows the user screen and flowchart for the Audit System subroutine AUDW. In step 542, the audit system subroutine is initiated, causing an audit of the entire database 126, in which certain types of data errors are identified, such as blank and incorrect records and various data mismatches. A screen prompt 544 presents a summary of the audit results. By clicking on a screen prompt, the audit details will be displayed on the screen 91. The user will then have the choice in step 546 of printing out the audit details in step 548 or exiting in step 550.

Figure 30:
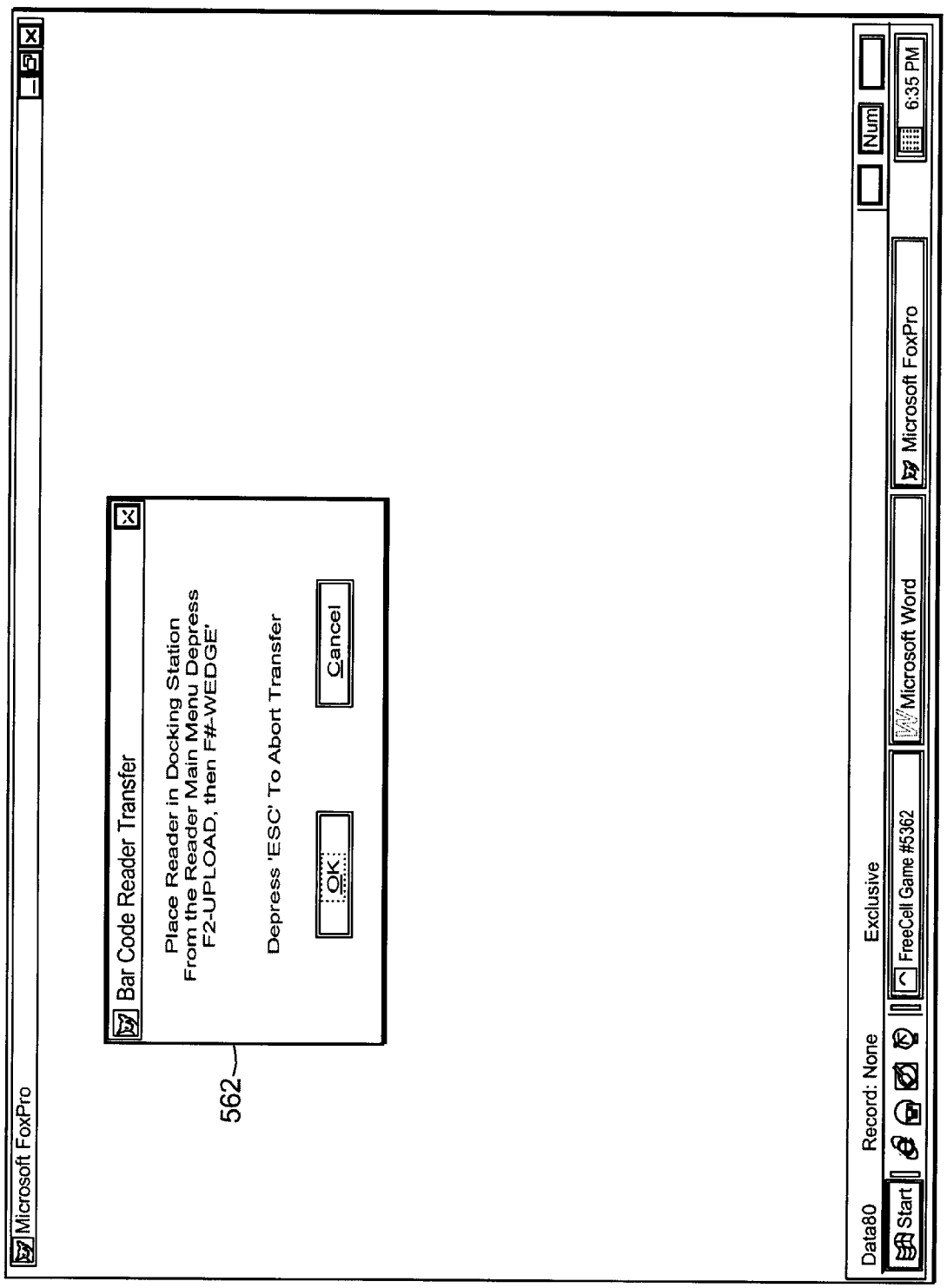
FIG. 30 illustrates the graphical user interface screen for the remote scans subroutine of the present invention.
Figure 31:
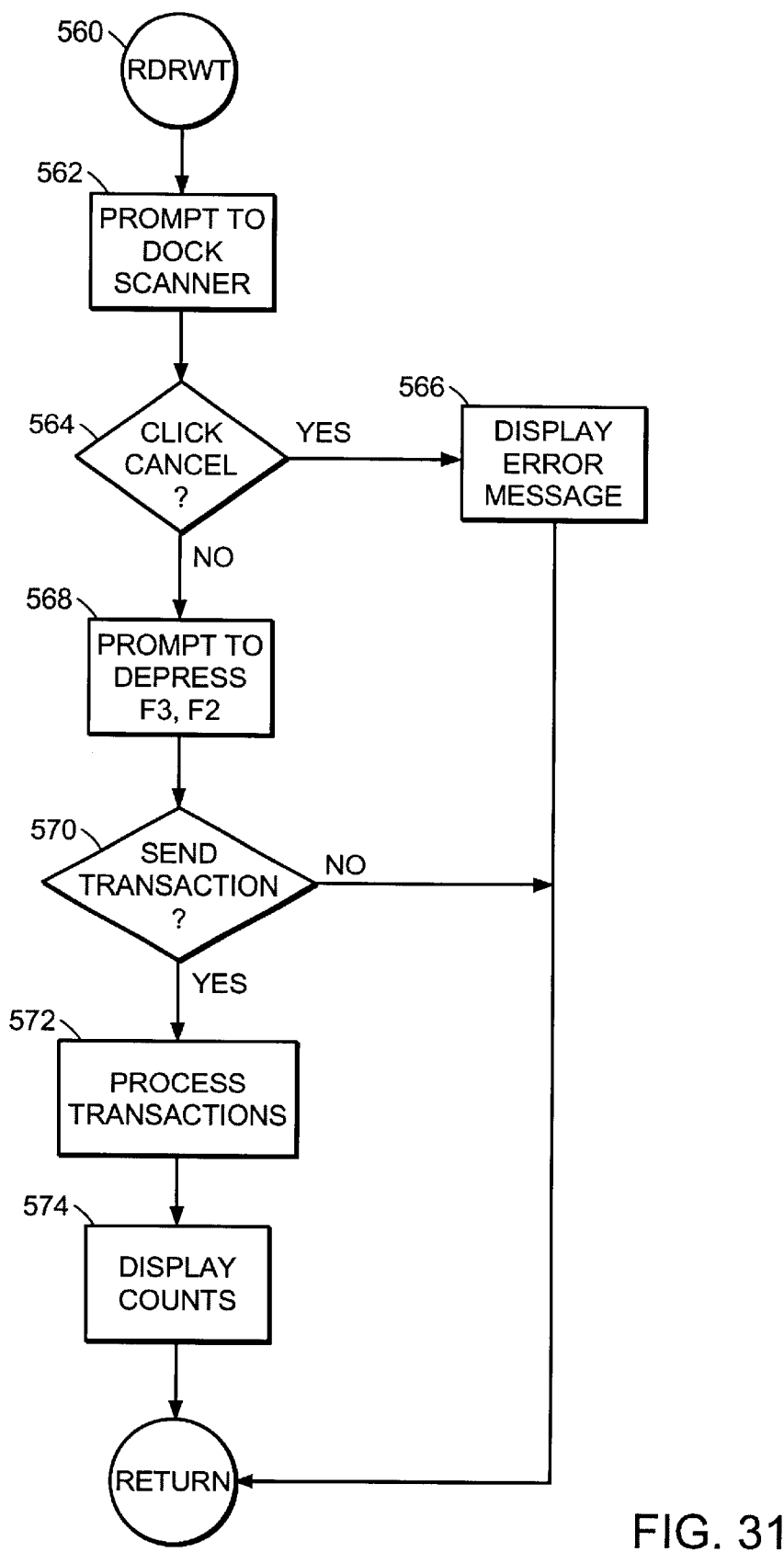
FIG. 31 is a flowchart of the remote scans subroutine of the present invention.

Turning now to FIGS. 30 and 31, the Remote Scans user screen and flowchart are shown. The remote scan function allows a user to update the location of a file folder 52 by using a portable bar code scanner, which records scans to be later uploaded into the shelf manager system 10. In step 560, the remote scans subroutine RDRWT is initiated, causing a screen prompt to dock the scanner to be displayed in step 562. In step 564, the program may be canceled by the user causing the error message in step 566 to be displayed. In step 568, the user is prompted to initiate the uploading of the data and send the transaction in step 570 to the computer 88. The transaction is processed by the computer 88 in step 572 and the updated file data is displayed in step 574.

Figure 32:
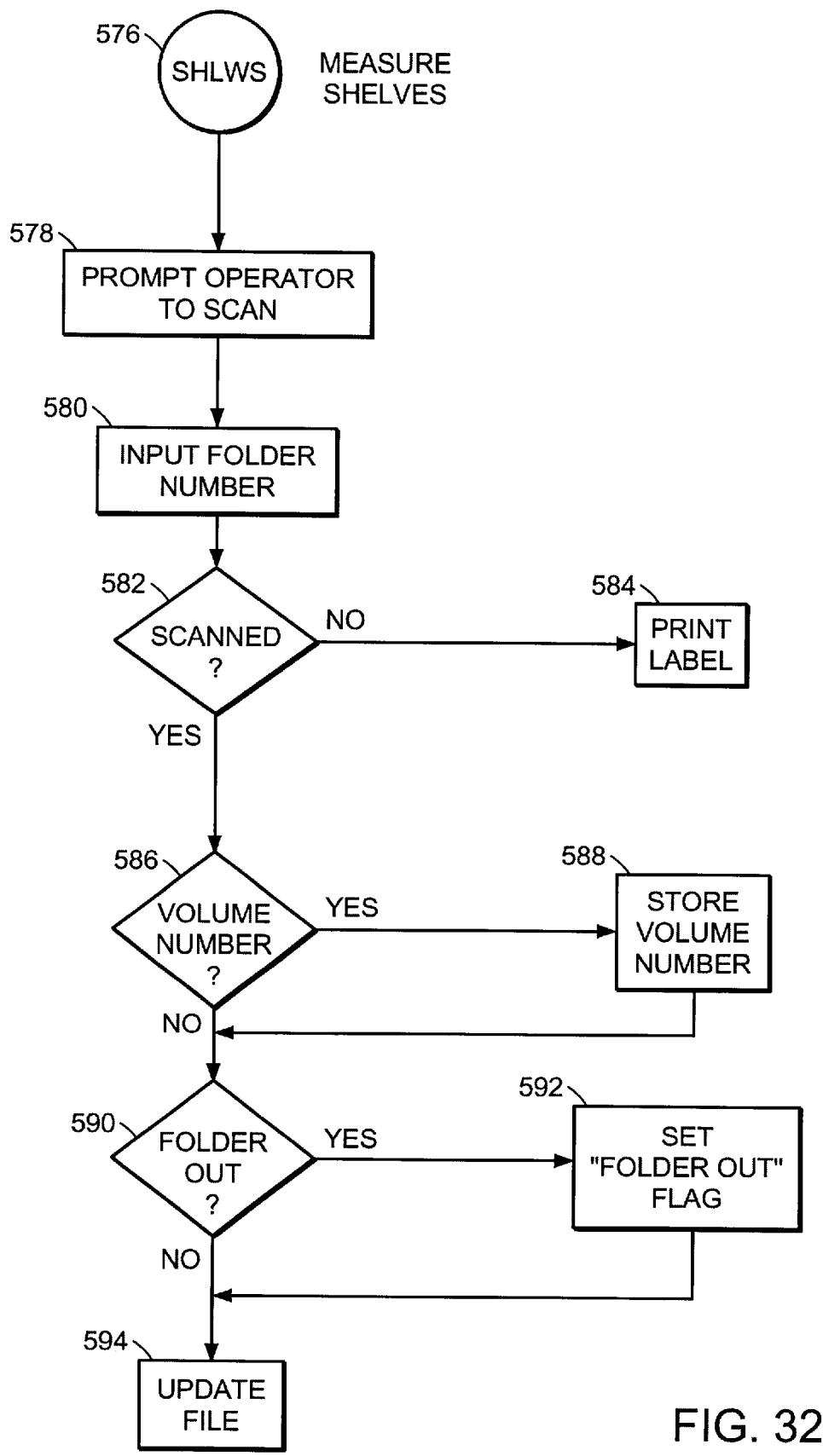
FIG. 32 is a flowchart of the measure shelves subroutine of the present invention.

Referring now to FIG. 32, the Measure Shelves flowchart is shown. The measure shelves subroutine allows the user to record, measure, and label folders on each of the shelves. In step 576, the measure shelves SHLWS is initiated, causing the scan prompt to be displayed in step 578. The folder number is input in step 582. If the file folder was not scanned in step 582, indicating that there is no label, a label will be printed in step 584. If the file has a volume number in step 586, the volume number will be stored in step 588. If there is no volume number, the file will be considered to be a single file folder. In step 590, the user indicates if the file folder is in-file or out-of-file. If the file is out, the "folder out" flag is set in step 592. If the folder is in, the file will be updated in step 594 and the user operator is prompted to scan the folder.

Figure 33:
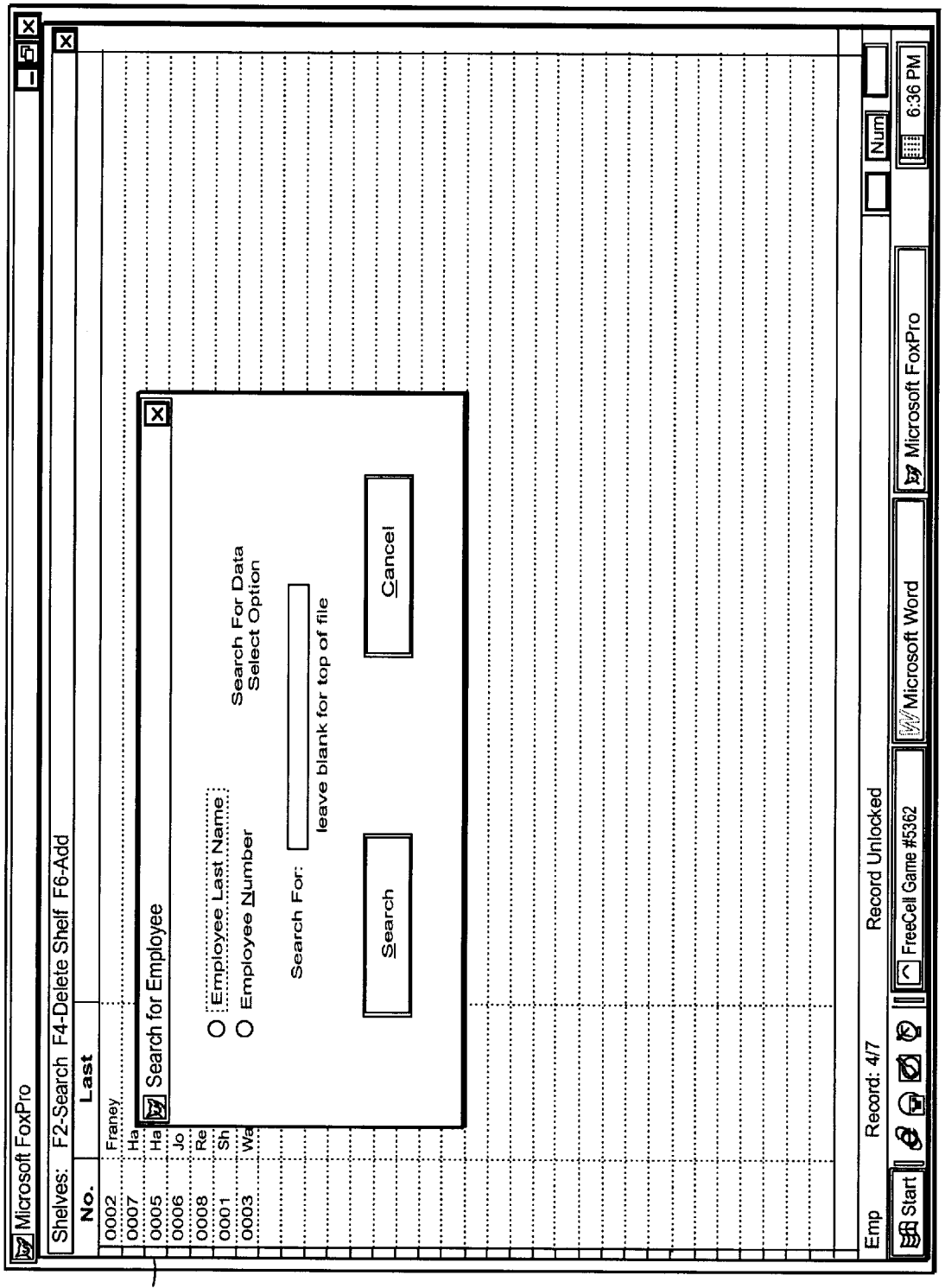
FIG. 33 illustrates the graphical user interface screen for the add employees subroutine of the present invention.
Figure 34:
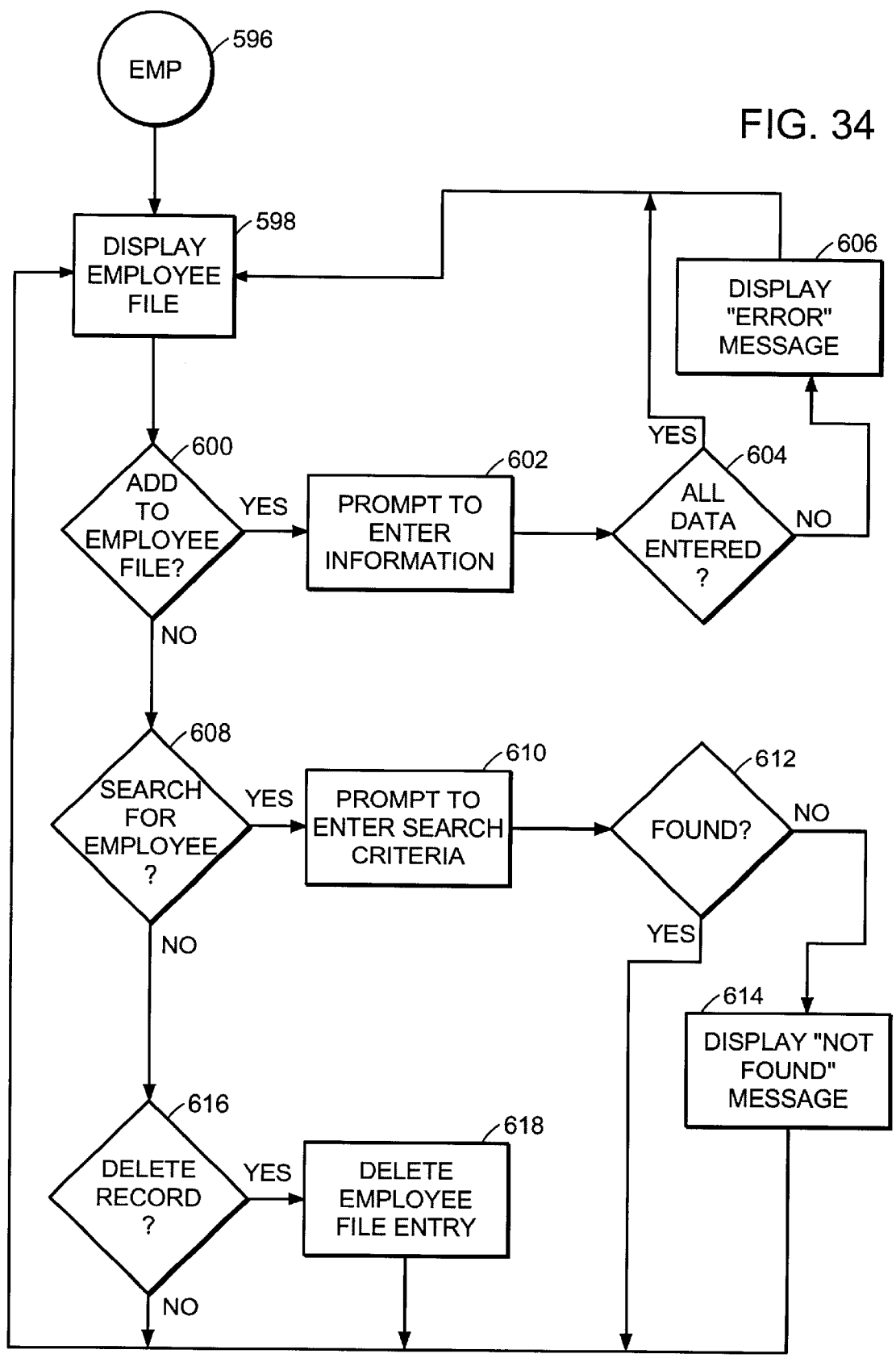
FIG. 34 is a flowchart of the add employees subroutine of the present invention.

Referring now to FIGS. 33 and 34, the Add Employee user screen and flowchart are shown. The add employee subroutine allows the user to list all employees engaged in folder scanning along with their passwords. In step 596, the Add Employee subroutine EMP is initiated, causing the add employee screen to be displayed in step 598. In step 600, the user may choose to add information to the employee file and is prompted to do so in step 602. When all needed data has been entered, in step 604, the program returns to step 598, or if the information is not entered, an error message will be displayed in step 606. In step 608, the user may choose to search for an employee record and is prompted to enter search criteria in step 610. If the data is found it is displayed in step 612. If it is not found, a "Not Found" message is displayed in step 614. The user may also choose to delete an employee file entry in step 616 and carry out the deletion in step 618.

Figure 35:
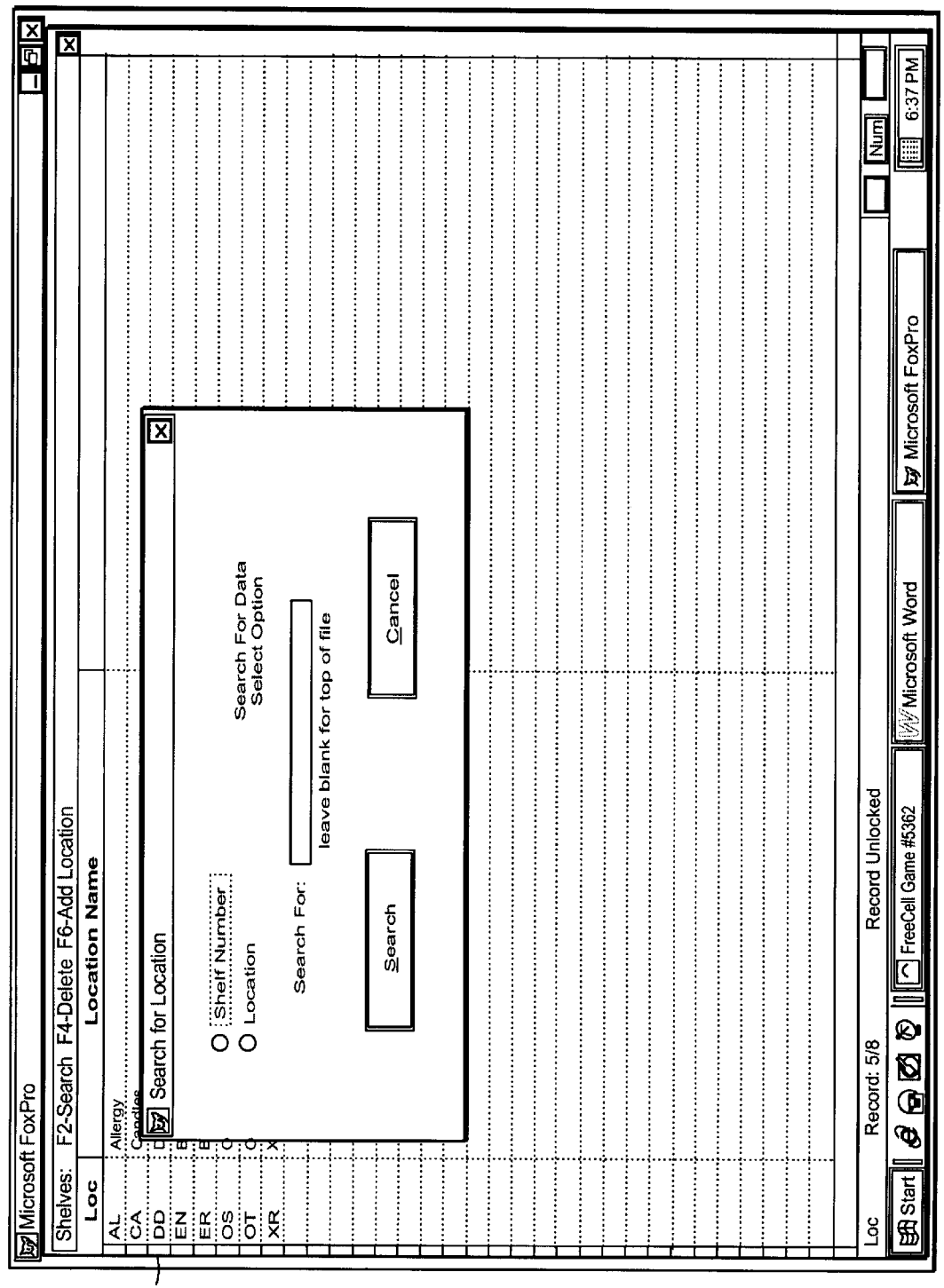
FIG. 35 illustrates the graphical user interface screen for the add locations subroutine of the present invention.
Figure 36:
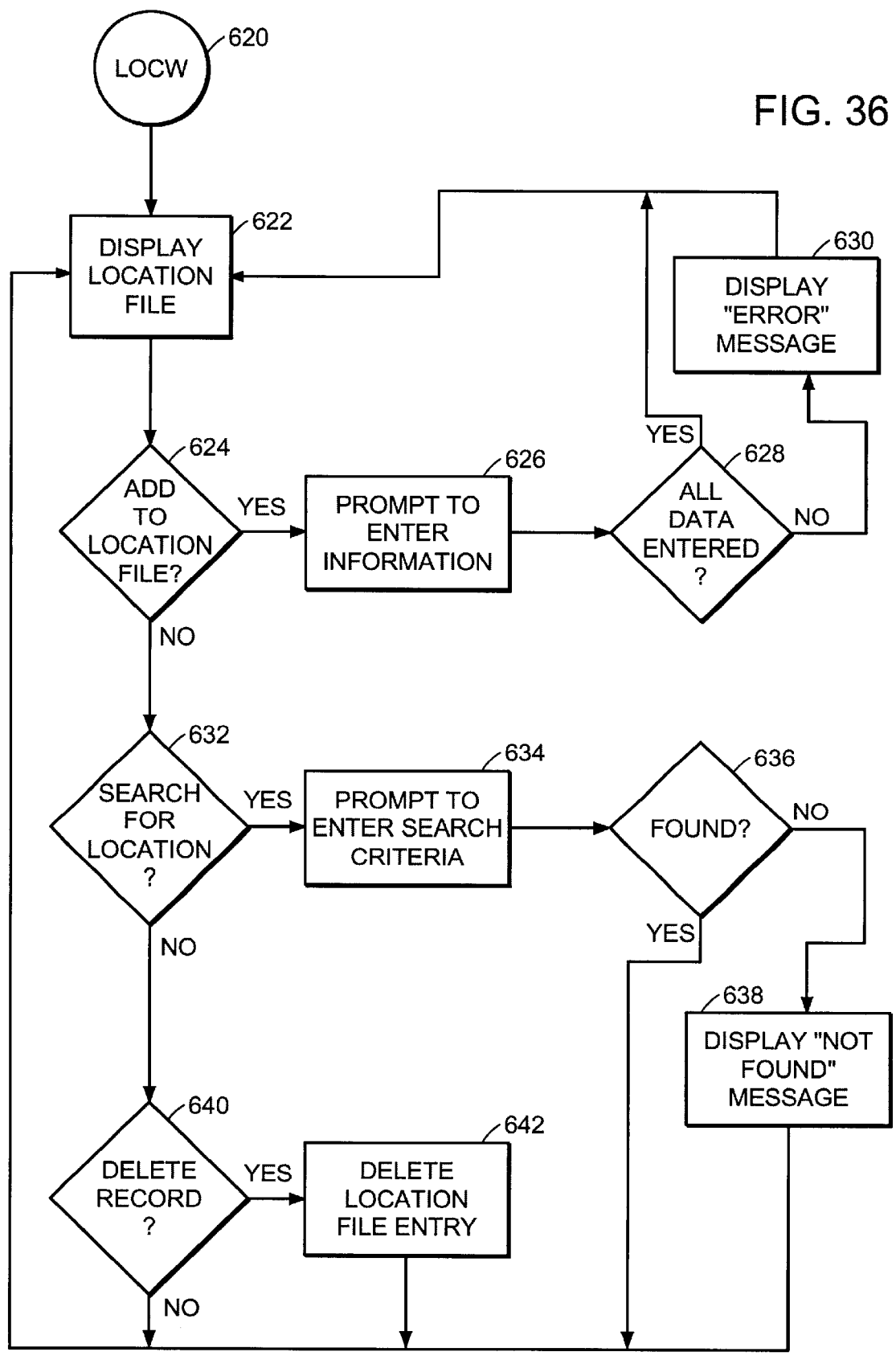
FIG. 36 is a flowchart of the add locations subroutine of the present invention.

Turning to FIGS. 35 and 36, the Add Locations user screens and flowchart are shown. The add locations subroutine allows the user to enter the locations for logged-out files, including those in off-site locations. In step 620, the add locations subroutine LOCW is initiated, causing the add locations to be displayed in step 622. In step 624, the user may choose to add information to the location file and is prompted to do so in step 626. When all needed data has been entered, in step 628, the program returns to step 622, or if the information is not entered, an error message will be displayed in step 630. In step 632, the user may choose to search for a location file entry and is prompted to enter search criteria in step 634. If the data is found it is displayed in step 636. If it is not found, a "Not Found" message is displayed in step 638. The user may also choose to delete a location file entry in step 640 and carry out the deletion in step 642.

Figure 37:
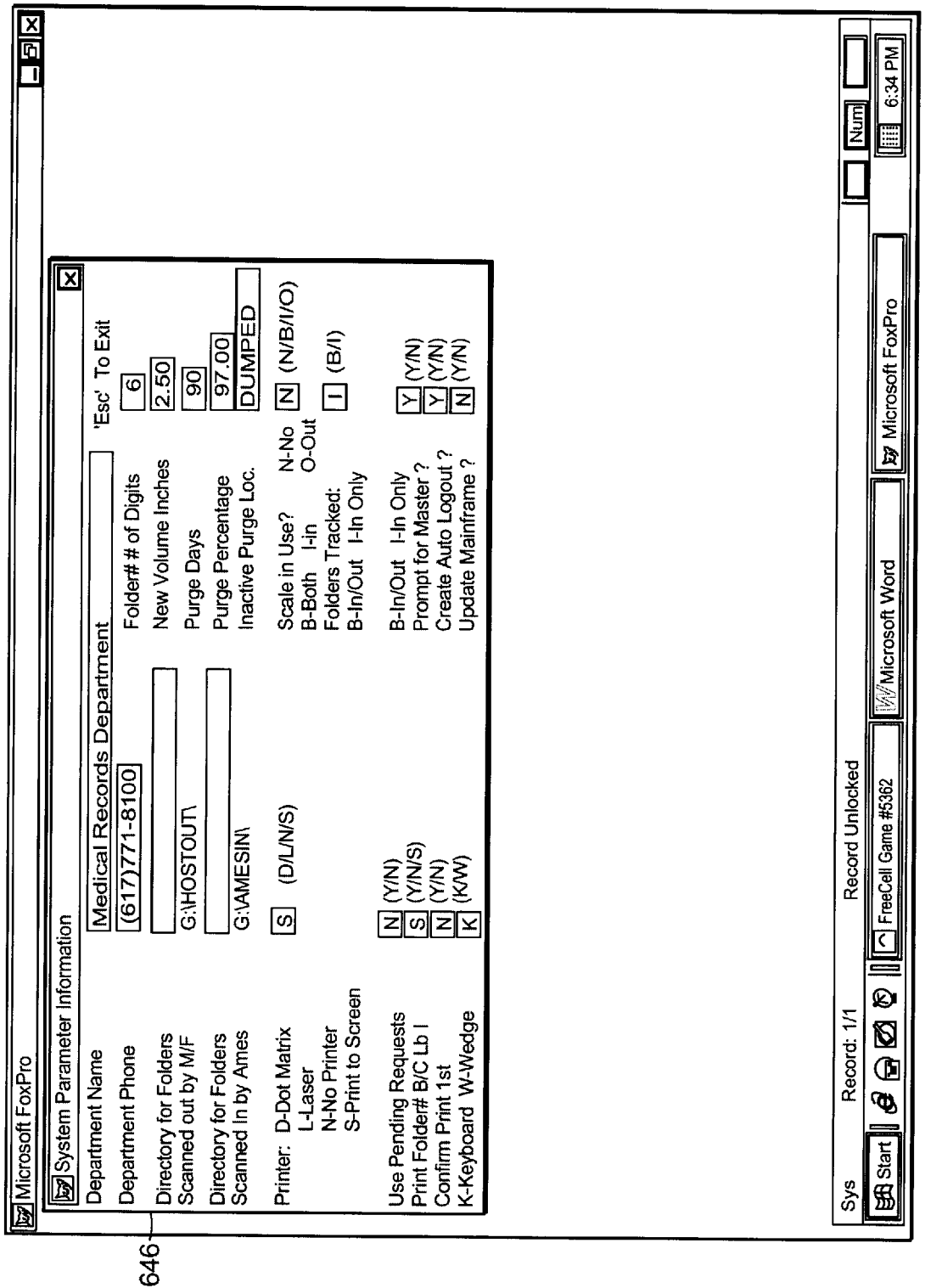
FIG. 37 illustrates the graphical user interface screen for the system setup subroutine of the present invention.
Figure 38:
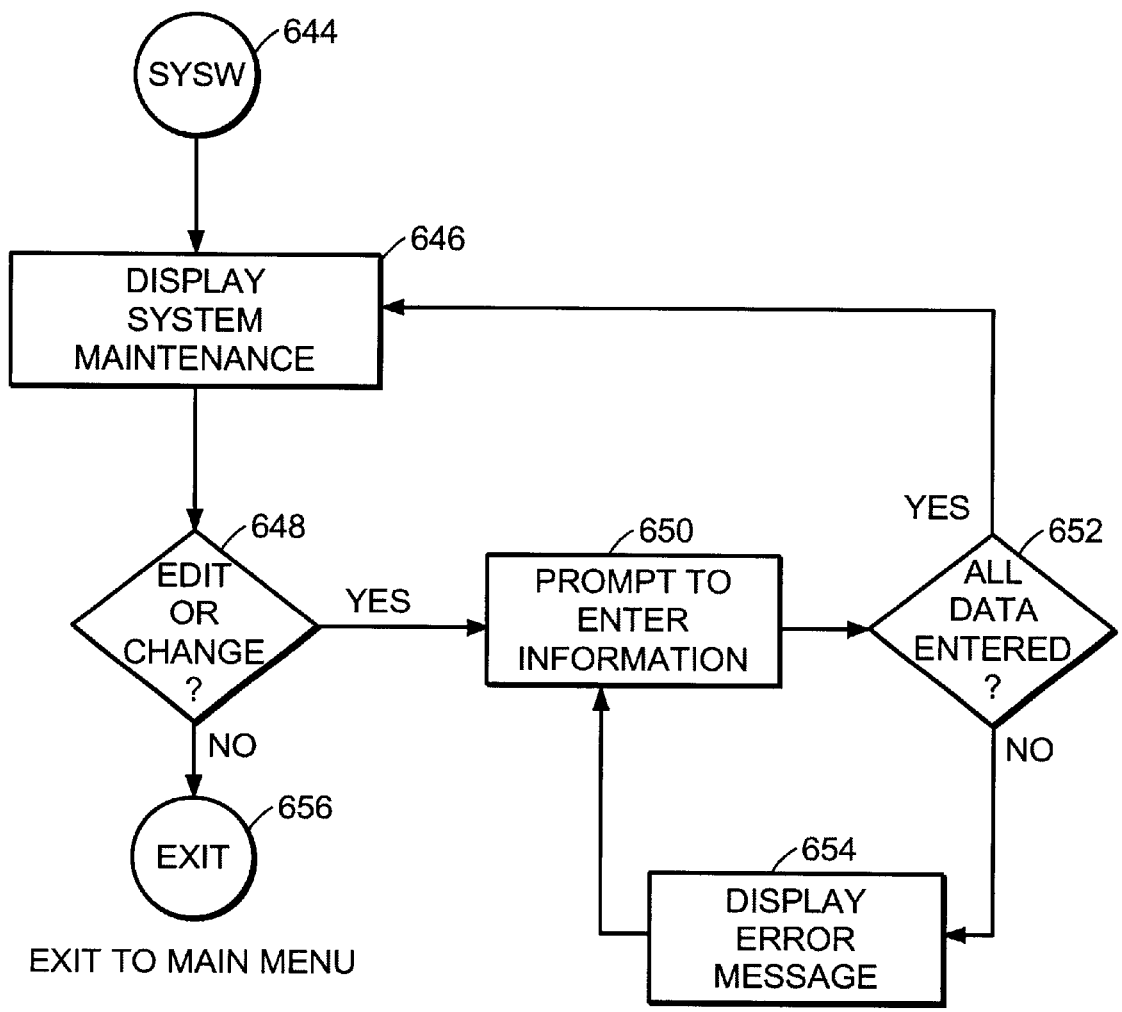
FIG. 38 is a flowchart of the system setup subroutine of the present invention.

Referring to FIGS. 37 and 38, the System Setup user screen and flowchart are shown. The system setup subroutine allows the user to set and modify the configuration parameters used by the shelf manager system 10. In step 644, the system setup subroutine SYSW is initiated, causing the system setup screen to be displayed in step 646. In step 648, the user may choose to edit or change system parameters and is prompted to do so in step 650. When all the data has been entered, in step 652, the program returns to step 646. If the information is not entered, an error message will be displayed in step 654. If the decision is not to change the system setup information, the programs exits in step 656.

Figure 39:
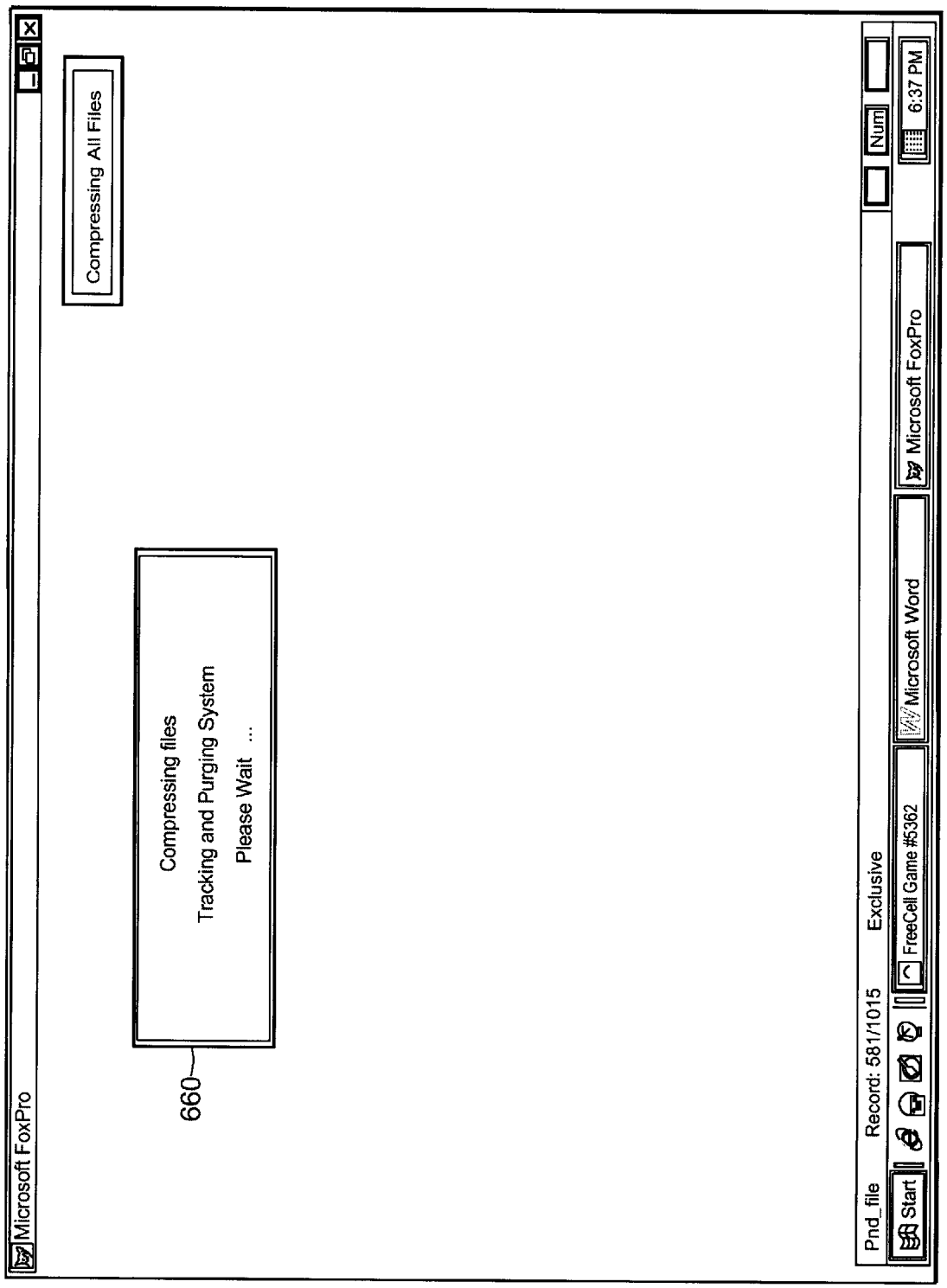
FIG. 39 illustrates the graphical user interface screen for the compress files subroutine of the present invention.
Figure 40:
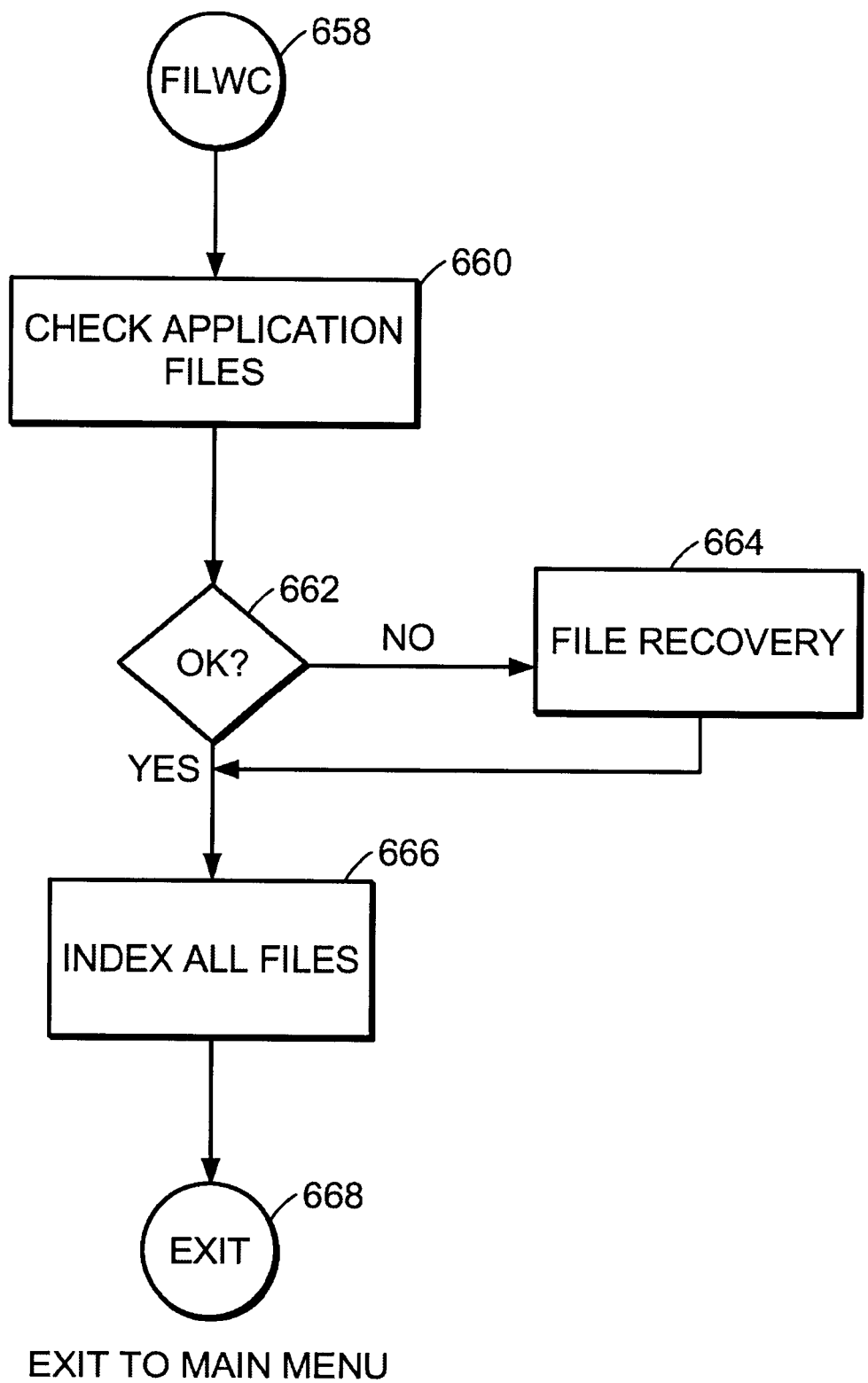
FIG. 40 is a flowchart of the compress files subroutine function of the present invention.

Now, turning to FIGS. 39 and 40, the compress file user screen and flowchart are shown. The compress file function is used periodically to reorganize and streamline all the application files. In step 658, the compress files subroutine FILWC is initiated, causing the "check application" prompt to be displayed in step 660, as the files are checked. If the files are deemed to be damaged in step 662, a file recovery procedure is run in step 664. If the files are not-damaged, all files are indexed in step 666, and upon completion, the program exits in step 668.

Figure 41:
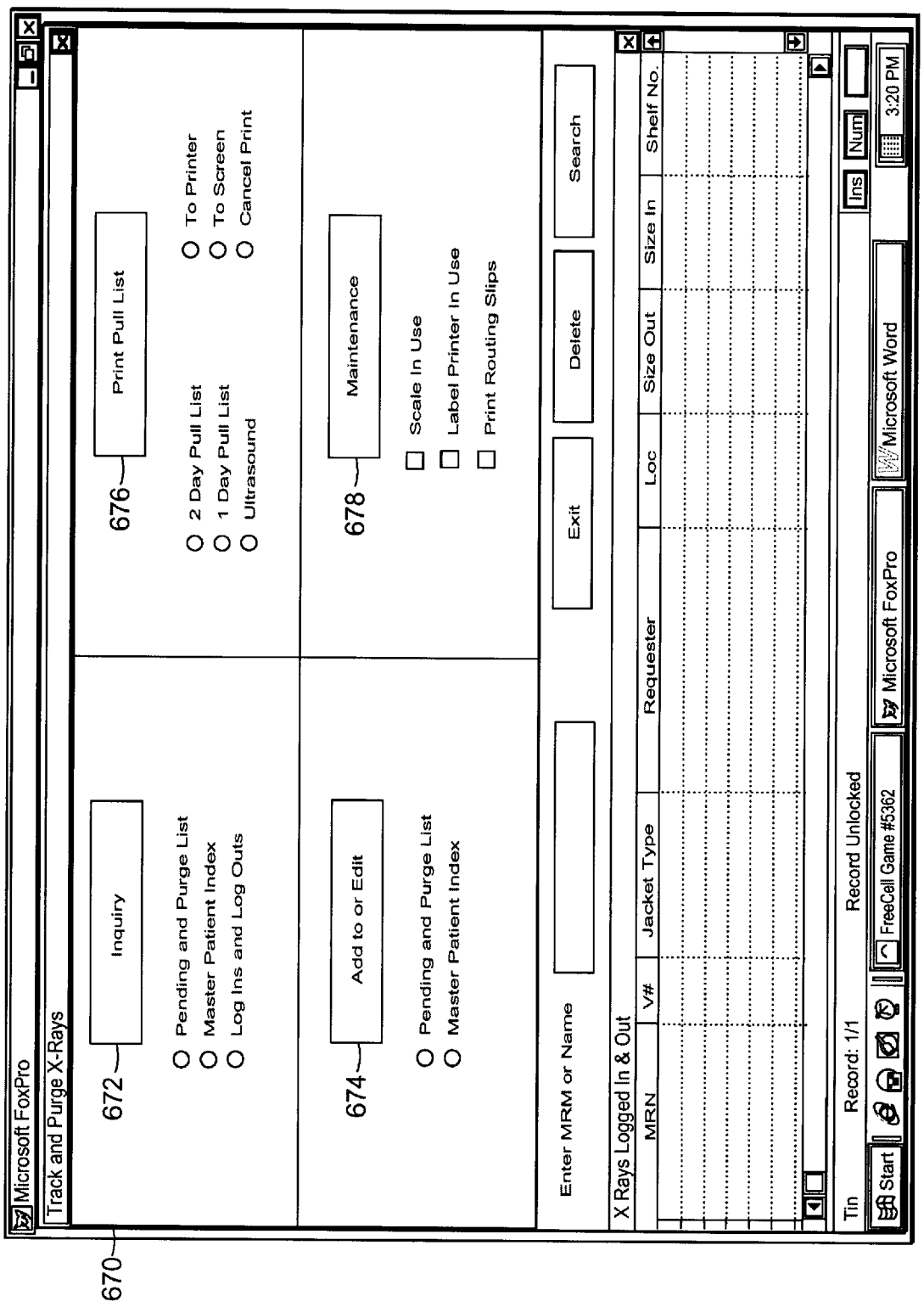
FIG. 41 illustrates the graphical user interface screen for use with the present invention for tracking and purging x-ray film jackets.

FIG. 41 shows a graphical user interface screen 670 for use with the present invention, which allows the user to search for or to add file data associated with x-ray film jackets. The screen 670 displays log-in and log-out data for various x-ray jacket types, which may have different jacket thicknesses when empty. The screen 670 is divided into a plurality of functional sections. The inquiry section 672 allows the user to display pending and purge lists, the master patient index, and the log-in and log-outs. The add to or edit section 674 allows the user to enter or edit pending and purge lists as well as the master patient index. The print pull list section 676 allows the user to print out a pull list or display it on the monitor screen 91. The maintenance section 678 allows the user to print routing slips as well as perform maintenance operations associated with the electronic scale 130 and the label printer 132.

Figure 42:
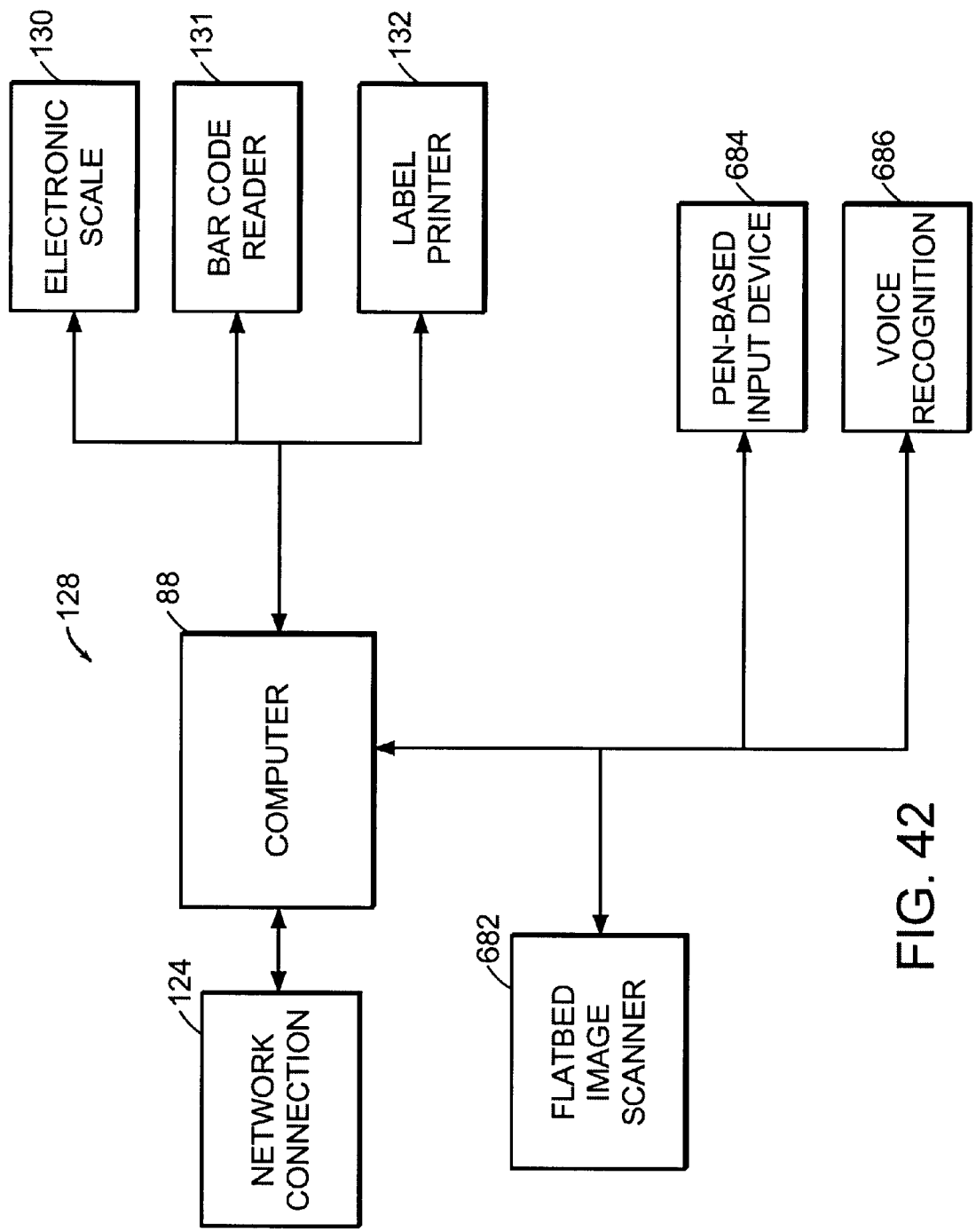
FIG. 42 illustrates an alternative embodiment of the present invention, showing intelligent imaging.

Turning now to FIG. 42, an alternative embodiment of the present invention is shown. As discussed above, the shelf manager system 10 of the present invention can track multiple file requests for active files. Multiple requests can arise when different medical departments in a patient medical care facility 14 need to see the same patient's file.

It is often the case that a medical file is requested simultaneously by different clinical departments within the medical care facility 14. For example, pertinent parts of a patient's medical records may need to be reviewed by both the radiology department 26 and the pathology departments 28. Because there is only one paper copy of a patient's file, these two requests would need to be filled serially by sending the paper file to the first department and then to the second. The second requesting department will need to wait until the first department is finished with the patient's file and re-routed to the second requesting department. This can be a serious drawback in the case of a patient who is undergoing treatment by the first and second department.

This embodiment of the present invention supplements patient's file folder 52 by providing electronic or paper copies of the files to each of the requesting departments so that both the first requesting department and the second requesting department could review the file, or pertinent parts of the file, concurrently rather than serially.

This embodiment, which is illustrated in FIG. 42, may be described as intelligent imaging. The present embodiment includes a modified logging station 128 which includes a computer system 88, an electronic scale 130, a bar code reader 131, a label printer 132, and a network connection 124. In addition, the logging station 128 includes a flatbed image scanner 682, which is used to scan pages of documents into the computer system, so that they may be provided to the requesting department in electronic form or printed out in paper form.

In this embodiment, a patient file 52 is selectively scanned. It has been recognized that some parts of a patient's file is more pertinent than other parts, and it is only these parts that would need to be scanned and duplicated. Typically the pertinent parts of a patient's file would be a subset or abstract of the total information the file contains. In the case of a medical care facility 14, the scanned information is limited to clinical information and lab results if not already available in electronic form, and only that information needed by doctors and other medical personnel to carry on medical diagnostic work for a patient. The pertinent information is scanned and stored in an electronic data base, and it is reproduced and duplicated at the time the request is made.

The logging station 128 also includes, optionally, a pen-based input device input device 684. With the pen-based input device 684, handwritten annotations may be made to the electronic copies of the files. The logging station 1 28 also includes a voice recognition interface 686 so that voice annotations could be likewise made to the documents. The basic document pages, along with their various pen and voice annotations, may be described as hybrid documents.

Figure 43:
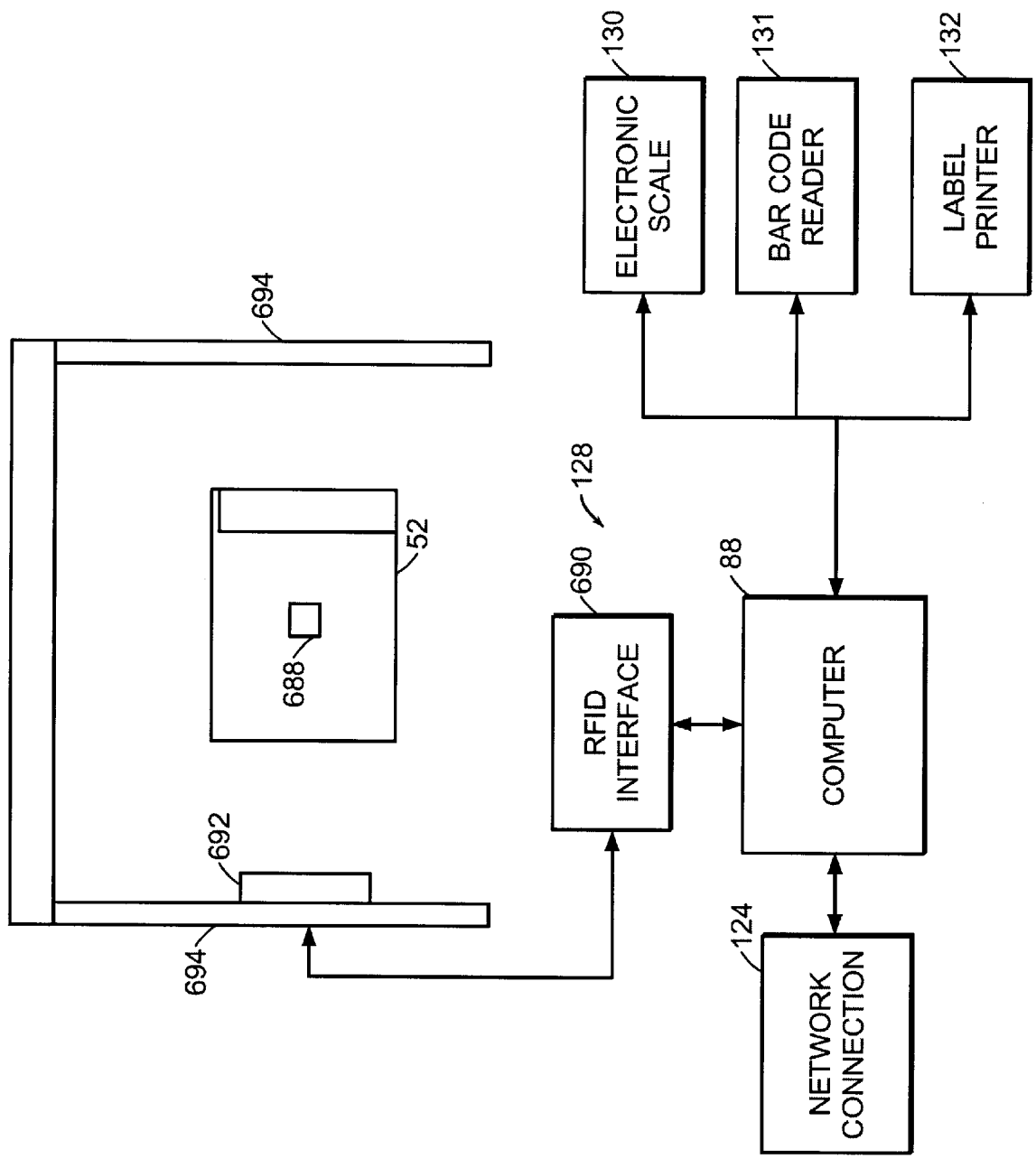
FIG. 43 illustrates another alternative embodiment of the present invention, showing radio frequency identification and tracking of files.

Now, turning to FIG. 43, another embodiment of the present invention is shown. In this embodiment the file folders are fabricated with implanted radio-frequency identification tags to automatically identify each file 52 when it passes close to a radio frequency identification reader embedded in a doorway detection system.

Radio frequency identification tags in the present embodiment are of the type manufactured by Texas Instruments of Dallas, Texas. The basic RFID tag consists of a thin microelectronic memory and control transponder chip surrounded by a flat antenna wire. Power and data are provided to the chip by an RFID reader, emitting a modulated radio frequency field which powers the chip by field induction and reads or writes data to the chip, as needed. The RFID tag can thus store the same information provided by a bar code label to efficiently identify a file when it is in close proximity to a RFID reader. In this embodiment, the information written and read out of the RFID tag represents the patient Identification number, which is linked to the patient's master record.

In FIG. 43, the file folder 52 includes a RFID tag 688. In this embodiment, the RFID tag 688 is affixed to the file folder 52 in the manufacturing process by inserting the RDIF tag 688 between the glued seams of a reinforced double-sided file folder 52.

FIG. 43 shows a logging station 128, including a computer 88, an electronic scale 130, a bar code reader 131, a label printer 132, and a network connection 124. Additionally, the logging station 128 includes an RFID interface 690.

The RFID tag 688 communicates by means of an RFID reader 692, shown schematically as being mounted in a door frame 694. The RFID interface 690 receives identification information from the RFID reader 692 for input into the shelf manager system 10. The present embodiment operates the same way as the preferred embodiment, except that the RFID tag 688 and reader 692 takes the place of the barcode label 82 and the bar code reader 131 in identifying files that are being moved through the door frame 694, one at a time or in bulk. Also, the system has the capability of writing identification information into the RFID tags of new files, taking the place of the bar-code label printer 132. Passive tracking of file folders or x-ray jackets is provided without the operator needing to pick up a scanner 134 and actively scan the file or x-ray jacket into or out of the active file storage 18.

A further alternative embodiment of the present invention will now be described in connection with FIG. 44, which utilizes an on-demand digital color printing system to create new color-coded file folders for use with the shelf manager system 10, as needed. This embodiment overcomes the inefficiencies of maintaining large inventories of blank file folders. Color coded labels 74 are typically affixed to the blank files. Bar-coded information and patient identification information must be added at the appropriate time. With the system of this embodiment, the file folders are created as needed, and can be created in completely finished form in advance of a patient's first visit to the medical center 12.

Figure 44:
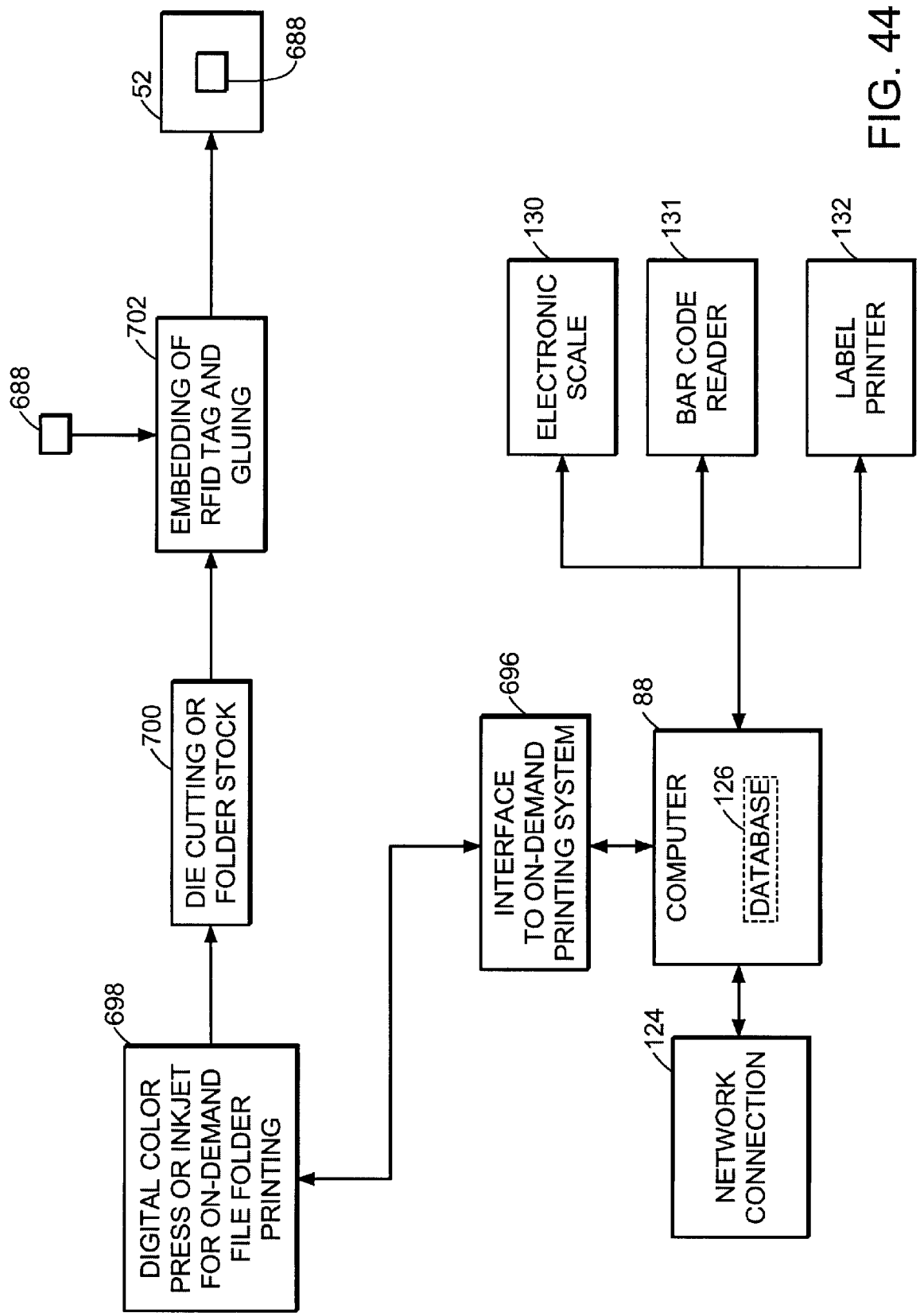
FIG. 44 of the present invention illustrates a still further embodiment of the present invention, showing on-demand file creation.

FIG. 44 shows a logging station 128, including a computer 88, an electronic scale 130, a bar code reader 131, a label printer 132, and a network connection 124. The logging station 128 also includes an interface 696 to an on-demand printing system.

In the manufacture of file folders 52, according to the present embodiment, a blank file folder is printed on a digital color press 698 from data stored in the database 126 of the shelf manager system 10.

The file folder 52 is printed to include the color coding, the bar code label, and patient name received through interface 696 from the computer 88, based on patient record information included in the database 126 or from a cental medical database 42. Printing occurs directly on the file folder substrate 63, shown in FIG. 4. Printing on the file folder 52, in step 698, is accomplished by a digital color press of the type manufactured by Indigo N.V. of Maastricht, The Netherlands, which utilizes liquid toner for high speed color printing for the CMYK color printing process to create the colors. Alternatively, an industrial color inkjet printer may be used, such as a Model 2001 Graphics Printing System available from Videojet Systems International, Inc. of Wood Dale, Ill. The color inkjet printing system uses up to 40 print heads to produce 10 colors in four positions for printing color file folders, file pockets, or x-ray jackets directly on the substrate. The color inkjet printer provides additional cost savings over the digital press by requiring less ink to produce each file folder 52. Both of these printing methods may be used to create file folders 52 which are color-coded for the terminal digit filing system earlier described.

The die cutting of the folder stock occurs at step 700. In the next step 702, the folder 52 is glued and, optionally, an RFID tag 688 is inserted.

A method of controlling the printing of labels is described in U.S. Pat. Nos. 4,939,674 and 5,621,864 to Price et al., which are hereby incorporated by reference. The teachings of the Price et al. patents may be used with this embodiment of the present invention for its teaching of the automatic generation of indicia fields and formatting. However, as stated above, the present invention utilizes direct printing on the file-folder substrate 63 rather than printed labels as described in the Price et al. patents.

With the system shown in FIG. 44, the completed file folder 52 is created as needed, complete with all proper color coding, bar coding, and patient information, along with the embedded RFID tag 688, if desired. In addition, since there are no labels, the traditional step of adding labels is eliminated, providing a manufacturing cost savings. Also, since the file folders 52 do not require labels, the thickness of the file folder tabs 70 is reduced, providing greater file storage density on the shelf units 46. Finally, the file folders 52 lasts longer, due to reduced wear. In conventional labels folders, the stick-on labels 74 have a tendency to rub against each other as the file folders 52 are filed and re-filed on the shelf units 46, causing wear and reducing the active life of the file folders 52.

These various embodiments come within the scope of the present invention. The inventor's preferred embodiments, which are described in detail herein, are exemplary of all possible embodiments which practice the spirit of the present invention. The discussion of these embodiments should not be construed as limiting the scope of the appended claims. In view of this, it is understood that the above description is illustrative rather than limiting.

What is claimed is:

1. A method for managing file folders in a file storage facility having a plurality of storage sections, comprising the steps:

assigning a unique file identifier to each file folder in the file storage facility;

tracking on a computer the physical thickness, storage section location, and content information for each file folder, according to its file identifier;

updating the physical thickness, storage section location, and content information whenever the information changes;

determining, for each storage section, when the total thickness for all file folders within a file section exceeds a threshold percentage of the available storage space for the storage section; and in response to the determination of the threshold being exceeded for a section, purging selected file folders within the section to reduce the total thickness for all file folders below the threshold percentage.

2. A system for managing file folders in file storage facility having a plurality of storage sections, comprising:

a unique file identifier associated with each file folder in the file storage facility;

a computer;

a database, coupled to the computer, for storing sets of data for each file folder representing its file identifier, physical thickness, storage section location, and content information for each file folder, according to;

updating means for updating the physical thickness, storage section location, and content information whenever the information changes;

means for determining, for each storage section, whenever the total thickness for all file folders within a storage section exceeds a threshold percentage of the available storage space for the storage section; and purging means, responsive to the determination that the threshold percentage is being exceeded for a section, for purging at least some file folders within the section;

wherein the purging reduces the total thickness for all file folders below the threshold percentage.

3. A system for managing file folders in a file storage facility having a plurality of storage sections, comprising:

a unique file identifier associated with each file folder in the file storage facility;

a computer;

a database, coupled to the computer, for storing sets of data for each file folder representing its file identifier, physical thickness, storage section location, and content information for each file folder, according to its file identifier;

updating means for updating the physical thickness, storage section location, and content information whenever the information changes;

means for determining, for each storage section, whenever the total thickness for all file folders within a storage section exceeds a threshold percentage of the available storage space for the storage section; and purging means, responsive to the determination that the threshold percentage is being exceeded for a section, for purging at least some file folders within the section;

wherein the purging reduces the total thickness for all file folders below the threshold percentage.

4. A system for managing file folders in file storage facility as recited in claim 3, wherein the logging station includes an electronic scale for measuring the physical weight of the file folder needing updating and means for converting a physical weight measurement into a physical thickness value.

5. A system for managing file folders in file storage facility as recited in claim 3, wherein the unique identifier is in the form a bar-coded number.

6. A system for managing file folders in a file storage facility as recited in claim 3, further including a label printer in the logging station for printing bar-coded labels.

7. A system for managing file folders in file storage facility as recited in claim 3, wherein the unique identifier is in the form a coded radio frequency identification tag.

8. A system for managing file folders in file storage facility as recited in claim 3, wherein the means for determining is a computer program operating on the database data supplied by the logging station.

9. A system for managing file folders in file storage facility as recited in claim 3, wherein the means for determining is a physical measurement of the files in a storage section.

10. A system for managing file folders in file storage facility as recited in claim 2, wherein the purging means includes creating a listing of file folders to be purged based on at least one computer algorithm.

11. A system for managing file folders in a file storage facility as recited in claim 10, wherein the computer algorithm for purging is based on content information for the file folders in a storage section.

12. A system for managing file folders in a file storage facility as recited in claim 10, wherein the computer algorithm for purging is based on file usage history for the file folders in a storage section.

13. A system for managing file folders in a file storage facility as recited in claim 10, wherein the computer algorithm for purging is based on physical size for the file folders in a storage section.

14. A system for managing file folders in a file storage facility as recited in claim 10, wherein the computer algorithm for purging is applied to each storage section independently of the other of said plurality of storage sections.

15. A system for managing file folders in a file storage facility as recited in claim 10, wherein the computer algorithm for purging is for determining which files are least likely to be requested independently of the other files.

16. A system for managing file folders in a file storage facility as recited in claim 10, wherein the computer algorithm for purging is for determining which files are least likely to be requested compared with other files in a storage section.

17. A system for managing file folders in a file storage facility as recited in claim 10, wherein the computer algorithm for purging is for determining firstly which files are least likely to be requested independently of other files in a storage section and secondly which files are least likely to be requested compared with other files in the storage section.

18. A system for managing file folders in file storage facility as recited in claim 2, wherein the purging means includes purge list generating means for periodically generating a list of files that may be purged from the storage sections and printing means for printing out the list of files for purging.

19. A system for managing file folders in file storage facility as recited in claim 2, wherein the file folders are x-ray film jackets.

20. A system for managing file folders in file storage facility as recited in claim 2, wherein the file folders are in terminal digit filing order.

21. A system for managing file folders in file storage facility as recited in claim 12, wherein the file folders are color-coded.

22. A system for managing file folders in file storage facility as recited in claim 2, wherein the purged file folders are removed to an off-site storage facility.

23. A system for managing file folders in file storage facility as recited in claim 2, wherein the purged file folders are removed first to an intermediate file storage facility before being removed to an off-site storage facility.

24. A system for managing the storage of medical record files in a file storage facility including a set of shelves, divided into sections, for the medical record files, comprising,
  a shelf database for storing information corresponding to each shelf section in the file storage facility utilized for storing the medical record files, including at least a unique shelf section identification code for the each shelf section, an indication of the linear dimension of the shelf section, and an indication of the current fullness of said shelf section;
  a file database for storing information corresponding to each medical record file including at least a file identifier, the current thickness of the file, and the shelf section location for the file;
  means for updating the current thickness for a file in the database when the thickness of a file changes;
  means for determining the current fullness of the shelf section by comparing the linear dimension of the shelf section with total thickness of all files stored on the shelf;
  means for determining when the current fullness of the shelf section exceeds a threshold value;
  a file usage algorithm for determining which files are least likely to be requested;
  means for generating a list of files that may be removed from a shelf section according to said file usage algorithm to reduce the current fullness of the shelf section below the threshold value;
  wherein the current fullness for each shelf in the file storage facility is maintained within a specified fullness range.

* * * * *